US010051933B2

(12) United States Patent
Rogers

(10) Patent No.: US 10,051,933 B2
(45) Date of Patent: Aug. 21, 2018

(54) NOTCHED CASE FOR A PORTABLE, HAND-HELD ELECTRONIC DEVICE, SUCH AS A CELLULAR TELEPHONE, SMARTPHONE OR TABLET DEVICE

(71) Applicant: David Marrell Rogers, Lewisville, NC (US)

(72) Inventor: David Marrell Rogers, Lewisville, NC (US)

( * ) Notice: Subject to any disclaimer, the term of this patent is extended or adjusted under 35 U.S.C. 154(b) by 0 days.

(21) Appl. No.: 15/401,139

(22) Filed: Jan. 9, 2017

(65) Prior Publication Data

US 2017/0196328 A1    Jul. 13, 2017

Related U.S. Application Data

(60) Provisional application No. 62/277,311, filed on Jan. 11, 2016, provisional application No. 62/362,218, filed on Jul. 14, 2016, provisional application No. 62/340,774, filed on May 24, 2016.

(51) Int. Cl.
*A45F 5/00* (2006.01)
*A45C 11/00* (2006.01)
*A45C 13/00* (2006.01)

(52) U.S. Cl.
CPC ............ *A45C 11/00* (2013.01); *A45C 13/002* (2013.01); *A45C 13/005* (2013.01); *A45F 5/00* (2013.01); *A45C 2011/002* (2013.01); *A45C 2011/003* (2013.01)

(58) Field of Classification Search
CPC ...... A45F 2200/0525; A45F 2200/0516; A45F 5/00; A45F 2005/008; G06F 1/1628

USPC .......................................................... 224/218
See application file for complete search history.

(56) References Cited

U.S. PATENT DOCUMENTS

| | | | | |
|---|---|---|---|---|
| 6,356,443 B2 * | 3/2002 | Jenks | ..................... | G06F 1/1626 343/720 |
| 6,390,712 B1 * | 5/2002 | Urness | ..................... | B42F 13/40 281/29 |
| 8,210,392 B2 * | 7/2012 | Kang | ................. | B65D 25/2847 220/737 |
| 8,905,231 B2 * | 12/2014 | Couch, III | ............. | A45C 11/00 206/320 |
| 2014/0291172 A1 * | 10/2014 | Rogers | ................... | A45C 11/00 206/37 |
| 2014/0319190 A1 * | 10/2014 | Cao | ........................... | A45F 5/00 224/218 |

* cited by examiner

*Primary Examiner* — Adam Waggenspack
(74) *Attorney, Agent, or Firm* — Robert W. Pitts

(57) ABSTRACT

The invention described is for a case for a portable, hand held electronic device, such as a cellphone or smartphone. This case includes a notch, formed when a hinged arm is extended, that allows the user to more easily hold the electronic device while attached to the cover. The notch provides space for the user's hand so that the electronic device rests between the user's thumb and fingers in a natural position with the fingers the device, which is cradled in the hand. A hinged flap closes the notch in a closed position but is hinged to expose the notch when a user supports the hand held electronic device. A main flap panel and a tab extending from opposite sides of a flap hinge to stabilize the hand held electronic device in the user's hand.

17 Claims, 47 Drawing Sheets

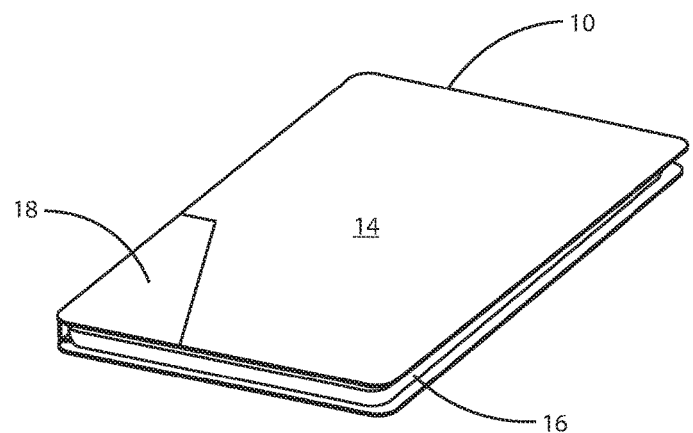
FIG. 1
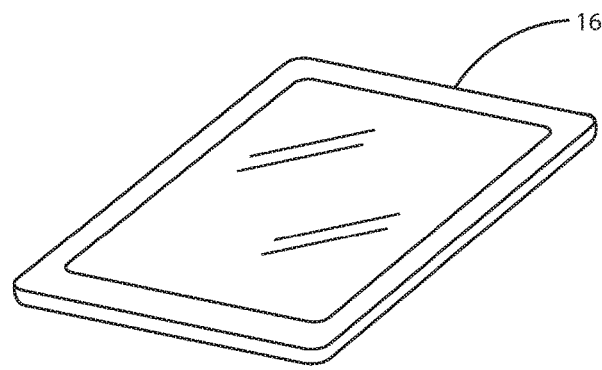
FIG. 2
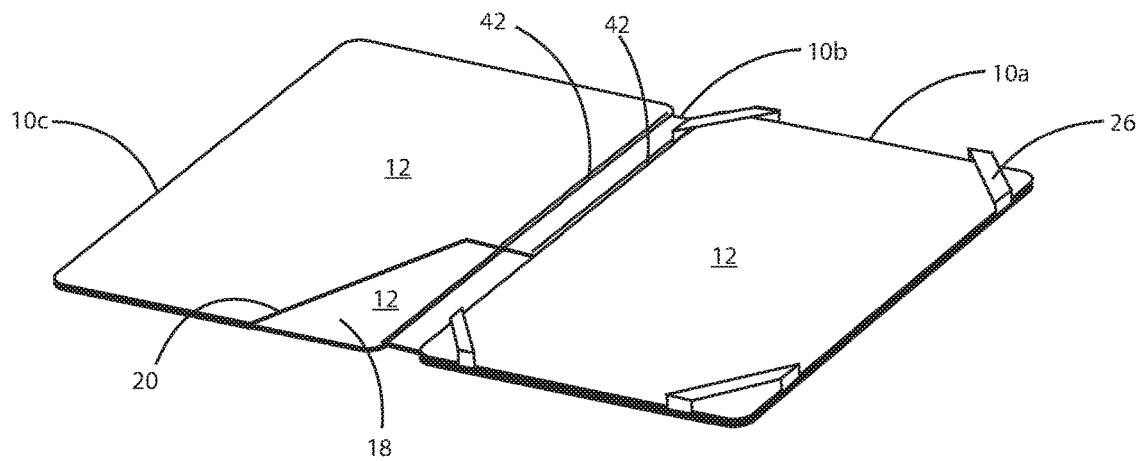

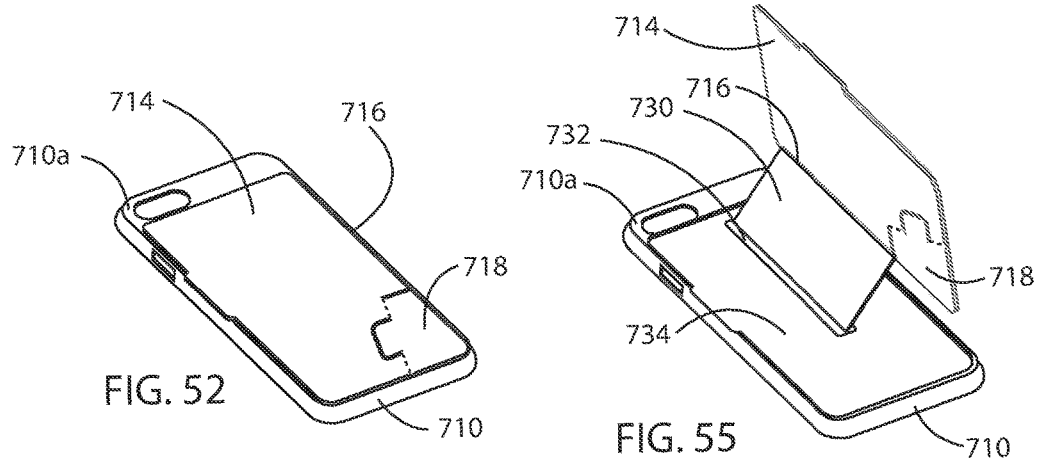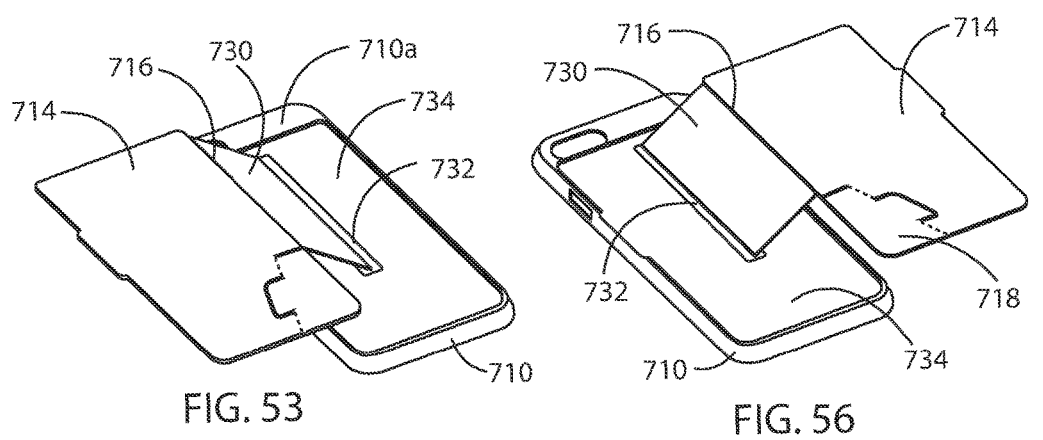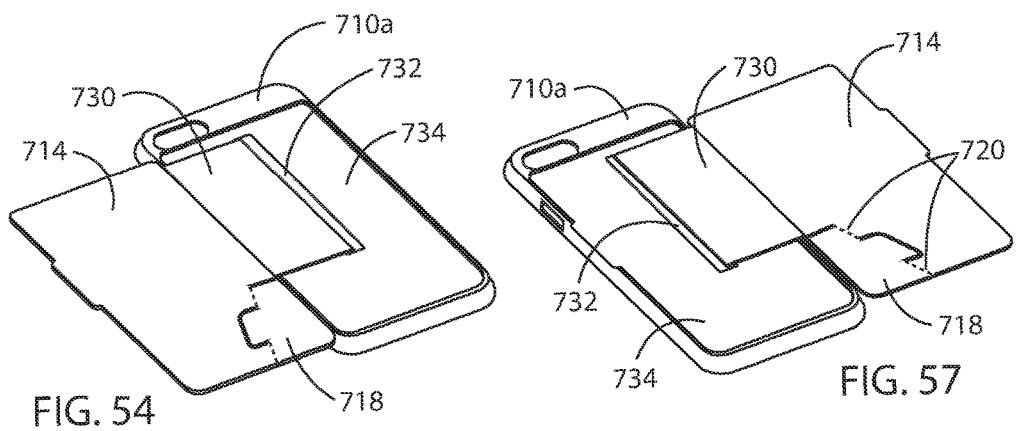

NOTCHED CASE FOR A PORTABLE, HAND-HELD ELECTRONIC DEVICE, SUCH AS A CELLULAR TELEPHONE, SMARTPHONE OR TABLET DEVICE

CROSS REFERENCE TO PRIOR APPLICATION

This application claims the benefit of prior filed U.S. Provisional Patent Application 62/277,311 filed Jan. 11, 2016; and U.S. Provisional Patent Application 62/340,774 filed May 24, 2016; and U.S. Provisional Patent Application 62/362,218 filed Jul. 14, 2016.

BACKGROUND OF THE INVENTION

Field of the Invention

This invention relates to covers for use on portable, hand held electronic, computing or Internet input and output devices, such as tablet computers, cellular or mobile smart-phones, e-book readers and similar devices.

Description of the Prior Art

Tablet computers and e-readers and similar type electronic devices have been on the market for a while, but with models such as the Kindle Fire, the Barnes and Noble Nook, and Apple iPad and iPad mini, the popularity of these electronic devices is greater than ever. All registered and unregistered trademarks mentioned in this application are the property of their respective owners. Traditional tablet and e-reader device covers typically protect the device from scratches and dents and some models allow the device to stand upright—hands free—for horizontal (or landscape) viewing. While these covers allow for the protection of the device, they do not typically address the human interaction of holding the device while the cover is on, sometimes making the device more difficult to hold by hand for extended periods of time.

SUMMARY OF THE INVENTION

The basic invention depicted is for a case for smartphones, cellphones, or similar type devices, such as tablet computers, that allows for certain protection against damages occurred from dropping, hitting, or other type of impact induced on the smartphone while attached to the case.

The case utilizes a unique integrated foldable panel design that when hinged to the side of the case and/or electronic device, and then folded into a defined position, creates a notch within the panel that allows the user to insert his or her hand into. The notch allows the user to more easily grasp and support the device within their hand and can reduce fatigue from lengthy periods of use.

There are two types of device cases that utilize the unique notch feature: an open-face case and a folio "book type" case.

The embodiment for the open-face case provides protection for the perimeter and backside of the smartphone with the front side, or face, open—exposing the front face of the smartphone. The term smartphone may be used in the following descriptions to reference similar type devices such as tablets.

The backside of the open-face case has an integrated panel that is connected to and hinges from one side of the case. The hinge allows the integrated panel to rotate away from the back of the case and be positioned to the side of the case—essentially creating a wing or arm to the side of the case.

The integrated panel on the backside of the case—which will be referred to as a wing/arm—consist of a subassembly of two individual panels that are connected together to form the wing/arm panel. The first panel of the wing/arm subassembly is connected and hinged to the side of the case. The second panel of the wing/arm subassembly is connected and hinged to the other side of the first subassembly panel. This second panel is longer than the first panel and has a unique "L" shape where the lower portion of the panel extends back to the side of the case from which the wing/arm is hinged from.

When the wing/arm is hinged and rotated away from the backside of the case and the wing/arm subassembly is hinged and folded into position, a notch is created to accept the user's hand. The notch is formed from the hinged and now perpendicular surface of the outer "L" shaped panel, the lower edge of the inner panel, and the side edge of the case. The interior surface of the now hinged "L" shaped panel conforms to the backside of the user's hand as well as the user's lower thumb. When the panel is rotated to create the notch, the unique "L" shape of panel creates a surface area in both perpendicular directions from the case. The surface area created from rotated "L" shaped panel prevents movement of the case and device laterally away from the user's hand when the hand is inserted into the notch. This interaction helps produces a secure fit for the case and device within the user's hand.

When the user's hand is inserted into the notch, the user can grasp the side of the case/device. The notch prevents lateral and downward movement of the case and thus secures the case in the hand. This relationship creates a cradling effect between the user's hand and the case and allows the case to be supported within the hand with little or no grasping of the hand.

The support created from the cradling aspect from the user's hand inserted into the notch on the wing/arm provides better handling of the smartphone or other electronic device for utilizing the interactive features of the front of the device—such as camera use or touch screen usage.

The backside of the case can have a recessed area for the hinged wing/arm panel to lay into. The recessed area allows the wing/arm to be flush to the backside of the case when the wing/arm is not rotated/extended and not being used. This ensures that the wing/arm does not interfere with the user's ability to access the case and smartphone from a pocket or similar storage area.

An optional design to the wing/arm subassembly panel would include an additional third panel positioned furthest from the case edge when the wing/arm subassembly is pivoted and extended away from the case. This additional panel hinges upward to perform as an easel to support the case at an angle when the case is placed horizontally on a surface for hands free horizontal viewing of the device.

The embodiment for the second type of case that utilizes the multi-segmented panel subassembly is for a folio type case for a smartphone or similar electronic devices. The folio case would include a cover panel that provides protection for the front of the electronic device in the same way standard folio cases provide. In this version, the subassembly that makes up the wing/arm—as previously described in the open-faced case—is integrated into the front panel of the folio case, utilizing the entire front panel for the subassembly of panels that creates the notch feature.

When the front panel of the folio case is hinged and rotated to the side of the device, the front panel can fold into a position that provides the same form and function of creating the notch and the perpendicular support surface as the previously described wing/arm panel that is attached to the back of the open-face case.

The front panel subassembly of the folio case would include an outer positioned third panel that hinges upward to create an easel for the case when viewing the case/device horizontally on a surface without using the user's hands.

An alternative version to the open-case design would consist of the wing/arm, as previously described, that has the ability to be positioned on either side of the case—allowing the user the option and flexibility to choose which side of the case they would like to utilize the notched wing/arm feature.

Another alternative version of the open-case design would consist of an integrated back panel (or wing/arm) as previously described in the version of the open-face case, but the panel consist of a single non-hinging rigid surface that has a "cut out" that forms the notch when the notched arm panel is rotated away and extended from the backside of the case.

In this version, the wing/arm could be used as an easel support for the case in a horizontal position. To achieve this, the wing/arm would be constructed of two rigid surfaces that hinge and fold to create an easel support for positioning the smartphone or device in a hands free horizontal position. The inside surface (closest to the side of the case) forms the base of the easel and the outside section hinges upward to support the case/device that is angled and in a horizontal position.

Another alternative design does not include a case. The wing/arm panel, as previously described, would be attached to a secondary section/panel that would be attached directly to the back of the smartphone or similar device.

According to one aspect of this invention, hand held case for facilitating use of a hand held electronic device includes a base upon which the hand held electronic device can be mounted. A hinged panel extends in an operative position at an angle relative to the base and to the hand held electronic device when mounted on the base. A notch is formed along a lower edge of the hinged panel and extends upwardly into the hinged panel. The notch is adjacent an edge along which the hinged panel is attachable and hinged relative to the base. A deflectable flap is joined to the hinged panel along a flap hinge. The flap extends over the notch when the hinged panel is in a closed position and is hinged to open the notch when a user positions his hand within the notch to hold the hand held electronic device. The flap includes a main flap panel and a tab. The tab and the main flap panel extend on opposite sides of the flap hinge so that the tab increases a rear surface arear engaging the user's hand when the flap engages the rear surface of the user's hand when the user holds the case and the hand held electronic device mountable thereon.

According to another aspect of this invention, a case configured to fit on the rear of an electronic device having a visual display on a front face. The case includes a panel with a peripheral lip extending from the panel. The peripheral lip surrounds and engages the electronic device when positioned on the panel. An arm is hinged relative to the panel and to shift from a retracted position in which the arm is flush with a back face of the panel to multiple extended positions in which the arm is positioned at an angle relative to the panel. The arm is longer along an edge spaced from an edge about which the arm is hinged to form a recessed notch adjacent the edge about which the arm is hinged. The recessed notch is large enough for insertion of a portion of a user's hand into the recessed notch for supporting the electronic device on the user's hand.

BRIEF DESCRIPTION OF THE DRAWINGS

FIG. 1 shows the electronic device cover with the electronic device enclosed in the cover "closed" position. The hinged door is also shown in the "closed" and unhinged position where it is secured to the back of the device cover.

FIG. 2 shows electronic device cover in the "open" position with the electronic device above the inside cover surface used to attach electronic device with elastic fasteners or other attachment method. The flap is shown closed—unhinged—and secured to the backside of device cover.

FIG. 10 shows a more detailed exploded view of parts.

FIGS. 52 thru 57 show the backside of an open-face case and illustrate the range of motion of a back panel that can be positioned on either side of the case and device. This positioning of the back panel is made possible by an additional integrated hinged panel that connects to the center of the backside of the case and to the edge of the back panel—allowing the back panel to be positioned on either side of the case when hinged.

DETAILED DESCRIPTION OF THE EMBODIMENTS

FIGS. 1-18 depict early versions of a knotched cover or case for use with an electronic device. A discussion of these early versions shown in FIGS. 1-37 is included in U.S. patent application Ser. No. 13/853,348 filed Mar. 29, 2013, incorporated herein by reference. FIGS. 1-17 and the portion of the specification discussing these Figures are included herein, because this discussion is believed to relevant to the newer embodiments depicted in FIGS. 18-75, especially as it relates to structural features included in the newer embodiments as well as to structural components that may differ but are nevertheless similar to earlier components. The claims included in this application are, however, mostly characteristic of the embodiments of FIGS. 18-75.

The unique nature of this invention is that it allows the user, utilizing a cover with the unique notch feature, to more easily hold their electronic device, devices such as, for example, e-readers and tablet computers, ie, Kindle Fire and/or iPad or iPad mini. The unique cover comes in different sizes to accommodate the variety of sizes of electronic devices, including devices as small as cell phones or "smart" phones, best seen in FIG. 13. Even though the cover sizes may differ, the function, the manufacturing, and structure are similar. The following describes certain manufacturing methods and materials for the production of the cover with the unique invention of a notch feature; however, the invention is not limited to the materials and manufacturing methods described below. The case with the notch feature, for example, could be produced from solid hard plastic materials or a combination of rigid plastic materials with flexible materials.

Figure 3:
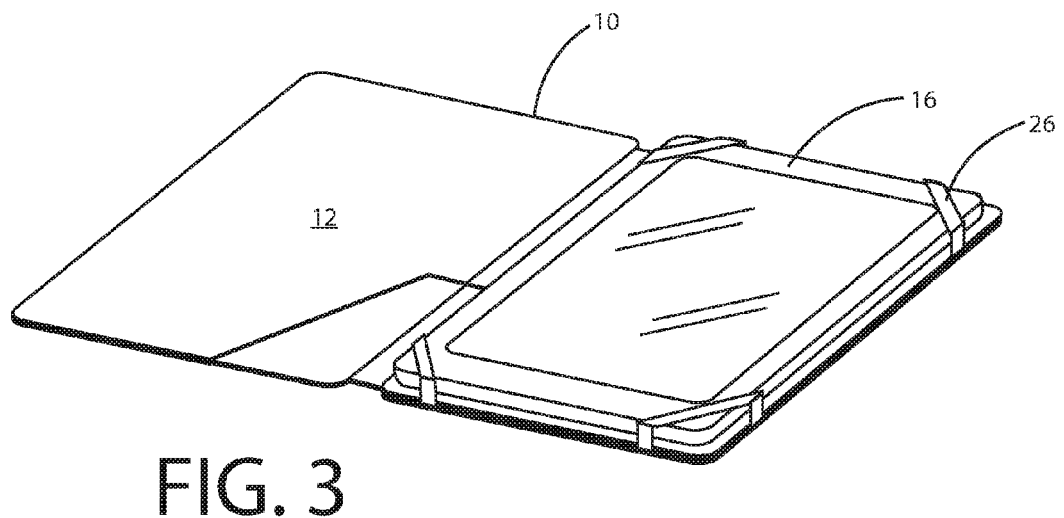
FIG. 3 shows cover in the "open" position with the electronic device exposed but securely attached with fasteners to the inside surface of electronic device cover. The flap is shown closed—unhinged—and secured to the backside of device cover.
Figure 4:
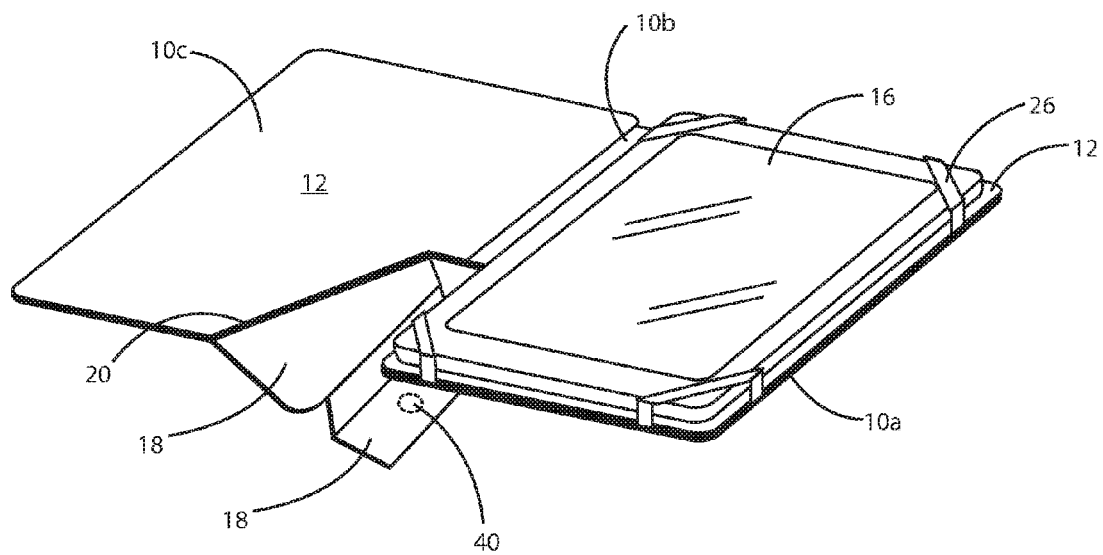
FIG. 4 shows cover in the "open" position with the electronic device exposed but securely attached with fasteners to the inside surface of electronic device cover. The hinged flap is in the "open" position, unfastened to the fastening surface on the back cover. With the hinged flap open, a tapered shaped notch, or open area, is created within the cover.
Figure 5:
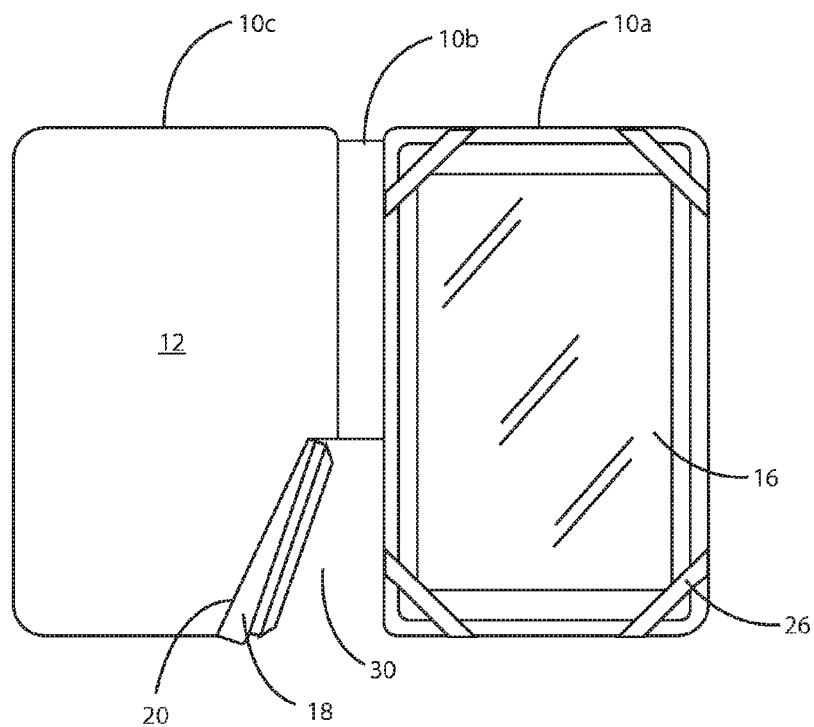
FIG. 5 shows a top view of the cover with the exposed tapered shaped notch created from the open hinged flap that is hinged downward.
Figure 6:
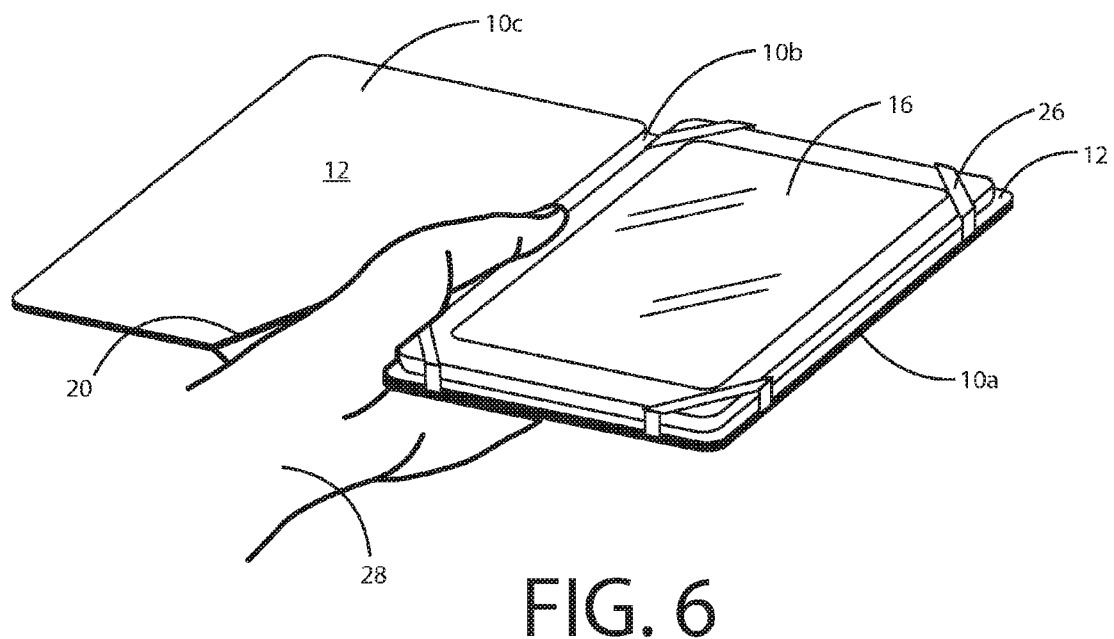
FIG. 6 shows the cover in the open position without the electronic device attached. The hinged flap is in the "open" position, exposing the tapered notch and a human hand is inserted into the notch cradling the electronic device.
Figure 16:
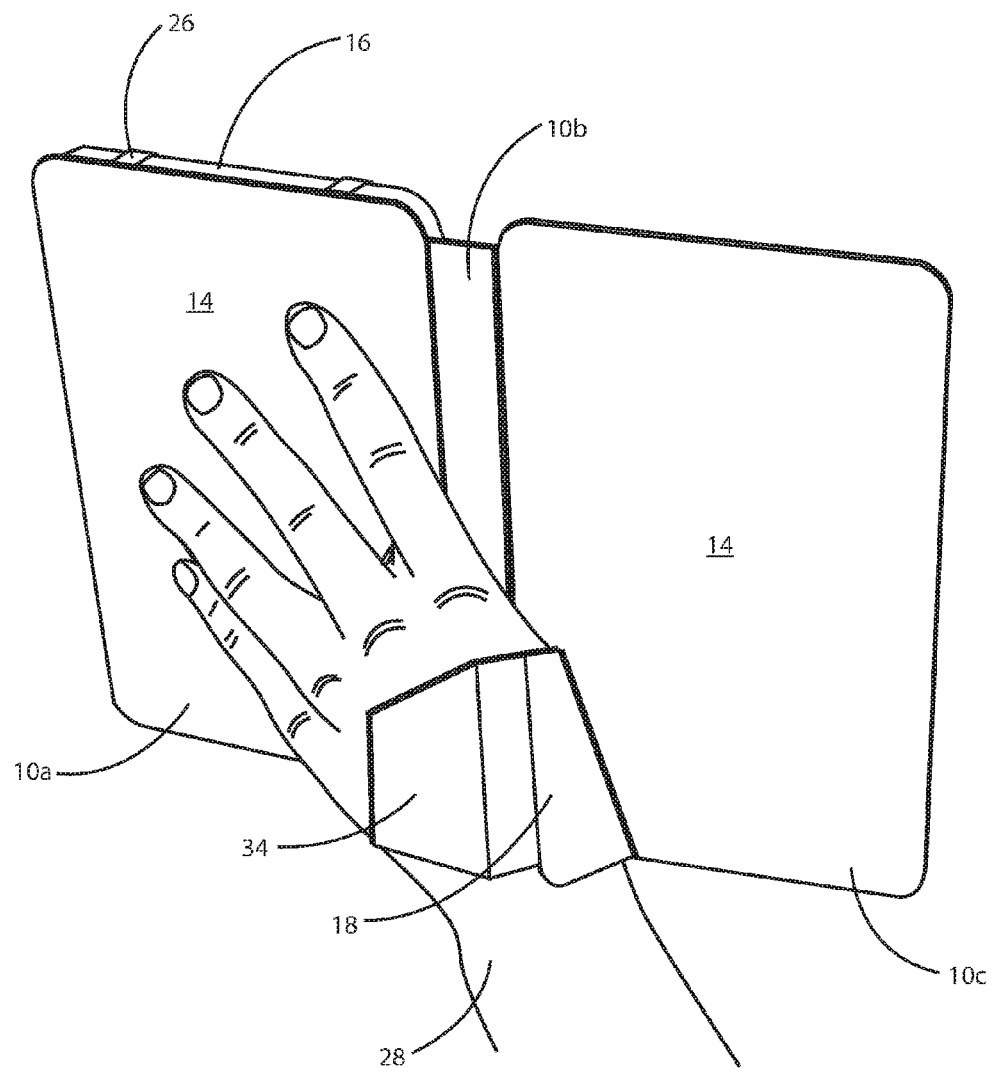
FIG. 16 shows the open device cover with a human hand that is inserted into the notch holding the electronic device. The hand is holding the device at a natural upward angle, appropriate for viewing the screen on the electronic device. The view shows the backside of the cover with the cover flap positioned on the backside of the hand.

The present invention of a cover 10 for an electronic device 16 is comprised of an integrated hinged flap 18, best seen in FIGS. 4 and 16. When the cover 10 is open and the hinged flap 18 is released from the cover's back panel 10*a*, best seen in FIGS. 3 and 4, a notch 30 or open area (best seen in FIG. 5) is exposed on the lower mid section of the cover 10. This notch 30 creates an opening that allows the hand 28 to be inserted into the mid section of cover 10 and allows the device 16 to be held and supported by the hand 28 more securely and freely, best seen in FIGS. 6 and 12. With the hand being inserted into the open notch 30, a cradling aspect is created from the natural position of the hand 28 and the cover 10, keeping the device 16 securely positioned in the hand—best seen in FIGS. 12 and 16. Much of the weight of the device 16 is transferred to the gap created between the thumb and the index finger, allowing the hand 28 to hold the device 16 while attached to the cover 10 with little or no grasping effort. The cradling aspect between the cover 10 and the hand 28 prevents the device 16 from dropping downward or moving significantly from side to side when the cover 10 is held at an angle from the flat horizontal position, best seen in FIG. 12.

The basic structure of the invention is a cover 10 that is slightly larger than the electronic device 16 that it encloses, best seen in FIGS. 2 and 3. The cover 10 is comprised of three panel surfaces that are hinged together to form a folding "book" like structure that encases the electronic device 16. The three surface panels consist of a back panel 10*a* that is attached by a hinge to a center (spine) panel 10*b*. The center panel 10*b* is attached by a hinge to the front panel 10*c*. These three panels, best seen in FIG. 2, form the basic foldable "book" like cover 10 structure—which the electronic device 16 is attached to.

The three main panels—(back 10*a*, center 10*b*, and front 10*c*)—that make up the "book" like structure of the cover 10 are comprised of multiple materials that form an outer surface 14 (best seen in FIGS. 7 and 8) and an inner surface 12 for each panel, best seen in FIG. 2. The outer surfaces 14 (the surfaces that are exposed when the cover is closed) are comprised of a durable material such as leather, or "leather like" material, or a fabric material, best seen in FIG. 1. The inner surface 12 is comprised of a softer fabric material that is in contact with the electronic device 16 when the electronic device 16 is attached, best seen in FIGS. 3 and 4. Adhered to the outer and inner surface materials is a rigid paper board material 32 (or other thin rigid material), which gives the three main panels their rigidity, best seen in FIGS. 9 and 10. The outer and inner surfaces are glued and sewn together to form the panel structures—consisting of the back panel 10*a*, the center panel 10*b*, and the front panel 10*c*, best seen in FIGS. 9 and 10.

The three main panels—consisting of the back panel 10*a*, the center panel 10*b*, and the front panel 10*c*—are connected to each other by a continuation of panel materials that make up the cover. The main panels are separated and defined by the elimination of the rigid material 32 in-between the panels, best seen in FIG. 10. The elimination of the rigid material 32 creates a living hinge 42 between the panel sections. These rigid panel sections define the three main panels that create the cover consisting of the back panel 10*a*, the center panel 10*b*, and the front panel 10*c*, best seen in FIGS. 9 and 10.

The following is a detailed description for each of the panels that make the cover structure.

The back panel 10*a* is comprised of three layers and is the panel which the electronic device is attached to. The layers of materials are glued and sewn together to form the panel structure. The outer surface 14 of the back panel 10*a* is comprised of a durable surface material 14 (along with the rigid board material 32 as described above). The inner panel surface 12 is a softer material and is also adhered to the rigid board material 32 (as described above) and is the surface where the electronic device 16 is attached to through such methods as elastic loop fasteners 26 that are sewn onto the inside surface 12 of back panel 10*a*, best seen in FIG. 2. Another form of electronic device 16 attachment can be achieved by inserting the electronic device 16 into a pocket sleeve 44 (possibly made out of similar fabric materials) that is sewn or adhered to the back panel 10*a* inner surface 12, best seen in FIG. 11. Pocket sleeve 44 can also be considered to comprise a fastener. In-between and adhered to the outer and inner surface materials of the back panel is an additional layer comprised of a rigid plastic sheet 36 (or similar rigid material), best seen in FIGS. 9 and 10. A portion of this middle layer is exposed on the outer surface of the back panel 10*a* from a cut-out section 24 in the outer surface of the back panel, best seen in FIGS. 7 and 8. This exposed surface 34 is covered with the same material as that of the outer surface 14 which is the durable outer skin material. This exposed surface 34 matches the contour shape of the flap 18 where the flap 18 overlaps with the back panel 10*a* when the flap is in the closed position. This cut out section 24 and exposed portion 34 is where the flap 18 is magnetically attached when it is secured to the cover's back panel 10*a*. The cut-out section 24 on the back panel 10*a* also allows the flap 18 to be flush with the surface of the back panel 10*a* when the flap 18 is attached, best seen in FIG. 8. Adhered to the underside of this exposed fastening surface 34 of the middle surface material is a magnet 38 that secures the flap 18 (with its own magnet 40) to this surface 34 when the flap 18 is closed, best seen in FIG. 7.

Figure 7:
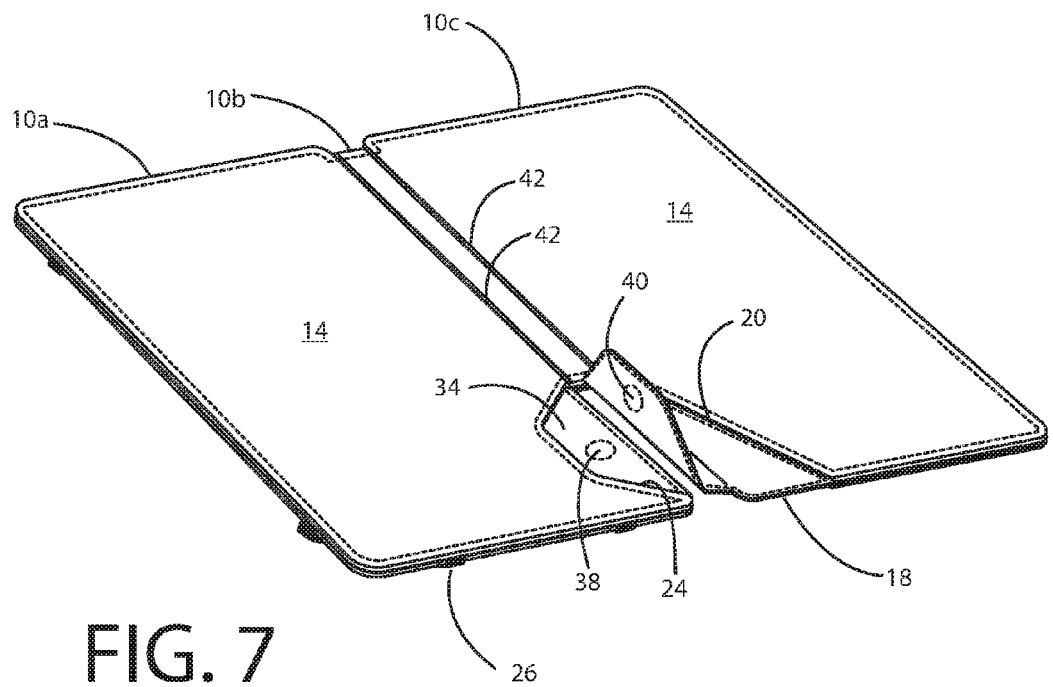
FIG. 7 shows the backside of the open device cover with the magnetically attached hinged flap slightly above the fastening surface on the back cover.
Figure 8:
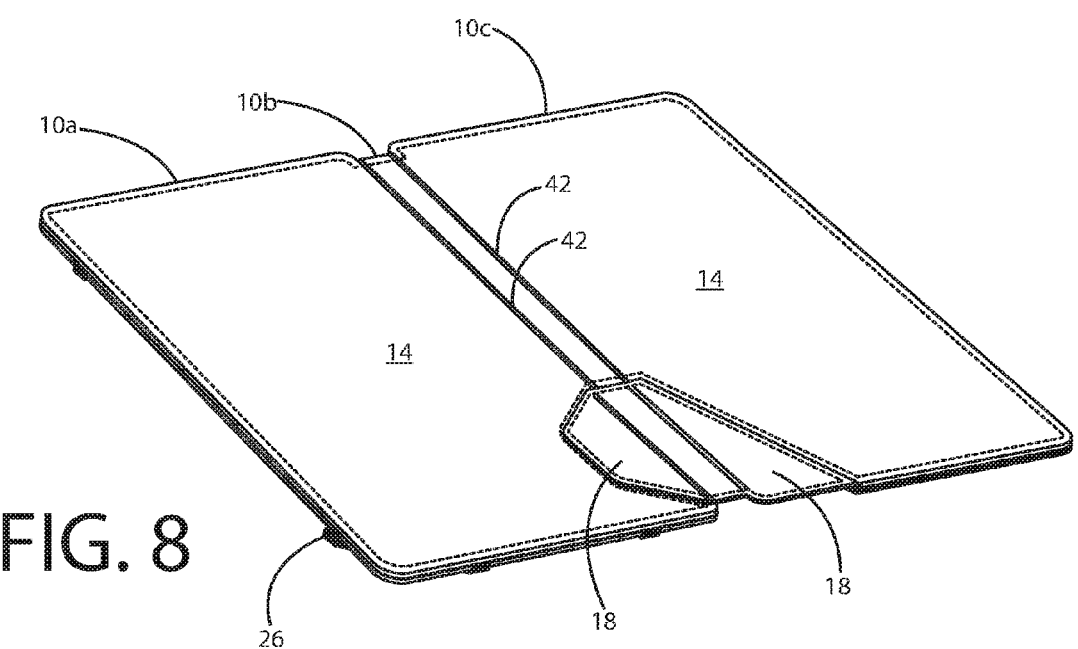
FIG. 8 shows the backside of the open device cover with the flap in the closed position—magnetically attached to the covers back surface.
Figure 9:
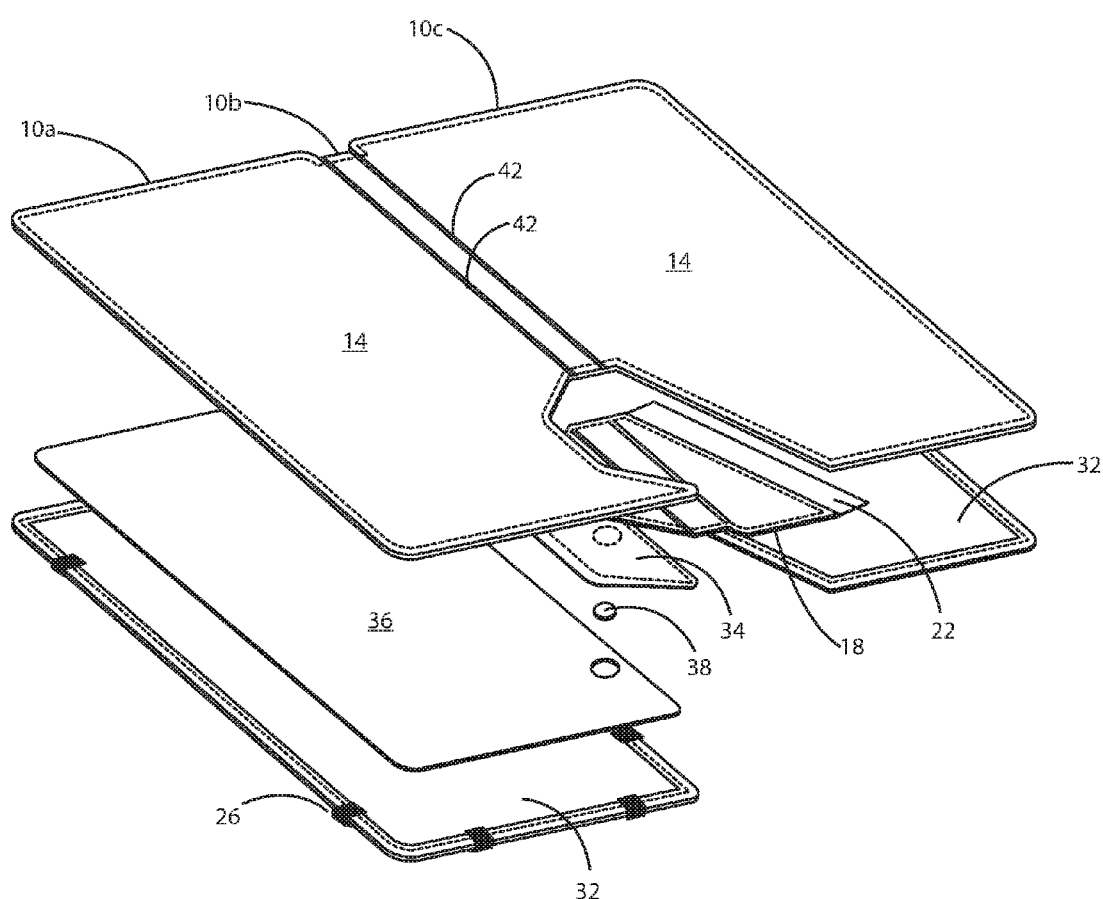
FIGS. 9 and 10 show exploded views of the components that make up the structure of the device with the back of the cover faced upward.
Figure 10:
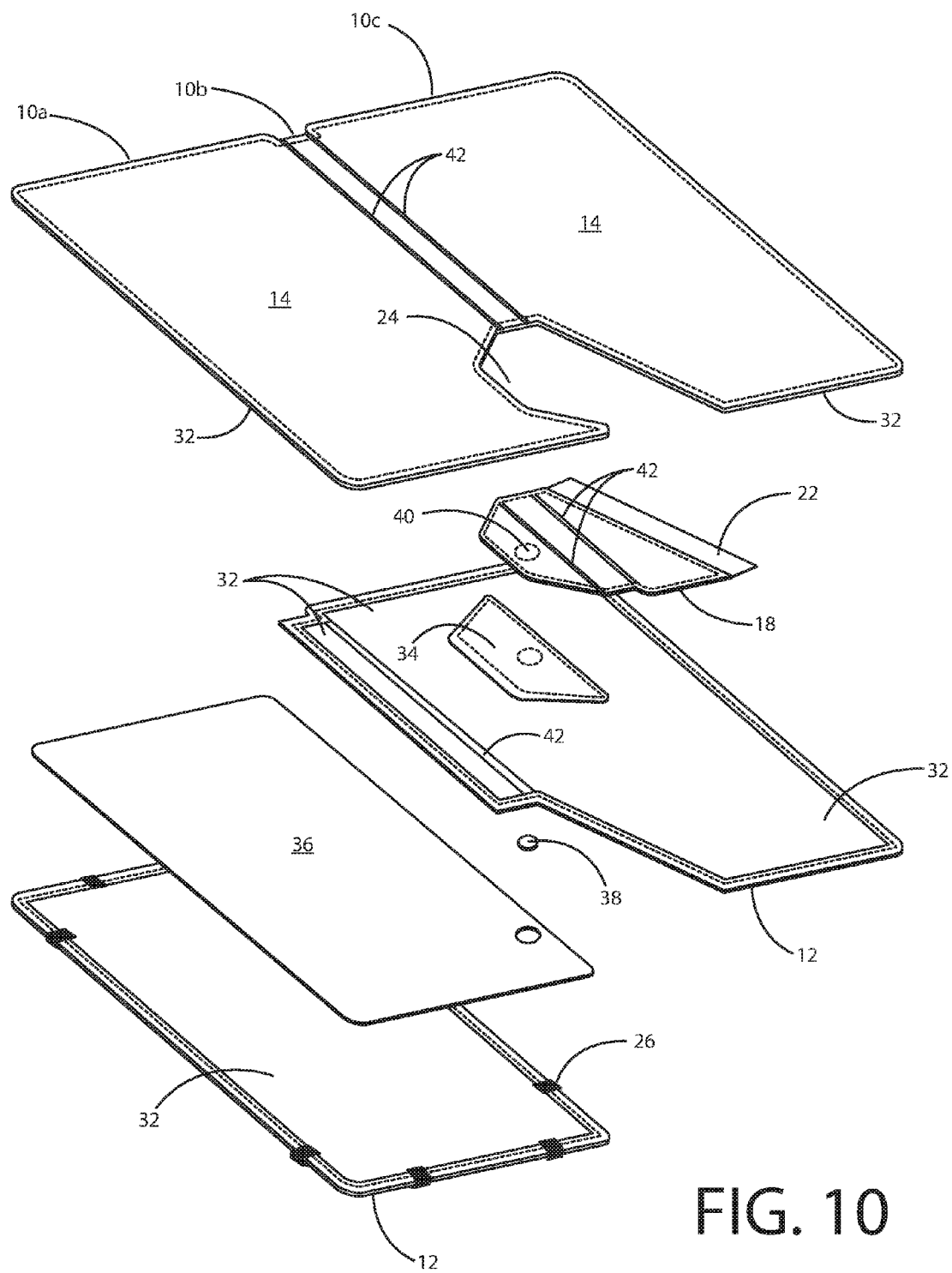
Figure 11:
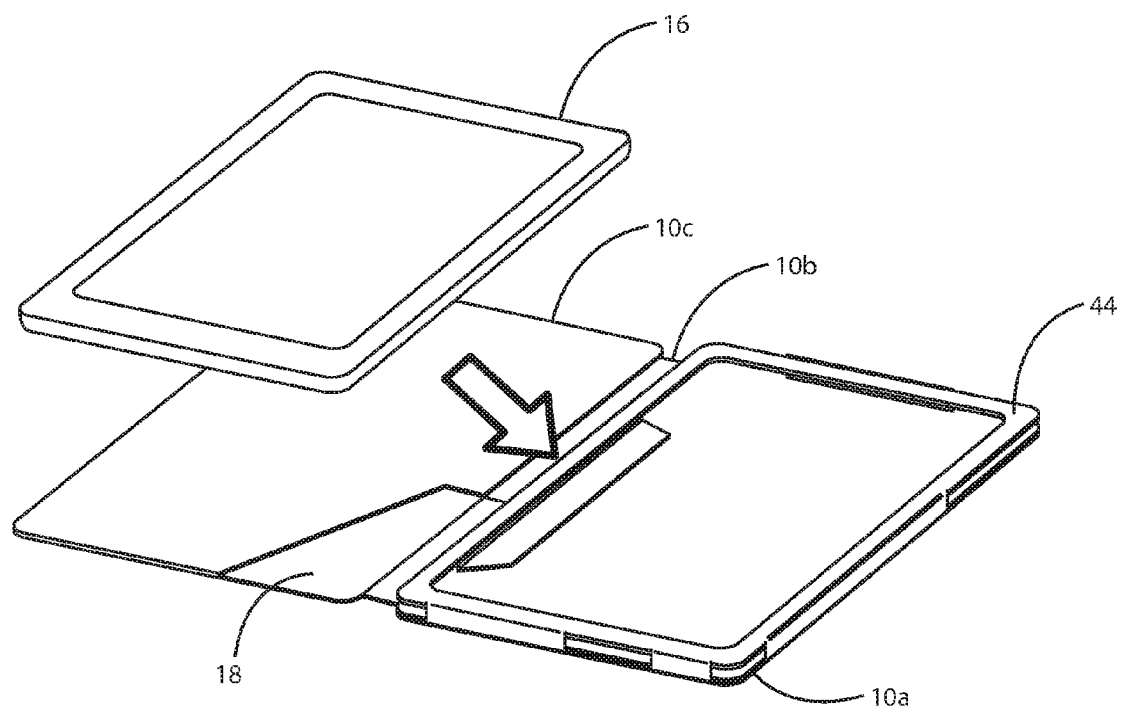
FIG. 11 shows the open device cover with an alternative method for attaching the electronic device—by way of a sleeve for device to slide into. The electronic device is shown to the right side of the sleeve where it slides into (shown with a directional arrow for clarity).

The center panel 10*b*, or spine, is connected to both the back panel 10*a* and front panel 10*c* by a "living" hinge 42 that is created by eliminating the rigid "board" like material 32 from the inner 12 and outer 14 surface materials, best seen in FIGS. 2,7, and 8. The rigid surface of the center panel provides a natural placement location for the hand's thumb to grasp the cover when the hand is inserted into the notch of the cover, best seen in FIGS. 12 and 13.

The front panel 10*c* is connected to the center panel 10*b* by way of a living hinge 42 as previously described. This panel—10*c*—is comprised of two layers—a durable outer material 14 and a softer inner material 12 (with each material glued to a rigid board material 32 that provides rigidity as previously described). The outer and inner surfaces are glued and sewn together to form the front panel 10*c* structure. Integrated into the front panel 10*c* structure of the cover 10 is a "flap" panel 18 that is attached and additionally hinged to the cover's front panel 10*c* structure, best seen in FIG. 4. The hinged flap 18 is attached to front panel 10*c* by a tab 22 (on the flap 18) that is glued and sewn to the outer and inner surfaces on the front panel 10*c*, best seen in FIGS. 9 and 10. The tab 22 is made from flexible material, such as the softer material used for the inner panels 12 of the cover 10. The flexible material that makes the tab 22 acts as a hinge 20 for the flap 18 to pivot on, best seen in FIG. 4. The flap 18 structure is composed of three connected panels that hinge by way of living hinge 42, best seen in FIG. 10, so that the flap 18 will conform to the shape of the cover 10 when the cover 10 is open (best seen in FIGS. 7 and 8)—or when the cover is closed (best seen in FIG. 1) and the flap 18 is magnetically attached to the back panel 10*a*.

The flap 18 is composed of similar materials to that of the cover 10 material. The outer surface 14 is a durable material that matches the outer material 14 of the cover 10 while the inner surface 12 matches the material of the inner surface 12 of the cover 10. Rigid board material panels 32 are adhered to both the outer 14 and inner 12 surface materials and these panels are adhered to each other. In-between the outer surface and inner surface material of the flap is a magnet 40 that is used to secure the flap 18 to the outside of the back panel 10*a*, best seen in FIGS. 7, 8 and 10.

The three primary cover panels—consisting of the back panel 10*a*, the center panel 10*b*, and the front panel 10*c*—are connected to each other through living hinges 42 as previously described, which allow the cover 10 structure to fold and close like a book, best seen in FIG. 1. When the cover 10 is in the open position, the electronic device 16 is exposed and is usable, best seen in FIGS. 3 and 6.

The hinged flap 18, as previously described, is the main component of the disclosed invention for a cover 10 for an electronic device 16. When the cover 10 is in the open position, the hinged flap 18 is released from the magnetic fastener (or other fastening system) on the back panel 10*a* of the cover 10. An open area 30—or notch—is exposed from the release of the flap which allows a user's hand 28 to be inserted into the open area 30 and cradle the electronic device 16 and/or cover 10 more securely and freely—while the device 16 is securely attached to the cover 10 structure, best seen in FIGS. 4, 5, and 6.

Figure 17:
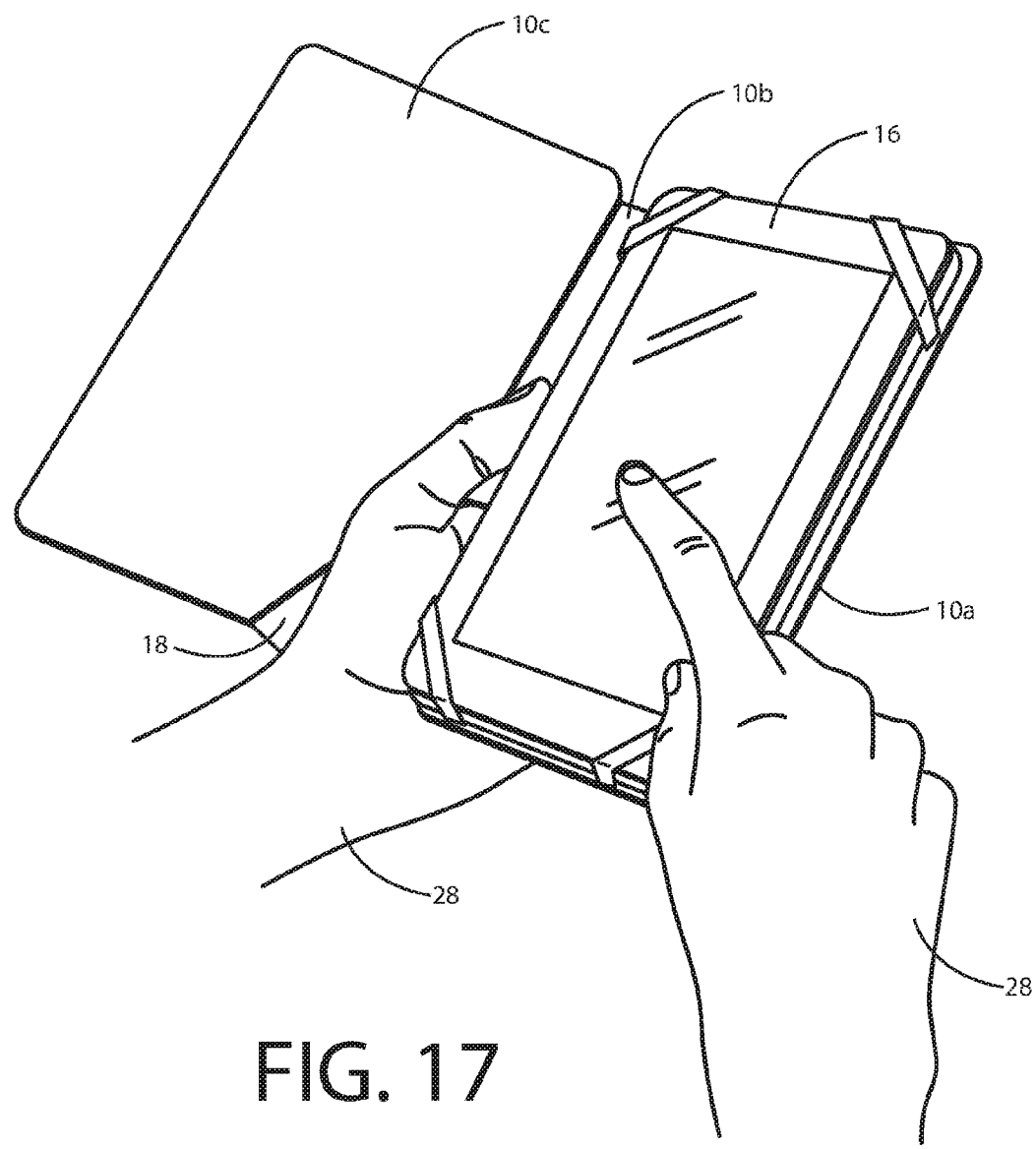
FIG. 17 shows how the cover allows a portable, handheld electronic device to be held in one hand at a position which will allow input with the opposite hand in a position to promote hand eye coordination, since the two hands will be generally side by side.

The angle for the hinge 20 of the flap 18 is significant. In the representative embodiment, the flap hinge 20 is angled at 25 degrees (plus or minus 5 degrees) to the vertical spine (or center panel 10*b*) of the cover, best seen in FIG. 5, although other angles may be acceptable. The angle of the flap hinge 20 is what creates a tapered shaped notch 30. This tapered shape allows the cover to conform around the hand 28 when the hand 28 is inserted into the open area 30 (notch) created from the release of the hinged flap 18. The tapered shaped notch 30 produces a tighter fit to the hand 28 as the open space between the cover 10 and the hand 28 is narrowed—by the further advancement of the hand 28 into the notch 30. As the angle of the notch 30 narrows, the fit between the hand 28 and the cover 10 becomes more secure and snug, best seen in FIGS. 6 and 12. With the hand 28 inserted into the notch 30 and holding the electronic device 16 securely, the users other hand is free to interact with the electronic device 16, as best seen in FIG. 17.

Because the flap hinge 20 is attached and integrated into and between the materials of the front panel 10*c* of the cover 10, the flap 18 does not rotate freely past 90 degrees of the hinge 20 and loosely hangs at an angle normally around 45 degrees, best seen in FIG. 4. This allows the inside of the flap 18 to loosely conform to the backside of the hand 28 when the hand 28 is inserted into the notch 30, best seen in FIG. 16. This provides a more secure feel and fit for the user.

The notch 30 may vary in size, depending on the hand size of the user or device size. For example; a child may utilize a cover with a smaller notch 30 to better conform the child's smaller hand. Users with larger hands may utilize a cover with a larger notch 30 that would better fit to the size of a larger hand. A cover for a smaller electronic device, such as a smart phone, may utilize a smaller notch.

The following describes the user interface with the unique cover design. The user begins with opening the cover 10 which exposes the electronic device 16 attached within. The user then releases the magnetically secured hinged flap 18 from the back panel 10*a* of the cover 10, best seen in FIGS. 3 and 4. Once the notch 30 is exposed from the opening of the hinged flap 18, the hand 28 is inserted into the notch 30 on the cover 10 in the following manner. The hand 28 is positioned with the palm up and the thumb and index finger spread apart and inserted into the open notch area 30. The electronic device 16 and/or spine 10B of cover can be grasped with the hand 28 by the closing of the thumb and index finger(s), thus grasping the electronic device and cover with the thumb and index finger(s) with fingers being positioned under the backside of the cover 10*a* and electronic device 16, best seen in FIG. 6 and FIG. 17.

The notch 30 in the cover 10 provides a cradling support between the hand 28 and the cover 10. The cradling effect (created from the notch 30 and hand 28 interaction with the cover, best seen in FIGS. 12 and 16) allows the cover 10 (with electronic device 16 attached) to rest against the gap between the thumb and the index finger and prevents the cover 10 with device 16 from moving left or right from the hand. When the hand 28 (inserted into the notch 30 of the cover 10) and electronic device 16 are angled upward toward the user, gravity keeps the cover 10 and device 16 securely positioned and cradled in the hand 28 with little or no grasping effort, best seen in FIG. 12. This feature is significant in preventing user fatigue from extended use of hand holding of the electronic device.

Figure 12:
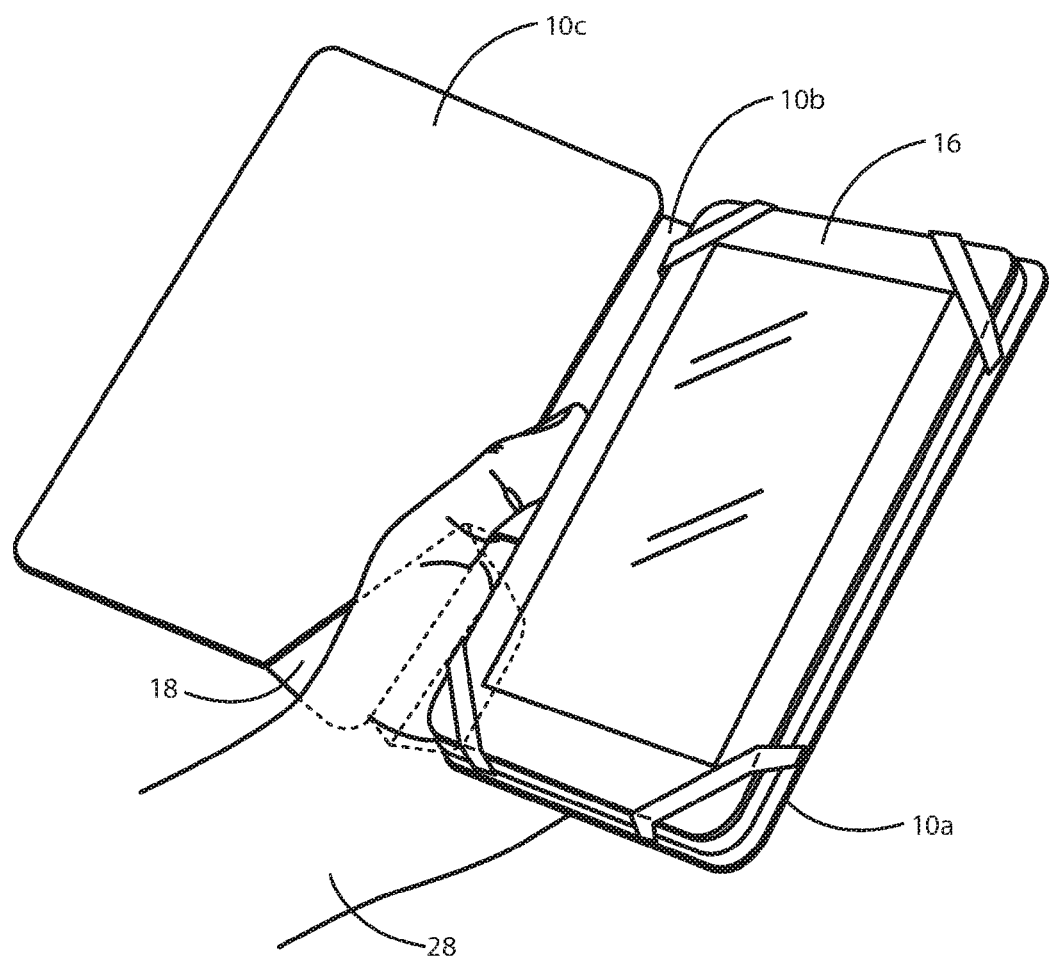
FIG. 12 shows the open device cover with a human hand that is inserted into the notch holding the electronic device. The hand is holding the device at a natural upward angle appropriate for viewing the screen on the electronic device.
Figure 13:
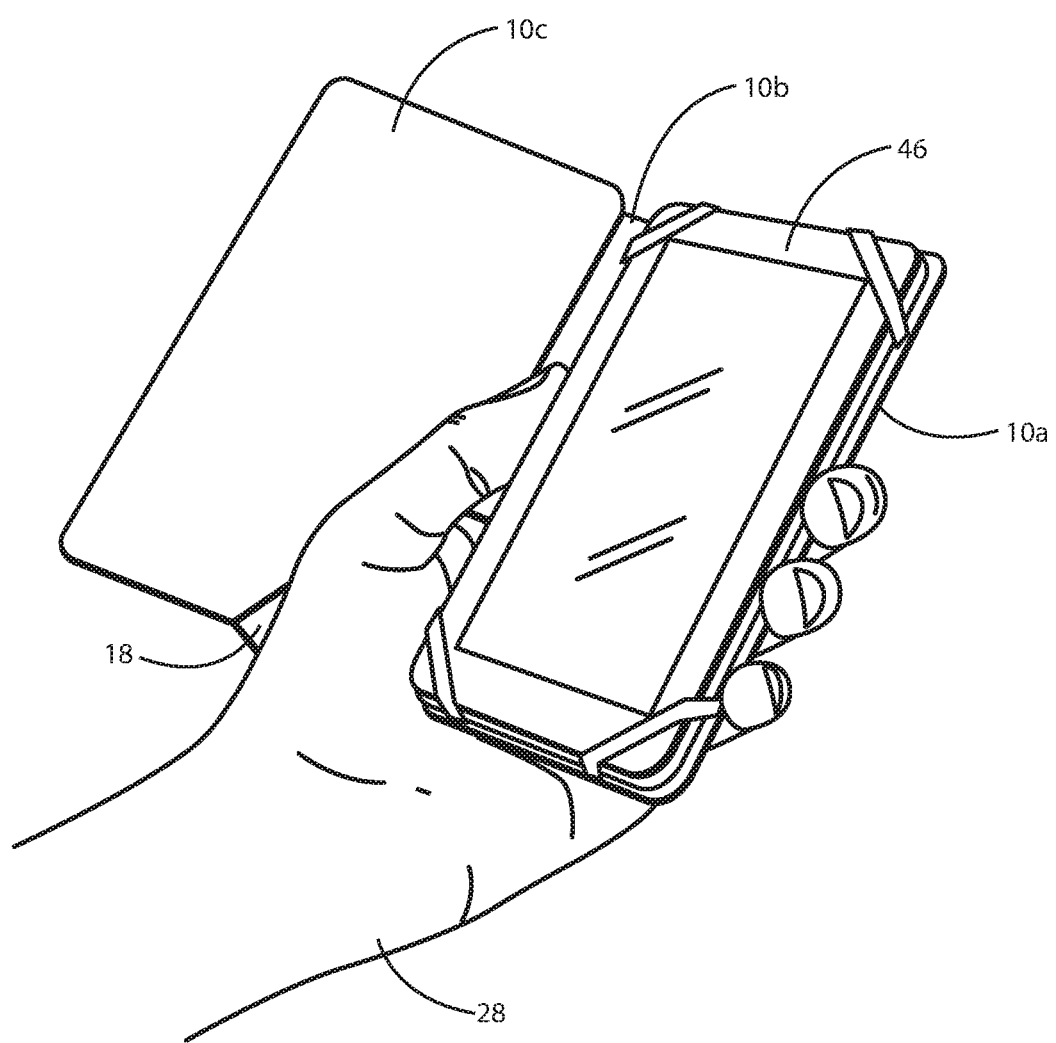
FIG. 13 shows an alternate version for a cover designed for smaller electronic devices, such as smart phones. The cover is shown open with device attached and a human hand is inserted into the notch holding the electronic device.

When utilizing the cover, the notch positions the support hand 28, or left hand, at an elevated position on the device, about half way up the device, best seen in FIG. 12. This places the support hand and the data entry, or right hand, at approximately the same elevation when entering data into the device, or interacting with the device with your data entry hand, best seen in FIG. 17. This positioning of the hands, while interacting with the device, supports hand-eye coordination because of a more natural position for the hands to be placed in while interacting, or entering data, with the device. With the user's two hands positioned beside each other in a more natural position, as they are when using the cover with the notch, the user has greater control of the electronic device which leads to better hand-eye coordination when entering data into the device. This feature can be particularly advantageous when using the electronic device for playing games where hand/eye coordination is needed.

When the hinged flap 18 is not utilized and is fastened to the back panel 10*a* of the cover, the cover 10 operates as a normal cover creating a uniform cover that provides full protective coverage over the surface of the electronic device 16, best seen in FIGS. 1,3, and 8.

In an alternative design version, the notch 30 can be integrated into the cover without a flap 18. The notch 30 is simply an exposed open space when the cover is in the open position that does not have a flap 18—which is used to close off the open space.

Another design alternative offers a version with the notch 30 on the right side of the open cover 10 and the device 16 mounted to the left side of the open cover—basically a mirror image of the former detailed description. This version specifically addresses the needs of users who prefer to hold the device in their right hand.

Figure 14:
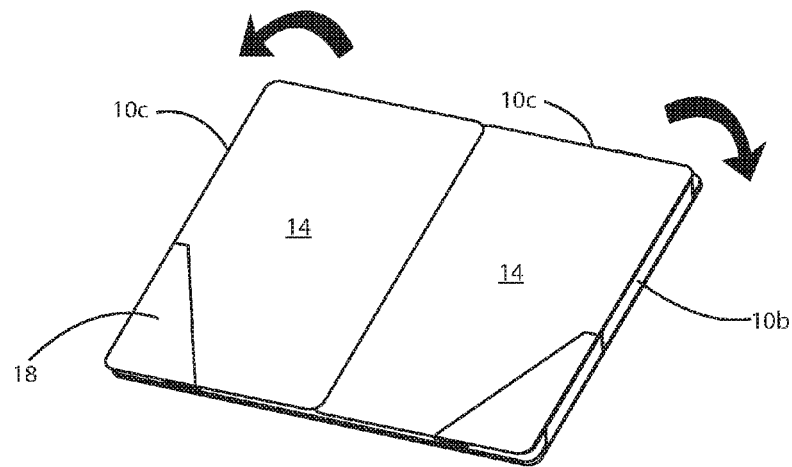
FIGS. 14 and 15 shows an alternate version for a cover designed with two overlapping covers that provide notches on either side of the electronic device allowing the user to hold the device with either hand or both hands. The electronic device is shown in the horizontal position, but the cover could be designed for either horizontal or vertical device layout.
Figure 15:
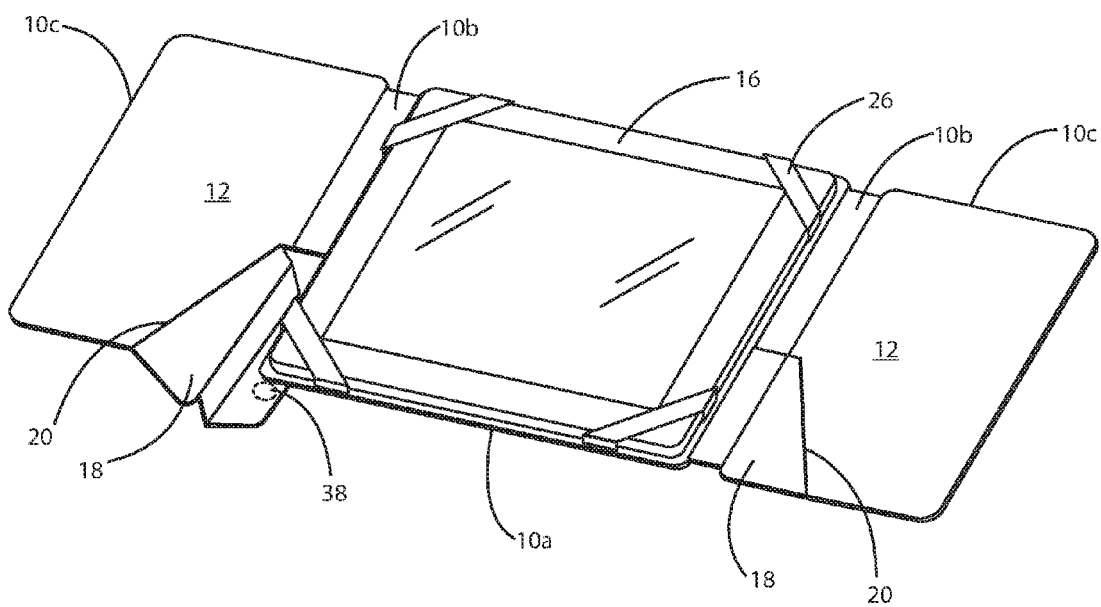

Yet another alternative design offers a version with the notch 30 on both the right and left sides of the open cover 10—a cover that consist of 2 top panels 10*c* with a notch 30 integrated into each top panel, best seen in FIGS. 14 and 15. The device 16 is mounted in the center of the open covers. If one of the top panels 10*c* (with the notch) is not used, it can fold back and attach to the back surface of the back panel 10*a*. If the cover is closed, the two top panels fold inward and can be attached to each other through various fastening systems.

The unique cover design is not limited to electronic devices that are oriented in a vertical position as illustrated in most of the drawings. The cover can be designed to utilize electronic devices that are oriented in a horizontal position (or landscape position), as best seen in FIG. 15.

The unique invention of this cover is not limited to a single cover product as described in this application and may be integrated as a component of other products or devices. Likewise, other features may be incorporated into the unique cover, such as pockets to hold other devices or accessories such as cell phones, etc. Straps may be integrated as a feature of the cover to aid in carrying or transporting.

The embodiments depicted in FIGS. 18-38 are primarily intended for use with smaller electronic devices, especially cell phones or smartphones that employ a full display on one surface (typically the front surface) of the device. These embodiments employ a case that utilizes an integrated multi-segmented panel that when rotated and located to the side of the case and/or device, and the subassembly of this panel is hinged into a defined position, the folded structure of the subassembly creates a notch in which a user's hand can be inserted into to more easily grasp and support the side of the case and electronic device within.

The embodiments that employ the notched panel are depicted within two types of cases: an open-face case as depicted in FIGS. 18-28 and 37-38, and a closed folio "book type" case as depicted in FIGS. 29-35.

Figure 18:
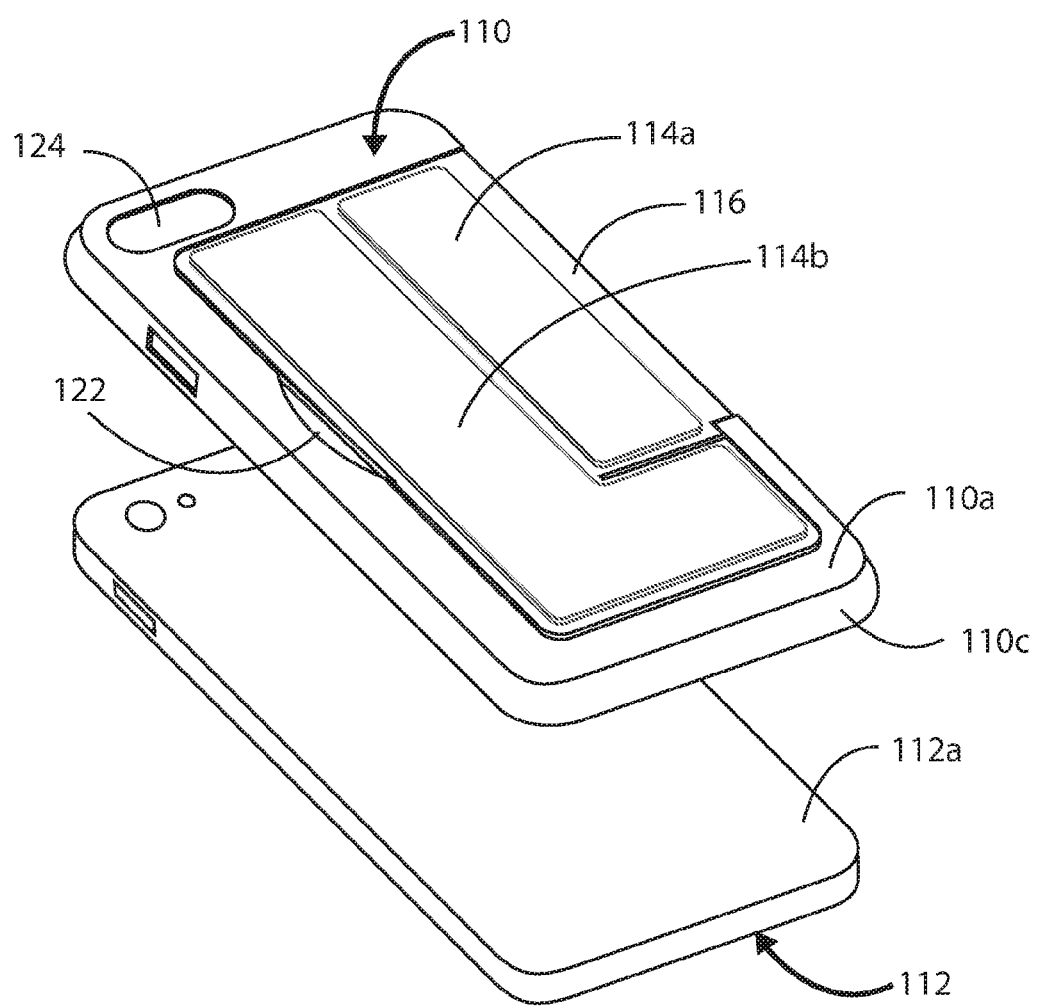
FIG. 18 shows the backside of the basic invention for an open-face smartphone/cellphone case with the unattached smartphone/cellphone positioned below the case. The wing or arm (which will be referred to as wing/arm) is shown in the closed position.
Figure 19:
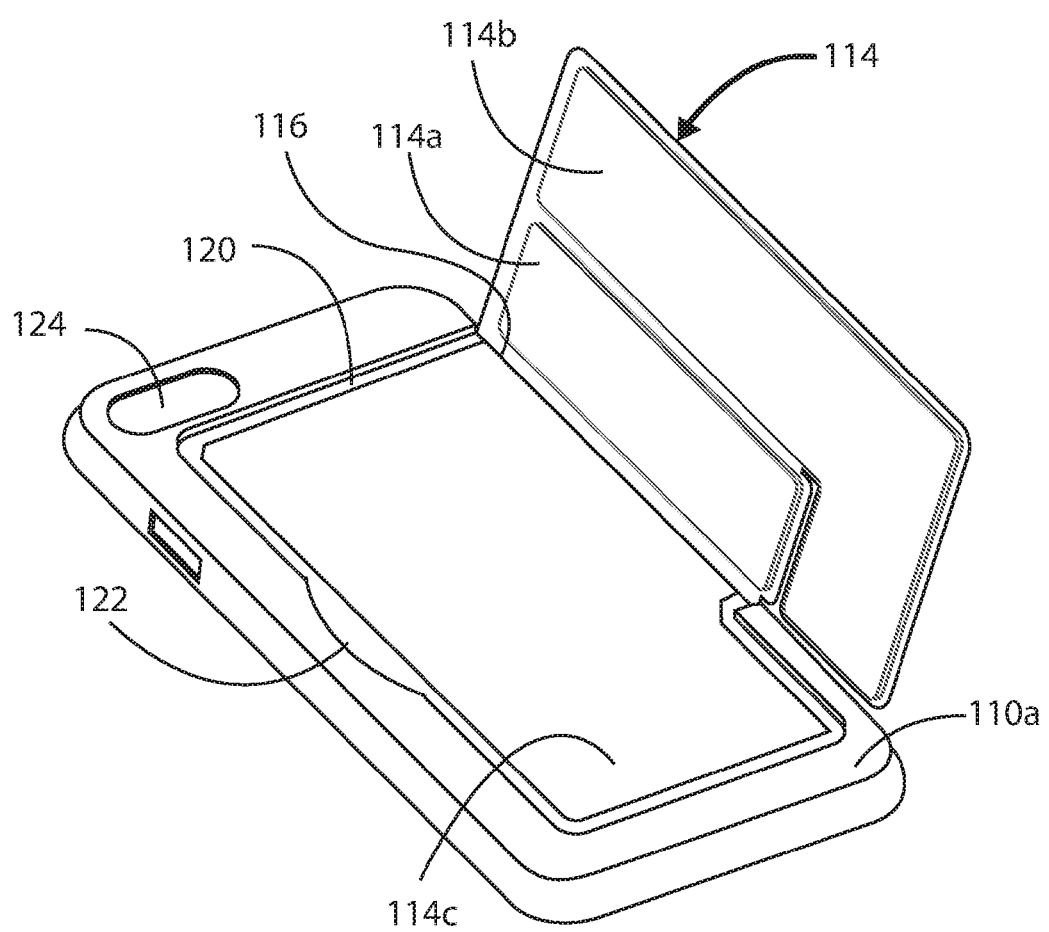
FIG. 19 shows the backside of the basic invention for an open-face smartphone/cellphone case with the wing/arm shown partially rotated or pivoted. The two rigid surfaces that make up the wing/arm are not yet in the hinged position. The recessed area on the backside of the case is shown where the wing/arm is stored when not used.
Figure 20:
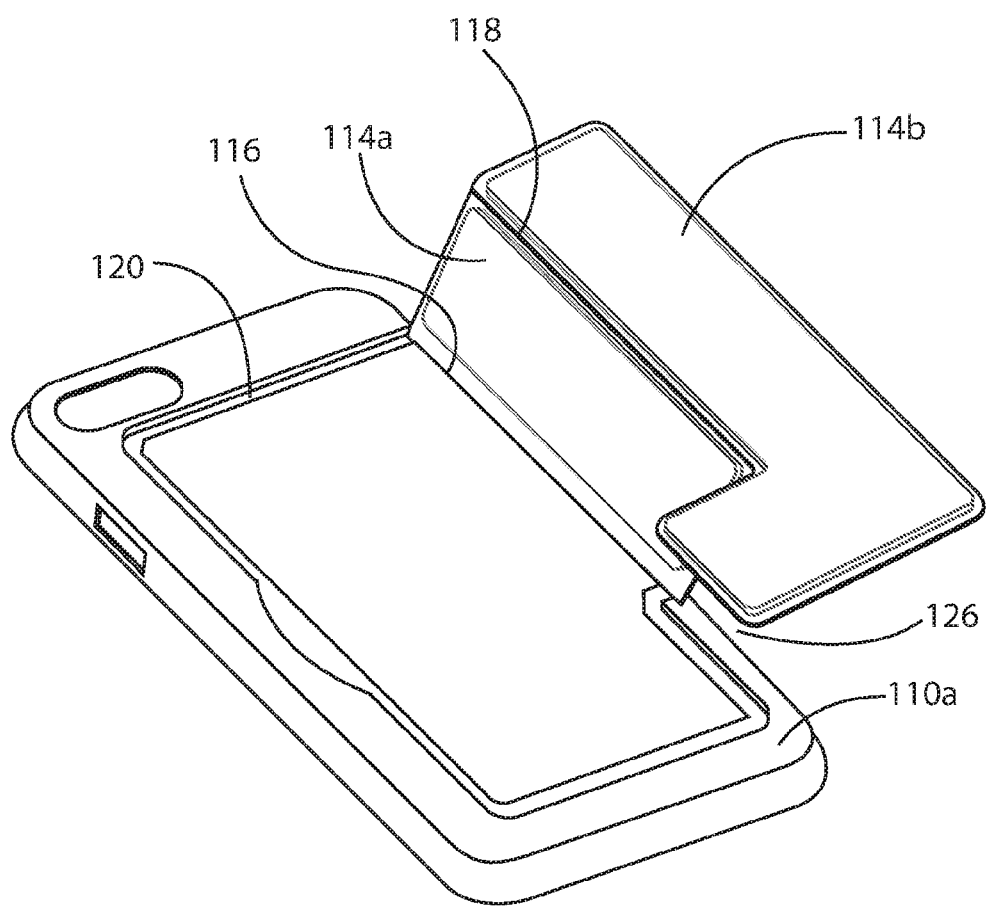
FIG. 20 shows the backside of the basic invention for a open-face smartphone/cellphone case with the wing/arm that consist of the two rigid surfaces in a hinged position showing how the panel subassembly hinges.
Figure 21:
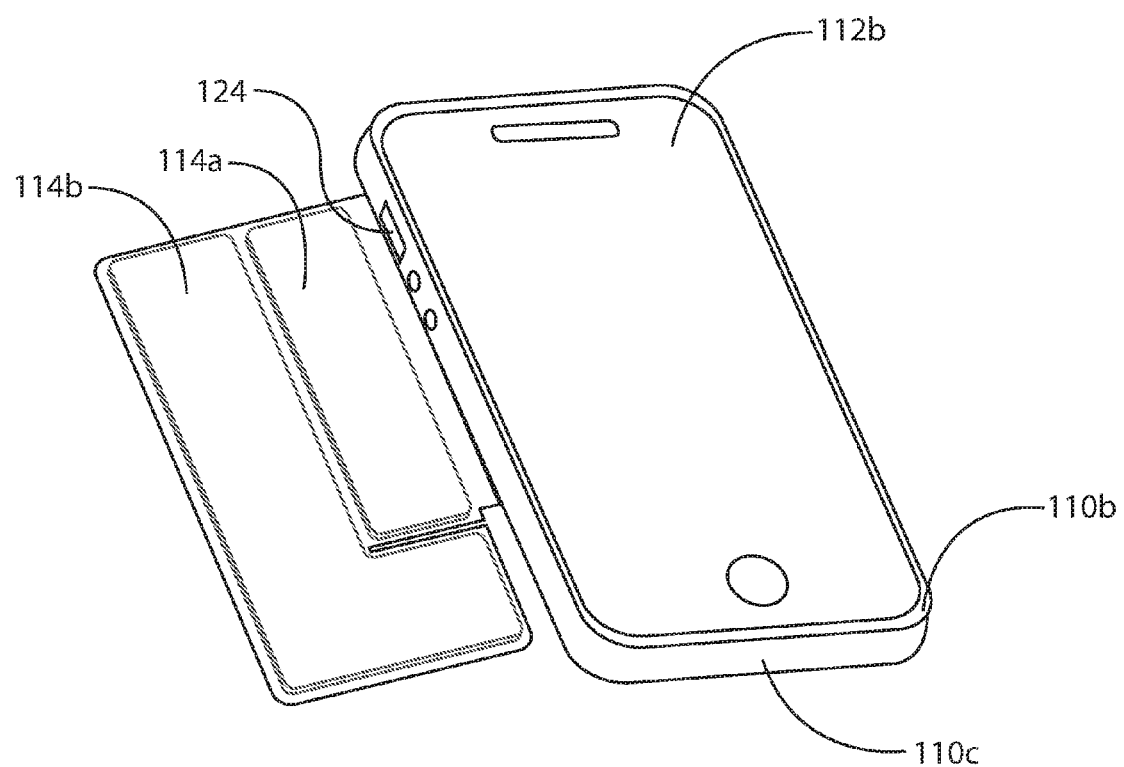
FIG. 21 shows the frontside of the open-face case with an attached smartphone or similar device. The wing/arm is shown rotated or pivoted. The two rigid surfaces that make up the wing/arm are not yet in the hinged position.

The embodiment depicted in FIGS. 18-28 employs an open-face case 110 that fits on the rear face 110*a* of a smartphone 112 opposite the display on the front face 112*b* of that device. The case has a peripheral lip 110*c* that fits around the edge of the smartphone 112 so that the phone 112 fits within a cavity that is approximately the same size as the phone 112. The open-face version of the case does not employ a cover, and the multi-segmented pivoting panel, which will be referred to as a wing/arm 114, does not cover the display face 112*b* on the front of the smartphone or electronic device. This device display face 112*b* is not obstructed when the wing/arm 114 is either in the retracted position, as shown in FIG. 18, or extended position as shown in FIG. 21.

Figure 22:
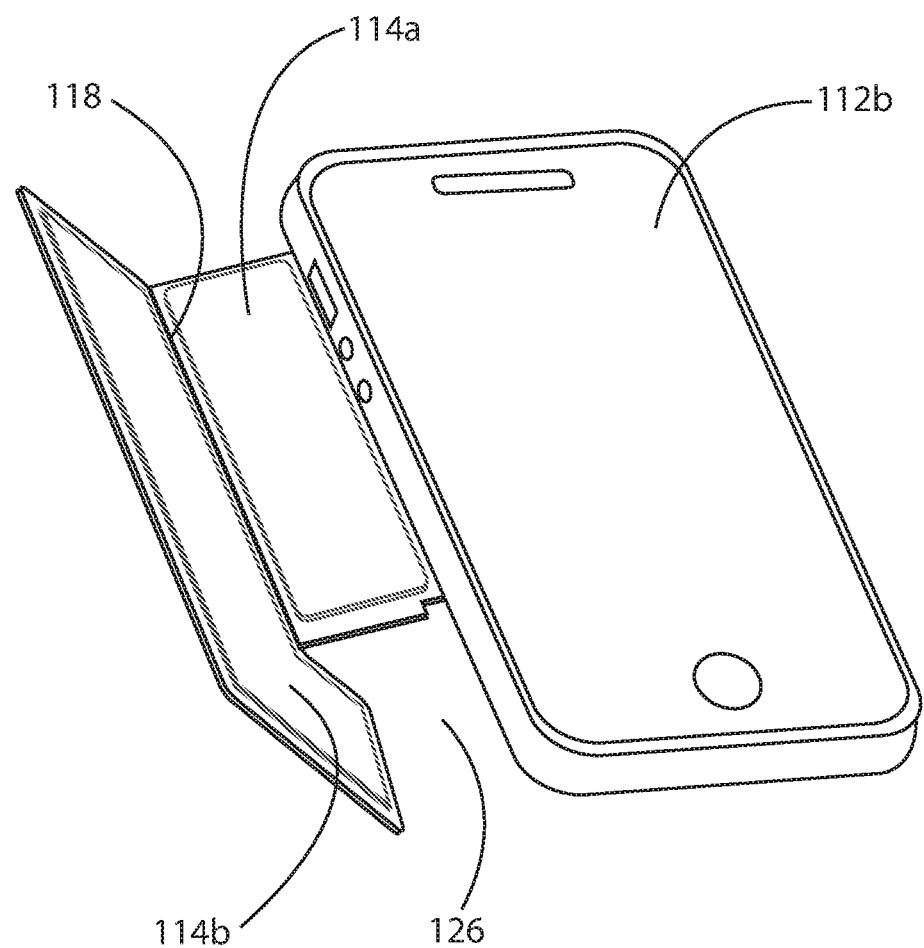
FIG. 22 shows the frontside of the open-face case with an attached smartphone or similar device. The wing/arm with the two rigid surfaces that make up the wing/arm is shown in a hinged position, creating the open notch area within the wing/arm.
Figure 23:
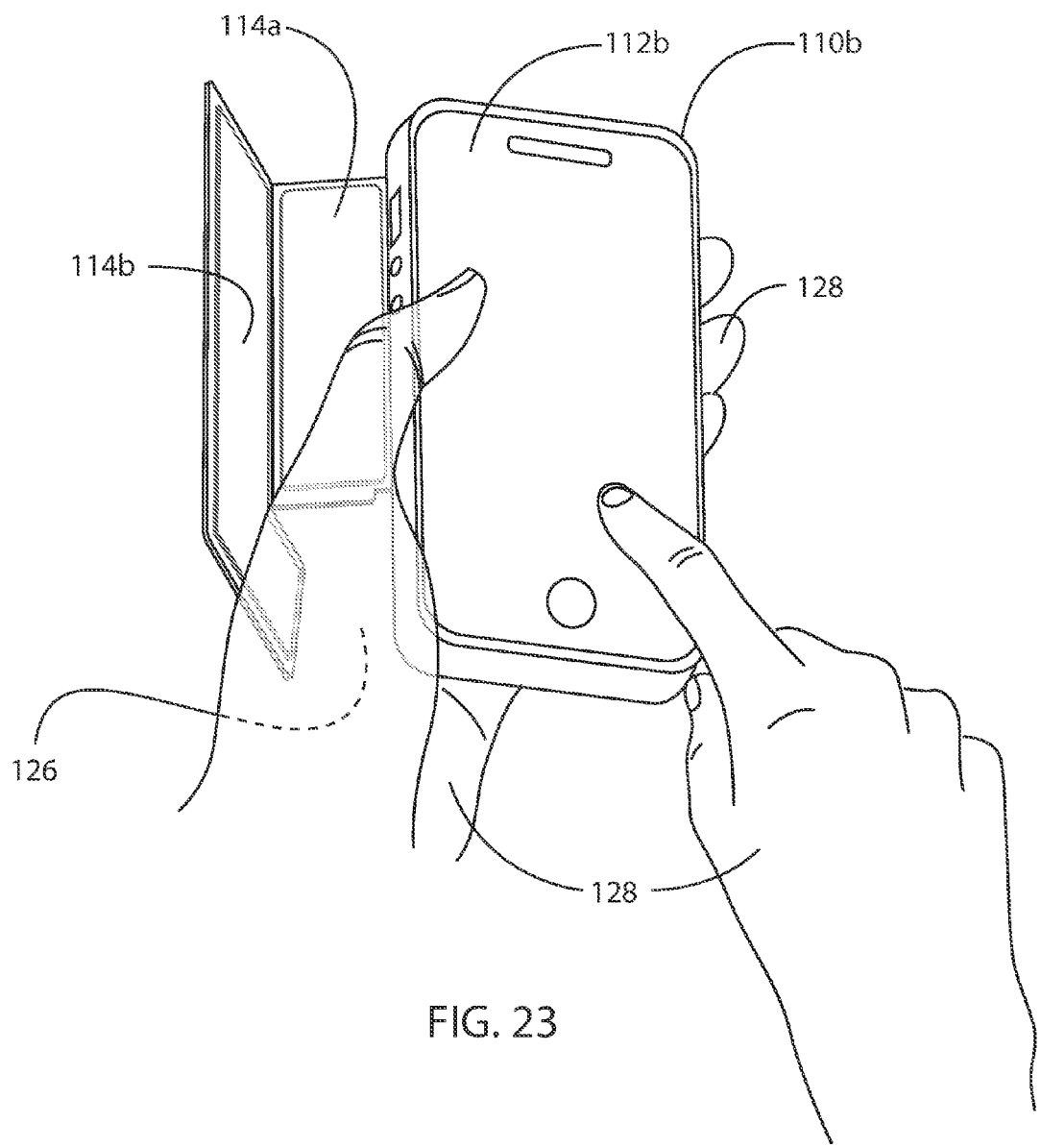
FIG. 23 shows the frontside of the open-face smartphone case (with an attached smartphone/cellphone) with the wing/arm rotated or pivoted to a usable position. The two rigid surfaces that make up the wing/arm are shown in a hinged position, creating the open notch area within the wing/arm. The user's hand is shown inserted and positioned in the open tapered notch area where the user can easily grasp the smartphone/cellphone.
Figure 24:
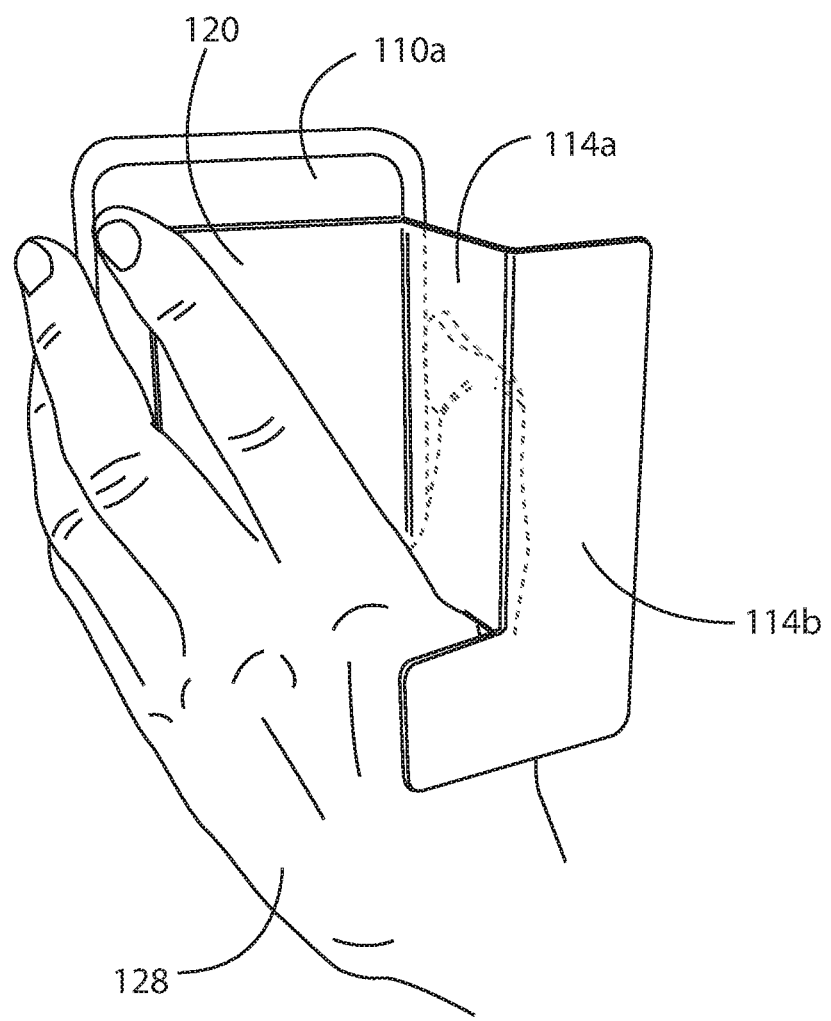
FIG. 24 shows the backside of the open-face smartphone/cellphone case with the wing/arm rotated to a usable position and the two rigid surfaces that make up the wing/arm in a hinged position, creating the open notch area within the wing/arm. The user's hand is shown positioned in the open tapered notch area where the user can easily grasp the smartphone/cellphone. The outer panel of the wing/arm subassembly is shown conforming to the backside of the hand that is inserted into the notch.
Figure 25:
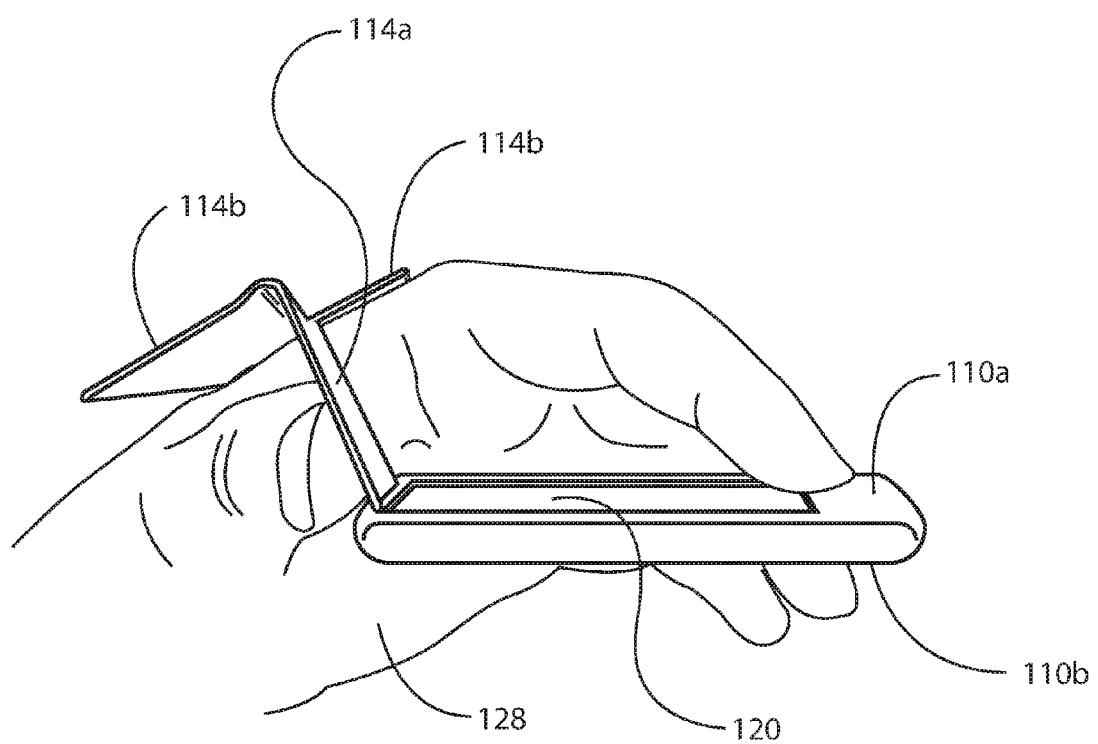
FIG. 25 shows a top view of the smartphone case with the attached smartphone/cellphone and the hinged wing/arm in an open and extended position. The user's hand is shown inserted into the notch created from the hinged wing/arm—with the outer rigid surface of the wing arm perpendicular to the inner rigid surface and conforming to the backside of the user's hand.

In this open-face case embodiment, when the wing/arm 114 is in its retracted position as shown in FIG. 18, the smartphone or electronic device 112 fitted in the case 110 can be employed in a conventional manner, just as with the conventional or decorative prior art cases commonly employed with smartphones. In this retracted position the wing/arm 114 does not interfere with the way in which a smartphone 112 is held in a user's hand 128. However, when the wing/arm 114 is pivoted or rotated, extended, and folded into position, a notch 126—or open area—is exposed, as shown in FIGS. 22 and 23. The notch 126 that is revealed from the extended wing/arm 114 provides a support resting against the user's hand 128 when inserted into the notch 126, as shown in FIGS. 23, 24 and 25. When used in this manner, the notch 126 on the wing/arm 114 fits over the user's hand 128 in a natural position between the user's thumb and the rest of his or her hand 128. The notched wing/arm 114 both securely positions the smartphone 112 in the user's hand 128 and the smartphone 112 will be positioned in such a manner that the hand 128 will not obstruct or interfere with the normal use of the smartphone 112. For example, the hand 128 will be positioned so as not to interfere with the display 112b or obstruct the phone's camera functions. When held between the user's thumb, palm and forefinger, the user's thumb will remain free to interact with the device display 112b in a normal manner. The extended notched wing/arm 114 will also limit fatigue if the smartphone 112 is used for a lengthy period.

The wing/arm 114 consist of a subassembly of two individual panels 114a and 114b that are hinged together, at hinge 118 to form the wing/arm panel 114 as shown in FIG. 20. The first panel 114a of the wing/arm subassembly 114 is connected and hinged parallel to the side of the case 110c at hinge 116 and the opposite side of the panel 114a runs parallel to hinge 116 as shown in FIG. 20, or can be angled slightly.

The second panel 114b of the wing/arm 114 subassembly is connected at hinge 118 to the first subassembly panel 114a. This panel 114b is longer than the first panel 114a and has a unique "L" shape where the lower portion of the panel 114b extends back to the side of the case 110 from which the wing/arm 114 is hinged from at hinge 116 as shown in FIGS. 19-21.

There are two hinging processes that occur to create the notch 126 in the wing/arm 114. First, the entire wing/arm 114 hinges and extends away from the backside 110a of the case at hinge 116. Secondly, the outer "L" shaped panel 114b of the wing/arm 114 subassembly is hinged roughly 90 degrees at hinge 118—in either direction—so that the panel 114b is oriented roughly perpendicular to the first panel 114a of the wing/arm subassembly as shown in FIGS. 22 25. When the "L" shaped panel 114b is positioned this way, a notch 126 is created in the wing/arm 114 from the lower portion of the "L" shaped panel 114b rotating away from the side 110c of case 110 where the wing/arm is connected. The notch 126 is defined between the side edge of the case 110, the lower edge of panel 114a, and the lower perpendicular portion of the rotated "L" shaped panel 114b of the wing/arm 114 subassembly as shown in FIGS. 22 25.

The notch 126 created from the aforementioned allows for the insertion of the user's hand 128 into the notch 126. The lower portion of the rotated and hence perpendicular "L" shaped panel 114b of the wing/arm 114 subassembly creates a surface area (in both perpendicular directions from the case 110) that conforms to the backside of the user's hand 128 as well as the user's lower thumb. This surface area prevents lateral movement of the case 110 away from the user's hand 128 when the hand 128 is inserted into the notch 126. This interaction helps to produces a secure fit for the case 110 and device 112 within the user's hand 128. The hand's interaction with this surface created from the perpendicular panel 114b, as well as the interaction with the user's hand 128 with the side 110c of the case 110, secures the case 114 within the user's hand 128—preventing lateral movement of the case 110 in either direction when the user's hand 128 is inserted into the notch 126 as shown in FIGS. 23-25.

The lower edge of the first panel 114a of the wing/arm 114 subassembly is positioned between the thumb and forefinger of the user's hand 128 that prevents vertical downward movement of the case 110 when the user's hand 128 is inserted into the notch 126. The interaction of the user's hand 128 with the perpendicular "L" shaped outer panel 114b, the lower edge of the first inner panel 114a, and the side of the case 110 creates a secure and snug fit between the user's hand 128 and the case 110. This interaction with the hand and notch creates a cradling effect between the user's hand 128 and the case 110 and allows the case 110 to be supported within the user's hand 128 with little or no grasping of the hand 128 when held in a normal usable position, as best seen in FIGS. 23, 24, and 25.

As seen in FIGS. 19-22, the wing/arm 114 can be rotated freely to a number of extended positions to fit a user's hand 128. The wing/arm 114 can be continuously rotated to any angular position or detent means can be employed to allow the wing/arm 114 to rotate to preselected stable positions.

In the open-face case embodiment as shown in FIGS. 18 thru 26, the wing/arm 114 subassembly consist of two panels surfaces 114a and 114b. The two panels, 114a and 114b, are made from rigid materials such as thin plastic sheet or thick card stock material that are then sandwiched between two layers of flexible material, such as a thin flexible vinyl material. The wing/arm 114 subassembly is joined to the backside 110a of the case 110 by a continuation of the flexible material 114c (without the rigid material sandwiched between) that is adhered or attached to the backside of the case 110a as best seen in FIG. 19.

The hinge 116 for the wing/arm 114 that connects to the case backside 110a is created from a portion of the flexible material 114c (that makes up the wing/arm 114) that is not adhered to the backside 110a of the case 110 and before the first sandwiched rigid surface 114a as shown in FIGS. 19-20. This continuation of material provides the hinge 116 for the wing/arm 114. The hinge 116 is located along one side edge 110c along the rear face 110a of the case 110. The flexible outer material of the wing/arm 114 is able to fold on itself and allows the wing/arm 114 to hinge, pivot and extend outward for use, or to hinge/pivot so that the wing/arm 114 is positioned parallel to the backside of the case 110a when not being used.

Other types of materials for hinges could also be employed, such as a living hinge constructed of a one piece wing/arm 114 and hinge member that is preferably molded from a suitable plastic material. A living hinge is a thin section which allows rotation of the wing/arm 114 relative to the case 110, but is sufficiently resilient so as not to be damaged during normal use. A number of suitable plastics can be used to form this living hinge.

A recessed portion 120 is located on the exterior surface of the case back 110a, and this recessed portion 120 has the same shape and depth as the wing/arm 114. When the wing/arm 114 is in a retracted position, the flat wing/arm 114 is positioned within the recessed area 120 and will not protrude from the case 110. An indentation 122 along one edge of the recessed portion 120 provides access to the arm 114 so that the user can grasp this edge of the wing/arm 114 to rotate it from the retracted position as best shown in FIGS. 19 and 20.

In the open-face case embodiment, the wing/arm 114 and the indentation area 120 are designed so that it will not obstruct functional feature areas of the smartphone 112, such as camera lens 124 as shown in FIGS. 18-19.

As seen in FIG. 23, a smartphone 112 can be supported in the user's hand 128 with the smartphone display 112b unobstructed. The user's hand 128 is positioned within the wing/arm 114 so as not to obstruct the interactive area of the front of the smartphone 112b, and the smartphone 112 can be held steady by the engagement between the hinged wing/arm 114 and the user's hand 128. This engagement and interaction can be beneficial with the user's ability to interact with the device's functions, such as using the camera feature.

The case 110 also has an opening or openings 124 on at least one side so that smartphone controls, inputs, and functions are accessible.

Figure 26:
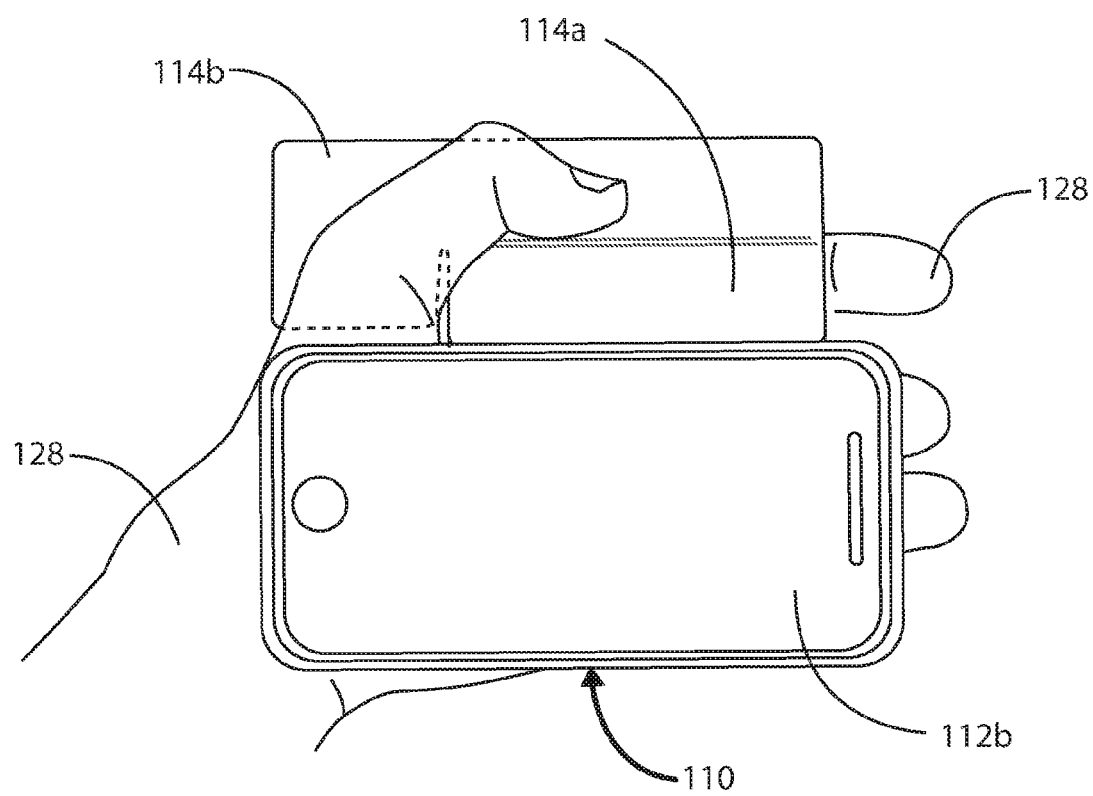
FIG. 26 shows a straight on view of the open-face frontside of the case and smartphone being used in a horizontal position. The wing/arm is being utilized with the thumb of the user's hand inserted into the notch and the user's fingers grasping the right side edges of the horizontally position case and smartphone.

FIG. 26 shows a straight on view of the frontside of the open-face case 110b and smartphone 112 being used in a hands on horizontal position. The wing/arm 114 is being utilized with the thumb of the user's hand 128 inserted into the notch 126 and the user's fingers extended and grasping the edges of the upper wing/arm panel 114 (now shown on side) and upper edges 110c of the horizontally position case 110.

The shape or design of the wing/arm 114 is not limited to the rectangular shape of the combined surfaces 114a and 114b as shown in FIGS. 18 thru 27. The shape or design of the wing/arm 114 could be a shape as illustrated in FIG. 28. The wing/arm 114 shape could consist of any number of shapes as long as the main elements of the wing/arm 114—the "L" shaped rigid surface 114b and the inner rigid surface 114a—are integral parts of the structure and engage with each other to form the notch and support surface of the rotated "L" panel—as previously described and shown in FIGS. 18 thru 25.

The embodiment for the open face type notched case can consist of both a left hand version and a right hand version depending on the user's preference.

Figure 27:
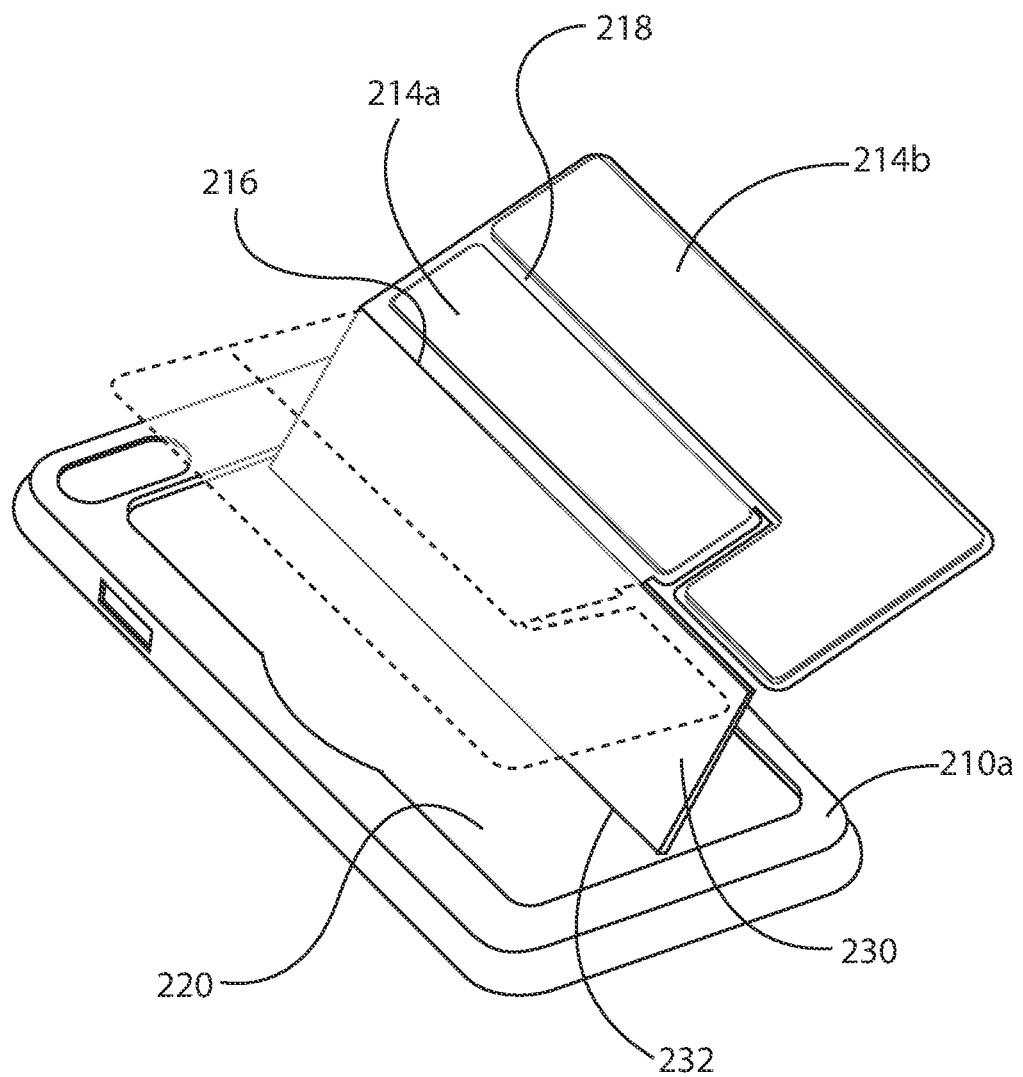
FIG. 27 shows a version of the open-face smartphone/cellphone case wing/arm with an additional panel connected to the wing/arm (referred to as the connector panel) that allows the wing/arm to be positioned to either side of the smartphone case. The wing/arm is not hinged in the illustration and the notch is not formed.
Figure 28:
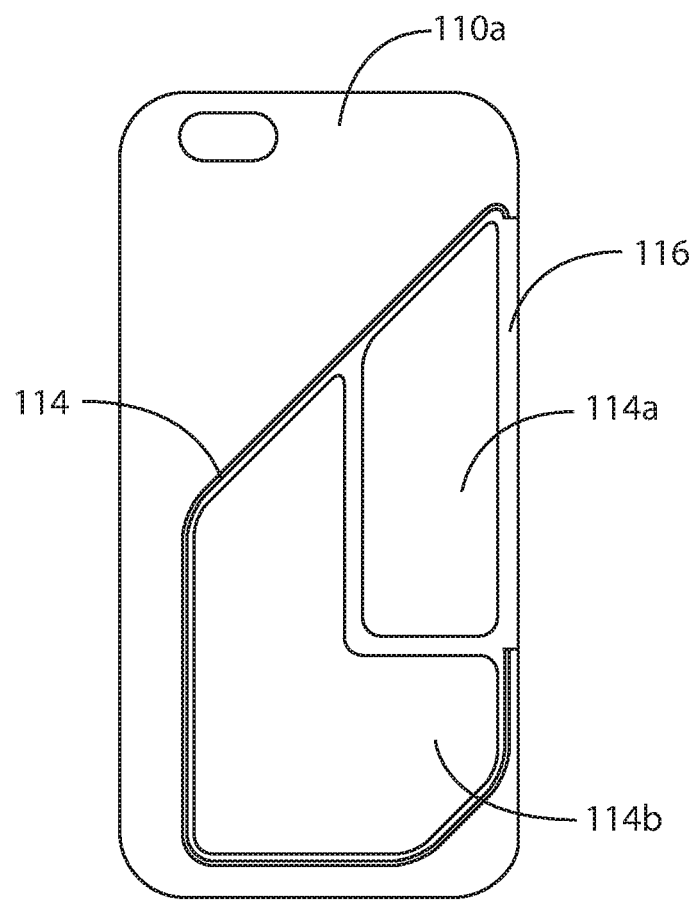
FIG. 28 shows a variation of the design shape of the wing/arm for the open-face device case on the backside of the case. The illustration exemplifies how the wing/arm panel can be designed in different shapes. The variation of shapes should retain the functional elements of the wing/arm design such as the the two rigid surfaces and hinges that create the wing/arm as shown (note the "L" shaped rigid surface). The wing/arm is shown in the stored position on the backside of the case.

FIG. 27 depicts an alternative version of the open-face case embodiment that consist of the wing/arm 214, similar in structure to the previously described version, that has the ability to be positioned on either side of the case 210—thus allowing the user the option and flexibility to choose which side of the case 210 they would prefer to utilize the notched feature 226. In this embodiment, the wing/arm 214 consist of a subassembly constructed with an additional panel 230 (which will be referred to as the wing/arm connector panel) that connects to the wing/arm 214, as previously described, to the center of the backside of the device case 210a. The additional connector panel 230 is approximately half the width of the case 210 and freely hinges in either direction at the attachment point 232 at the center of the backside of the case 210a. The attachment to the wing/arm 214 is also a hinge 216 allowing the wing/arm 214 to rotate freely at the point of attachment 216. The hinging relationships of the sub-assembly allow the wing/arm 214 to be positioned to either side of the case 210. When not being used, the subassembly of the wing/arm connector panel 230 and wing/arm 214 fold together in a flat position.

Once the wing/arm connector panel 230 is hinged to the desirable side of the case 210, the wing/arm 214 unfolds and hinges away from the connector panel 230 so that the wing/arm 214 is positioned to a desired side of the case 210. The wing/arm 214 is then hinged into position (roughly 90 degrees) to create a notch opening (similar to the notch 126 in the previously described version shown in FIG. 22) between the case 210 and the perpendicular surface from the hinged portion of the wing/arm 214b. The notch is used for receiving the user's hand for grasping and interacting with the smartphone or similar electronic device 212.

When the wing/arm subassembly consisting of 214 and 230 is not used, it folds together through hinges 216 and 232, and is positioned parallel or flush to the back surface of the case 210a in a recessed area 220 on the back 210a of the case 210.

The design for the wing/arm 114 subassembly for the open-faced case 110 version could include an additional third panel that is positioned furthest from the open-face case edge 110c when the wing/arm panel 114 subassembly is pivoted away from the case 110. This option would be available for cases/devices that are wide enough to include the outer third panel. This third integrated panel of the wing/arm subassembly would have sufficient width that when the additional panel hinges upward, the panel acts as an easel to support the case 110 with the case positioned at an angle when the open-face case 110 is placed horizontally on a surface for hands-free horizontal viewing of the device. This additional panel is described in further detail in the following folio version of the smartphone/cellphone case.

The embodiment depicted in FIGS. 29-35 deploy a folio type case 310 for electronic devices 312 such as smartphones which would include a case cover panel 310f that provides protection for the front of the electronic device 312b in the same way standard folio cases provide. The device 312 would be attached to the back panel 310e of the case 310 by means of a snap-in clip structure or straps, or similar attachment method that secures the device so that the front face of the device is exposed.

Figure 29:
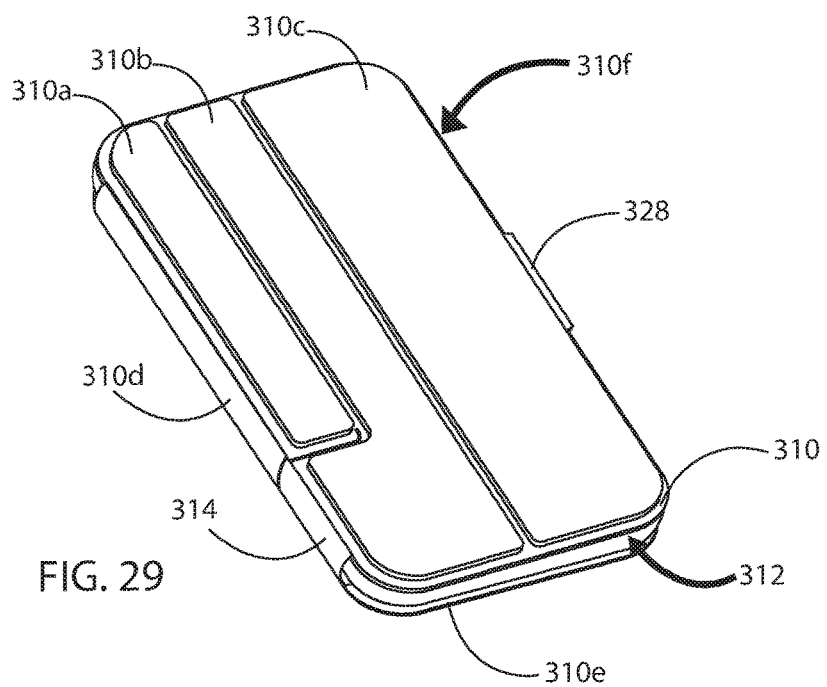
FIG. 29 shows another embodiment of the basic invention for an folio smartphone case. The folio case is shown in the closed position. The front panel of the folio case is shown and the multiple panels that make up the front panel subassembly are visible.
Figure 30:
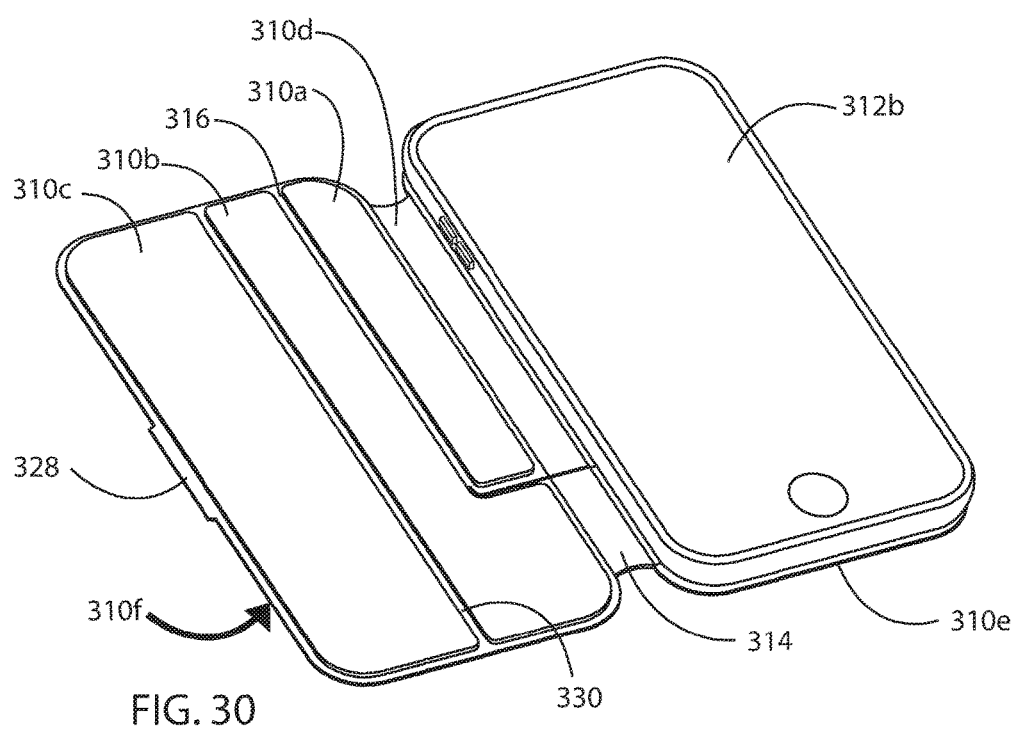
FIG. 30 shows the folio smartphone case in the open position. The front panel of the folio case is rotated to the side of the smartphone device. The front panel subassembly is shown flat and unhinged.

In this folio case version, the subassembly of panels 310a, 310b, and 310c, make up the front panel 310f—similar to the previously described wing/arm of the open-face case embodiment. This subassembly is integrated into the entire front panel 310f of the folio case 310. The front panel 310f, and its subassembly, attach to a spine 310d of the folio case 310 which attaches to the backside 310e of the folio case 310. The spine 310d allows the front panel 310f to hinge, like a book cover, and be positioned to the side of the device 312 as shown in FIGS. 29-30.

Figure 31:
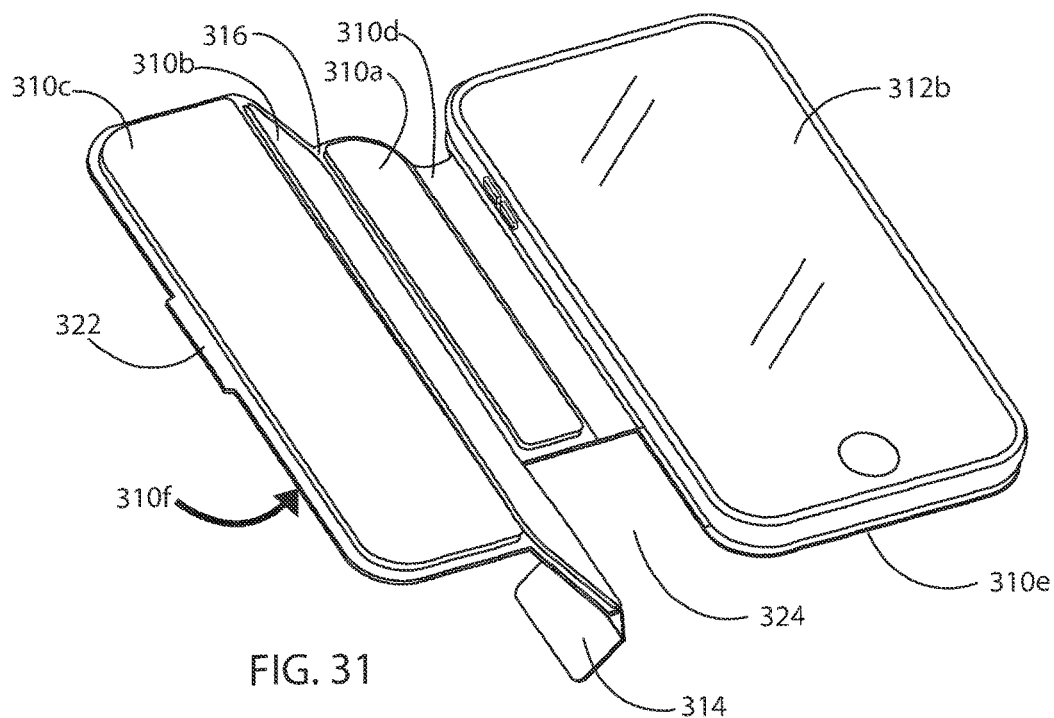
FIG. 31 shows the folio smartphone case in the open position. The front panel of the folio case is rotated to the side of the smartphone device. The front panel subassembly is shown hinging and creating the open notch within the front panel subassembly.
Figure 32:
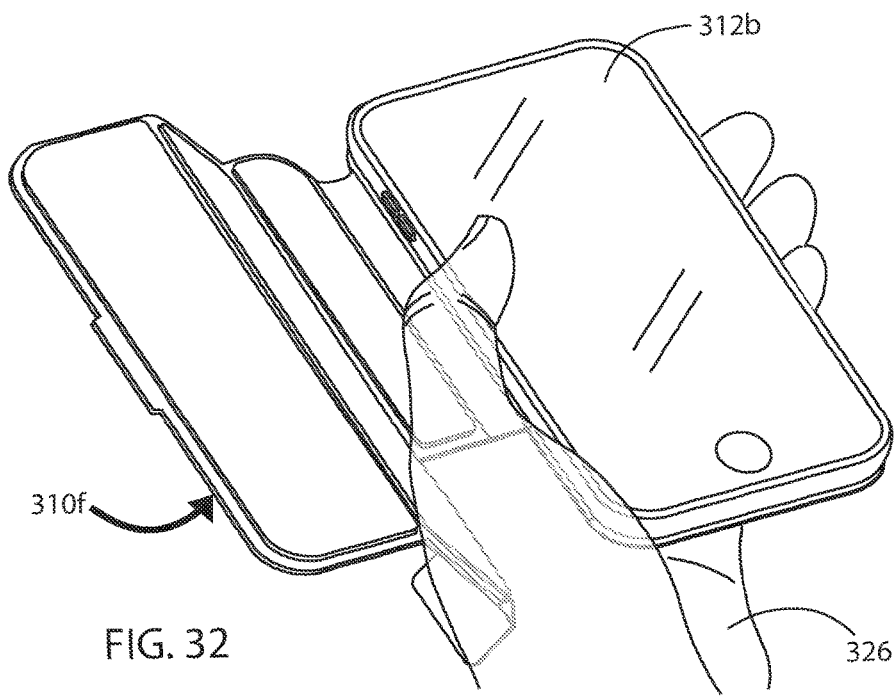
FIG. 32 shows the folio smartphone case in the open position. The front panel of the folio case is rotated to the side of the smartphone device. The front panel subassembly is shown hinging and creating the open notch within the front panel subassembly and the user's hand is inserted into the notch where the hand can easily grasp the side of the smartphone device.
Figure 33:
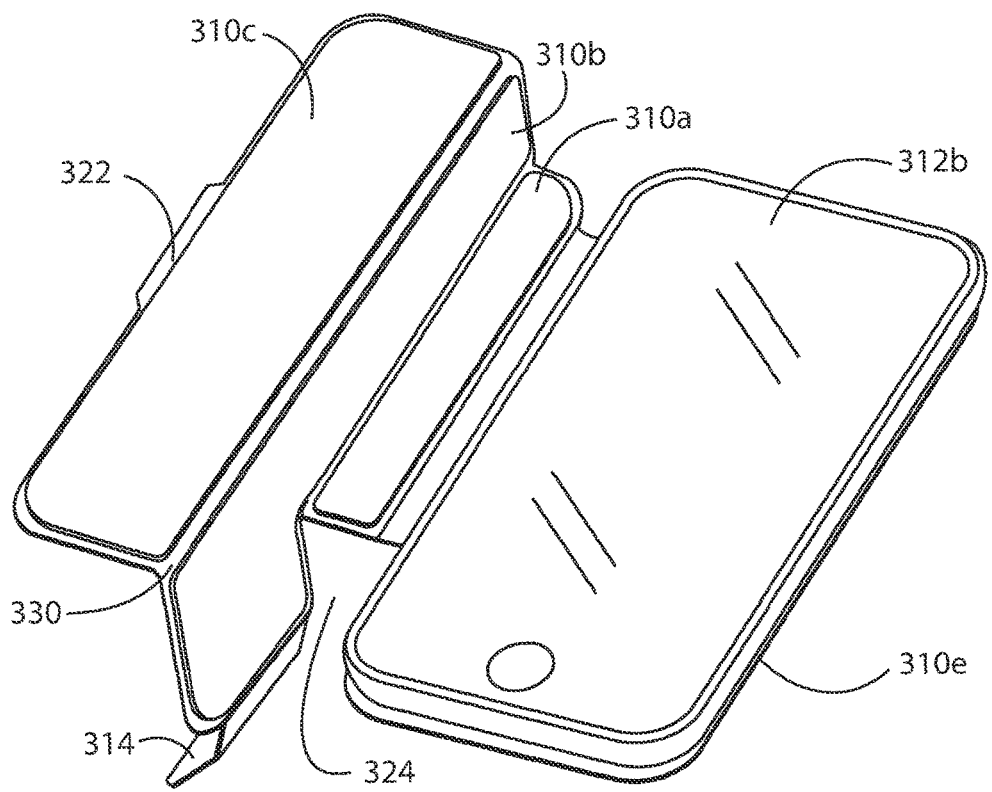
FIG. 33 shows the folio smartphone case in the open position as viewed from the reverse side. The front panel of the folio case is rotated to the side of the smartphone device. The front panel subassembly is shown hinging and creating the open notch within the front panel subassembly.

When the front panel 310f is hinged to the side of the smartphone 312 or similar device, it becomes the same wing/arm type structure as previously described in the open-face case 110 embodiment. The front panel 310f subassembly 310a, 310b, and 310c, of the folio case 310 provides the same function of creating the notch 324 and the perpendicular support surface from hinged panel 310b as best seen in FIGS. 31-33.

The front panel 310f subassembly of the folio case 310 would consist of two primary panels, 310a and 310b, that are hinged together at hinge 316 and fold to form the notch 324 within the hinged and rotated front panel 310f as shown in FIGS. 30-33. The first panel 310a of the front panel 310f subassembly is connected and hinged at the spine 310d of the folio case 310.

The second panel 310b of the front panel 310f subassembly is connected at hinge 316 to the first subassembly panel 310a. This second panel 310b is longer than the first panel 310a and has a unique "L" shape where the lower portion of the panel 310b extends back to the side of the attached device 312.

Figure 34:
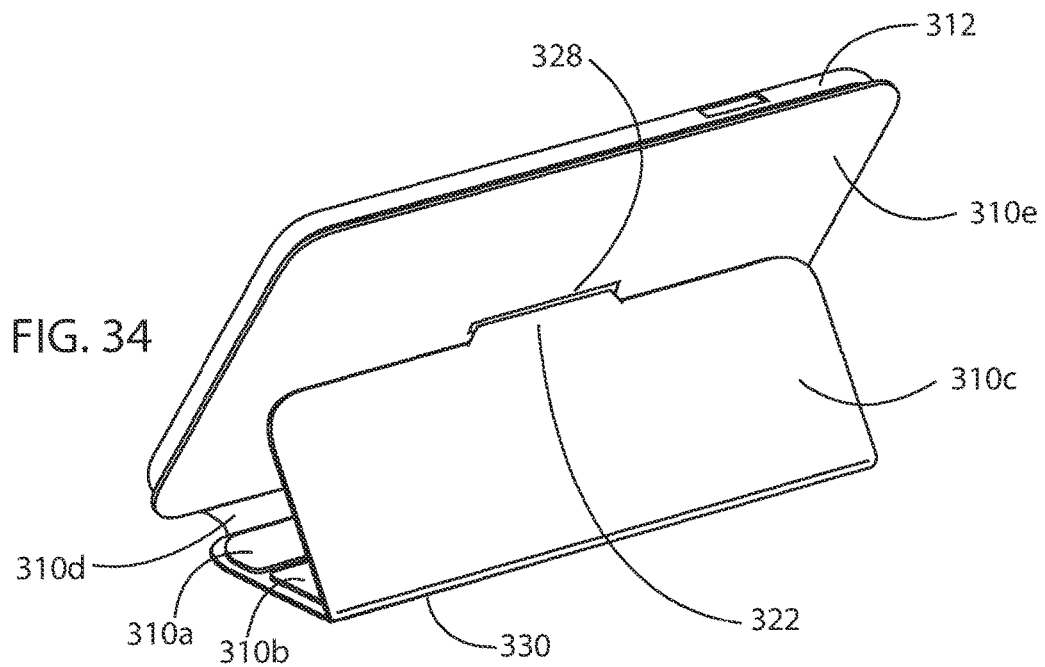
FIG. 34 shows the folio smartphone case utilizing the outermost panel of the front panel subassembly as an easel support for horizontal viewing. The panel hinges upward to create an easel to support the case/device for hands free horizontal viewing. The two inner panels of the front panel subassembly create the base for the case device to sit on a surface.

The front panel 310f subassembly for the folio case 310 version would include a third panel 310c that is positioned furthest from the folio case spine 310d when the front panel 310f subassembly is pivoted away from the side of the smartphone device 312 that is attached to the backside 310e of the folio case 310. This third integrated panel 310c of the subassembly has sufficient width that when the panel 310c hinges upward at hinge 330, the panel 310c acts as an easel to support the case 310 and device 312 at an angle when the case 310 is placed horizontally on a surface for hands-free horizontal viewing of the device 312 as depicted in FIG. 34. The other two panels 310a and 310b that make up the front panel 310f subassembly are used to create the base for the easel panel 310c and the device 312 when placed on a flat surface. The panel 310c utilizes a small side tab 322 that engages a slot 328 on the backside 310e of the case that is used to support the case 310 when used as an easel support for horizontal viewing.

Figure 35:
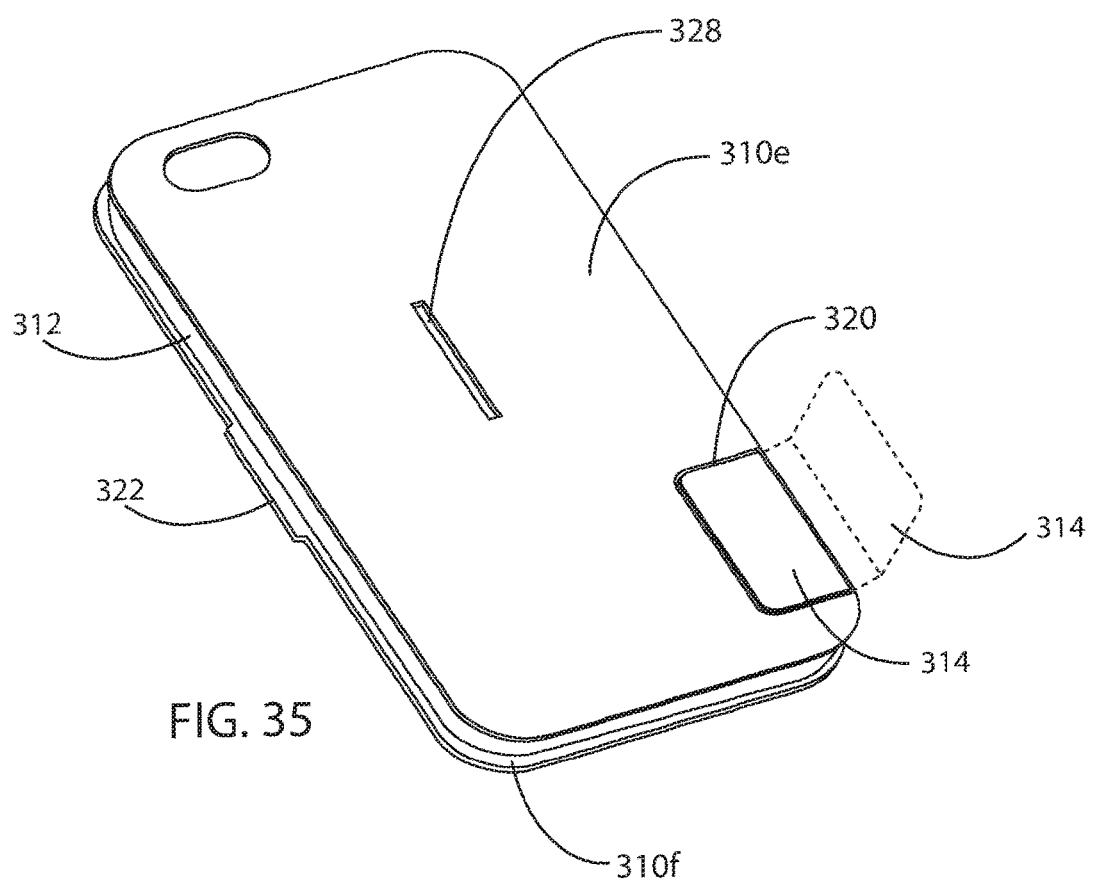
FIG. 35 shows the backside of the folio smartphone case in the closed position. The attachment panel that is used to secure the lower portion of the front panel subassembly to the backside of the folio case is visible.

The folio case version may include a secondary attachment panel 314 that is used to secure the lower portion of subassembly panel 310b of the front cover panel 310f assembly to the backside 310e of the folio case 310. This attachment panel 314 is connected to the edge of the "L" shaped panel 310b of the front panel 310f subassembly. The attachment panel 314 creates a continuation for the lower portion of the cover's spine 310d. The "flap" portion of the attachment panel 314 attaches to the outer backside 310e of the case 310 through a magnetic attachment or similar attachment method as best seen in FIG. 35. The attachment area 320 on the backside 310e of the folio case is recessed so that the attachment panel 314 is flush to the backside 310e of the folio case.

In order to create the notch 324 in the front cover 310f panel subassembly, the front panel 310f has to be hinged and positioned to the side of the device 312 and the attachment panel 314 has to be released from the attachment point 320 on the backside 310e of the folio case 310. Once released, the front panel 310f subassembly can be hinged, folded, and positioned to create the notch 324 as shown in FIGS. 30-33 and as described in the previous open-face embodiment.

The embodiment for the folio type notched case 310 can consist of both a left hd version and a right hand version depending on the user's preference.

Figure 36:
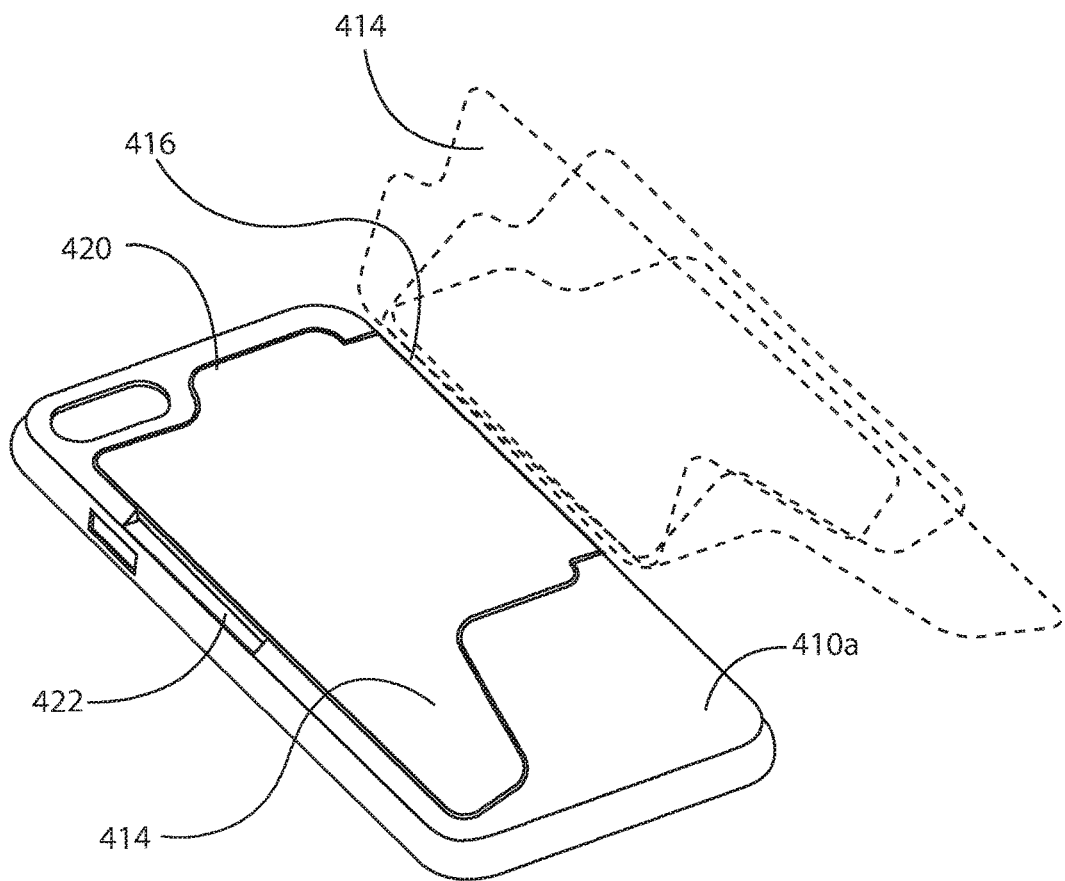
FIG. 36 shows an alternative version of the open-face smartphone/cellphone case wing/arm where the wing/arm is constructed of a single rigid surface. The wing/arm is shown in the stored position on the backside of the case with dotted line indicating the pivoting angles that the open wing/arm can be positioned.
Figure 37:
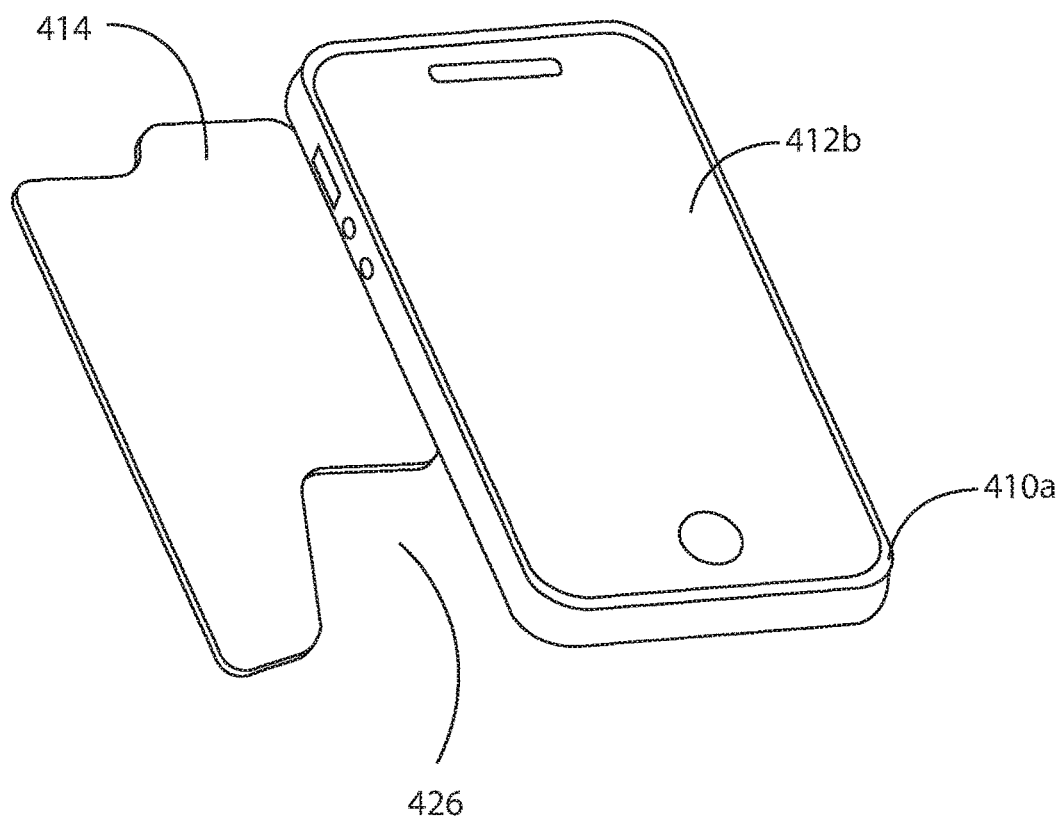
FIG. 37 shows the same version as shown in FIG. 29 where the open-face smartphone/cellphone case wing/arm is shown rotated and extended on the front side of the case with the smartphone attached. The shape of the extended wing/arm creates the notch between the side of the case and the inset lower edge of the wing/arm for the user's hand to be inserted into.

In FIGS. 36-37, an alternative version is shown consisting of an integrated back panel (or wing/arm) as previously described in the open-face embodiment, but the wing/arm 414 consist of a single non-hinging rigid surface that has a "cut out" that forms the notch 426 when the wing/arm 414 is rotated away and extended from the backside of the case 410a.

Figure 38:
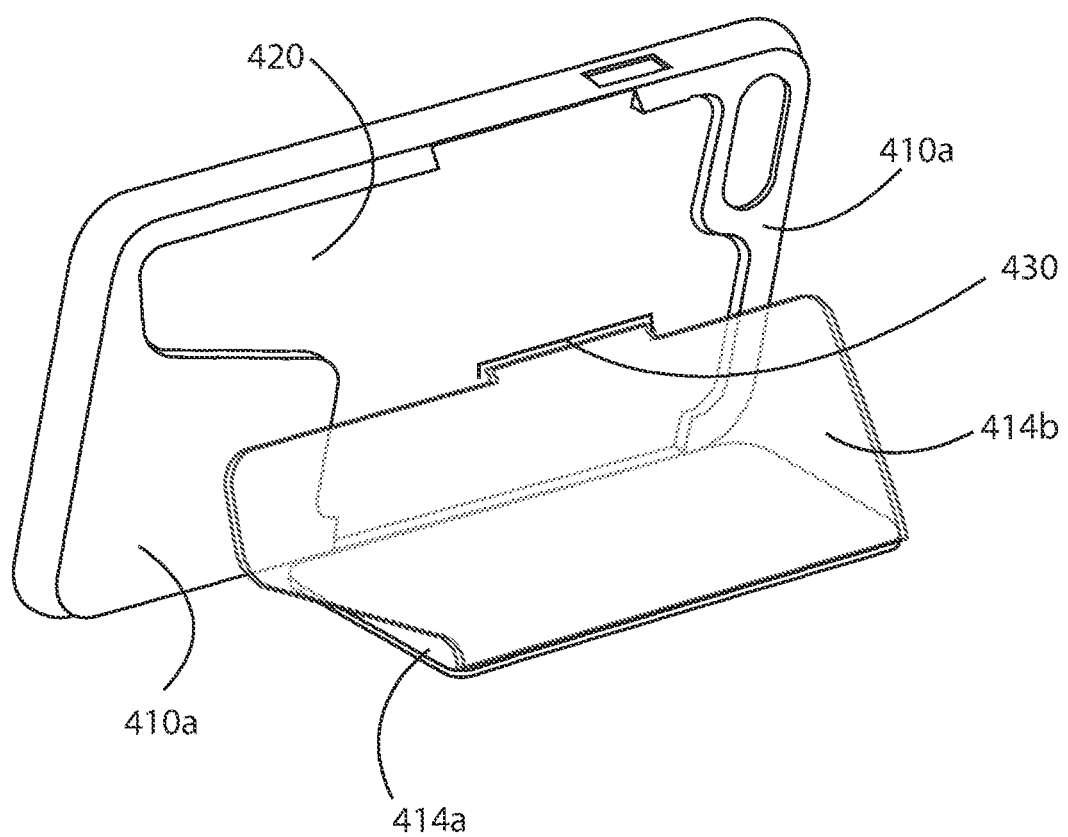
FIG. 38 shows a version of the open-face smartphone/cellphone case wing/arm that has the same shape as the wing/arm shown in FIGS. 29 and 30. In the illustration, the wing/arm is constructed of two rigid surfaces so that the surfaces can hinge and be used as an easel support for the case in a horizontal position. The hinged notch arm has the ability to hinge (fold) on itself—creating two panel sections within the wing/arm. The inside panel section forms the base and the outside panel section hinges upward to support the case/device in a horizontal position.
Figure 39:
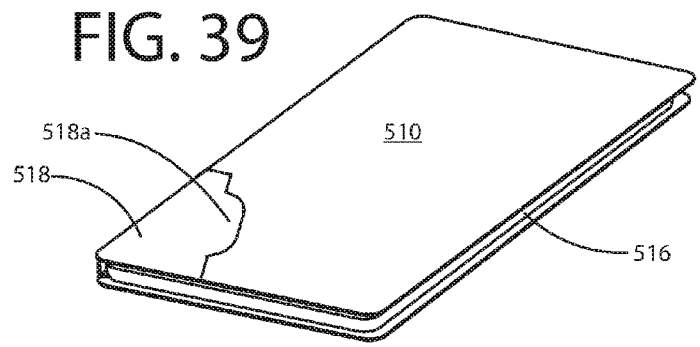
FIG. 39 illustrates the embodiment of the modified Flap panel design integrated into a folio type case. The case with the electronic device enclosed is shown in the "closed" position. The modified Flap panel is also shown in the "closed" and unhinged position where it is secured to the back of the device case. The modified Flap design is shown with an extended tab surface on the reverse side of the Flap hinge.
Figure 40:
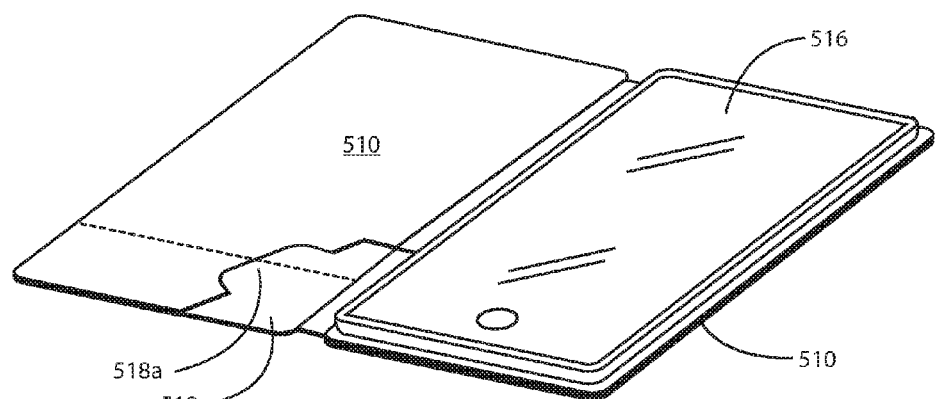
FIG. 40 shows the electronic device case with the electronic device attached in the "open" position. The Flap panel is also shown from the interior view of the case. The Flap design is again shown with the extended tab surface on the reverse side of the Flap hinge. A dotted line is shown to show the continuity of the panel surfaces on the same plane.

In FIG. 38, the wing/arm 414 of the same version (shown in FIGS. 36 and 37) could be used as an easel support for the case 410 in a horizontal position. A variation to the wing/arm 414 would allow this by constructing a two panel wing/arm—with panels 414a and 414b—that has the ability to hinge and fold. This hinging of the wing/arm would create an easel support for positioning the smartphone 412 or device in a hands free horizontal position shown in FIG. 31. The inside surface 414a of the wing/arm forms the base and the outside section 414b hinges upward to support the case 410 in a horizontal position.

In another version, The wing/arm and case assembly need not extend around the entire rear face of the smartphone to which it is attached. An alternate embodiment of a case could be attached to the rear face of a smartphone, but would not extend to all of the peripheral edges. A stationary panel could be attached to the smartphone by an adhesive or by clips, which might engage a portion of opposite sides of the smartphone face. A wing/arm would be mounted on this stationary panel attached directly to the smartphone.

The embodiment depicted in FIGS. 39-45 employs a folio case as previously described in the patent application which utilizes a modified Flap 518 that when hinged and rotated away from the case 510, a notch is created in the panel where the user's hand 528 can be inserted—as previously described within the application. The hinged flap 518 depicted in FIGS. 39-45 is uniquely designed with an extension of the flap panel 518a that extends to the opposite side of the hinge 520. The extended panel 518a is positioned in the middle of the hinge 520, splitting the hinge, essentially creating two hinges—one on either side of the extended panel 518a.

When the Flap panel 518 is hinged to expose the notch in the case and the user's hand inserted into the notch, the surface of Flap panel 518 is positioned to where it conforms to the backside of the user's hand 520. The extended Flap panel 518a (as described above) is positioned so that the Flap panel 518 is located on both sides of the hinge 520 from which the flap panel 518 rotates on. Having the hinged Flap panel 518 and 518a on both sides of the hinge 520 secures the flap panel 518 on the backside of the user's hand 528—preventing the Flap panel 518 from rotating away from the backside of the user's hand 528.

Figure 43:
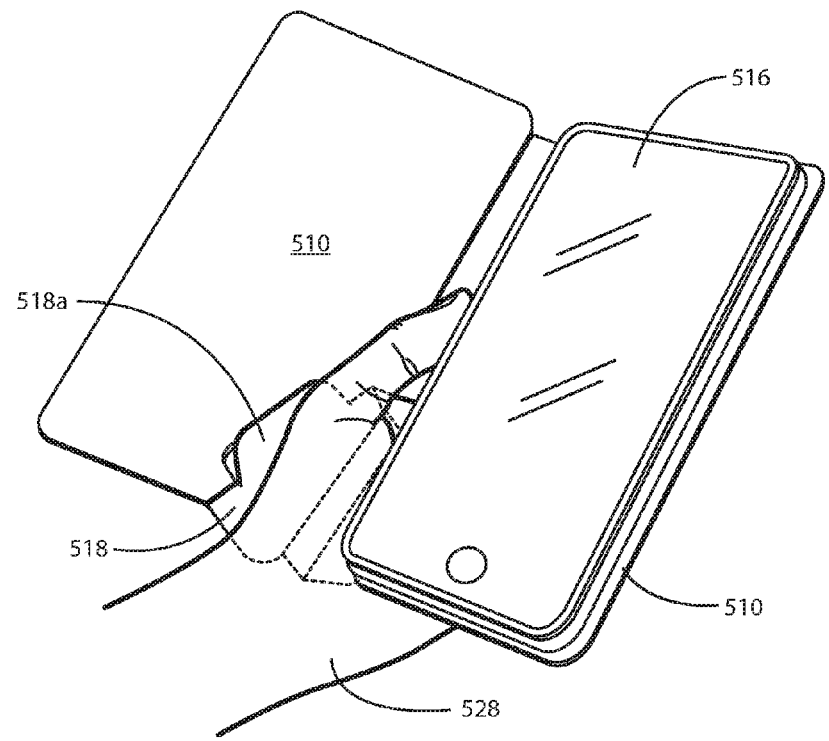
FIG. 43 shows the electronic device case with the electronic device attached in the cover "open" position with the user's hand inserted into the notch that is created from the downward hinging of the flap panel away from the panel with which it is attached to. The Flap panel, with the extended tab, is shown conforming to the backside of the user's hand.
Figure 44:
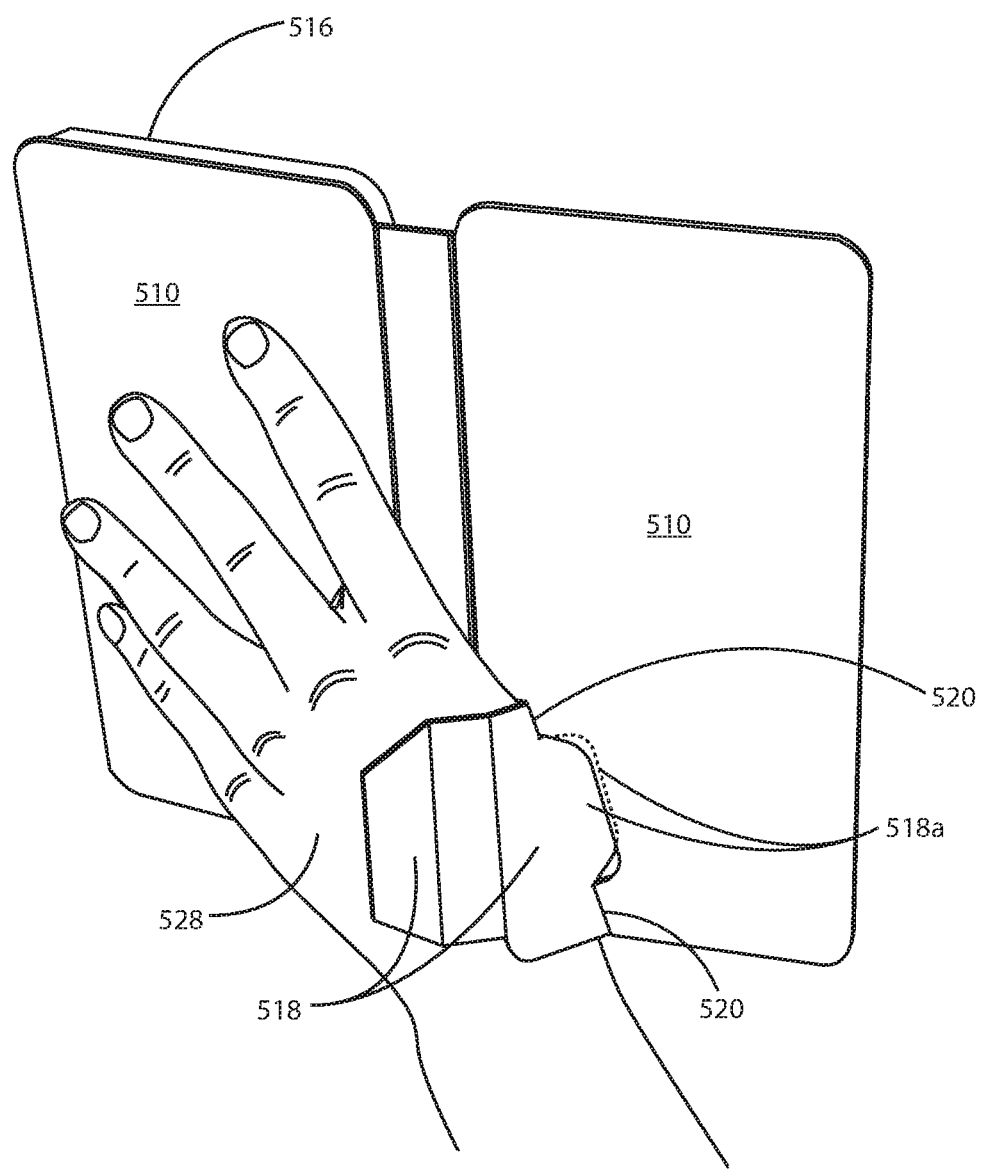
FIG. 44 shows the electronic device case with the electronic device attached in the cover "open" position as viewed from the reverse or back side of the case. The user's hand is inserted into the notch. The Flap panel is shown conforming the backside of the user's hand. The Flap panel is shown with the tab extending above the hinge of the flap panel. A dotted line illustrates the location of the modified flap panel tab that is hidden behind the front panel when viewed at this angle.
Figure 45:
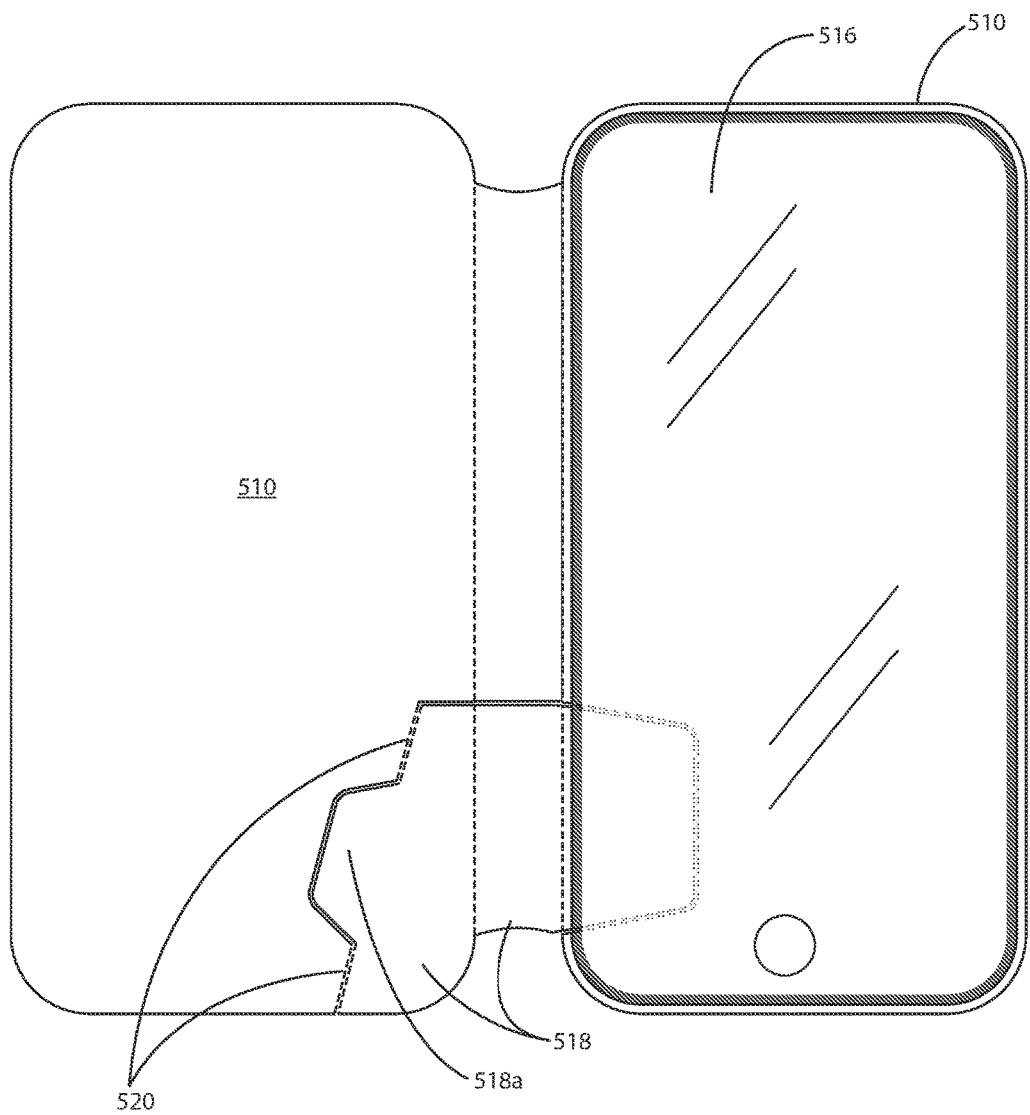
FIG. 45 shows a plan view of the folio case in the open position with the electronic device attached on the right panel. The left panel illustrates the modified shape of the Flap panel with the tab to the left of the hinge of the Flap panel.

The surface area of the rotated Flap panel 518 is positioned to the backside of the user's hand 528 and prevents lateral (left to right) movement of the case 510 away from the user's hand 528 when the hand 528 is inserted into the notch, as shown in FIGS. 43 and 44. This interaction helps to produce a secure fit for the case 510 and device 516 within the user's hand 528.

The embodiment depicted in FIGS. 46-54 employs a similar folio case as previously described in FIGS. 39 thru 45 in the patent application which again utilizes a modified flap 618 that when hinged and rotated away from the case 610, a notch is created in the panel where the user's hand 628 can be inserted—as previously described within the application. The hinged flap 618 depicted in FIGS. 46-54 is again uniquely designed with an extension of the flap panel 618a that extends to the opposite side of the hinge 620. The extended panel 618a is positioned to the outer edge of the hinge—away from the housed electronic device.

The extended panel 618a of panel 618 acts as an extended tab surface that is separate from panel 610 and is positioned next to (or on top of) the inside of case panel 610. When the flap panel 618 is closed, or not open, both portions 618 and 618a are on the same plane as panel 610. When the hinged flap is open by rotating the panel 618 downward on hinge 620, as best seen in FIGS. 48 thru 51, panel portion 618 is positioned below the hinge 620 and panel 610 and portion 618a is positioned above the hinge and panel 610, as best seen in FIG. 8.

Figure 49:
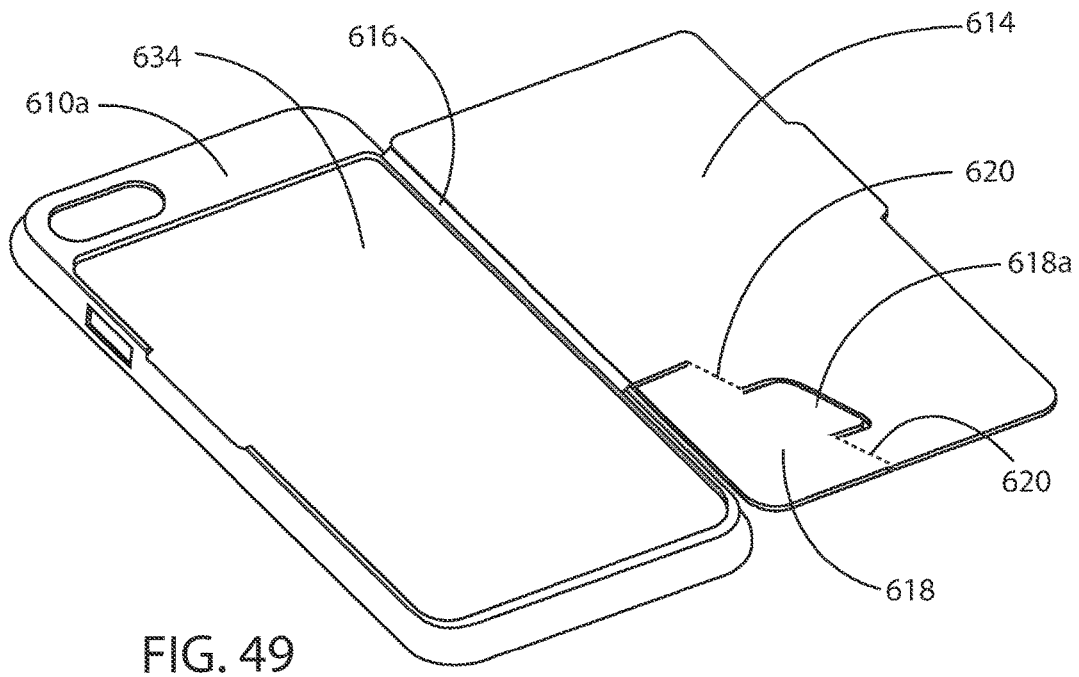
FIG. 49 shows the backside of the open-face case with the same modified Flap panel design (that has an extended tab) as shown in FIGS. 39 thru 47. The back panel with flap panel is shown hinged open where it is positioned to the side of the case for an electronic device. The modified Flap design with the extended tab is shown unhinged.
Figure 51:
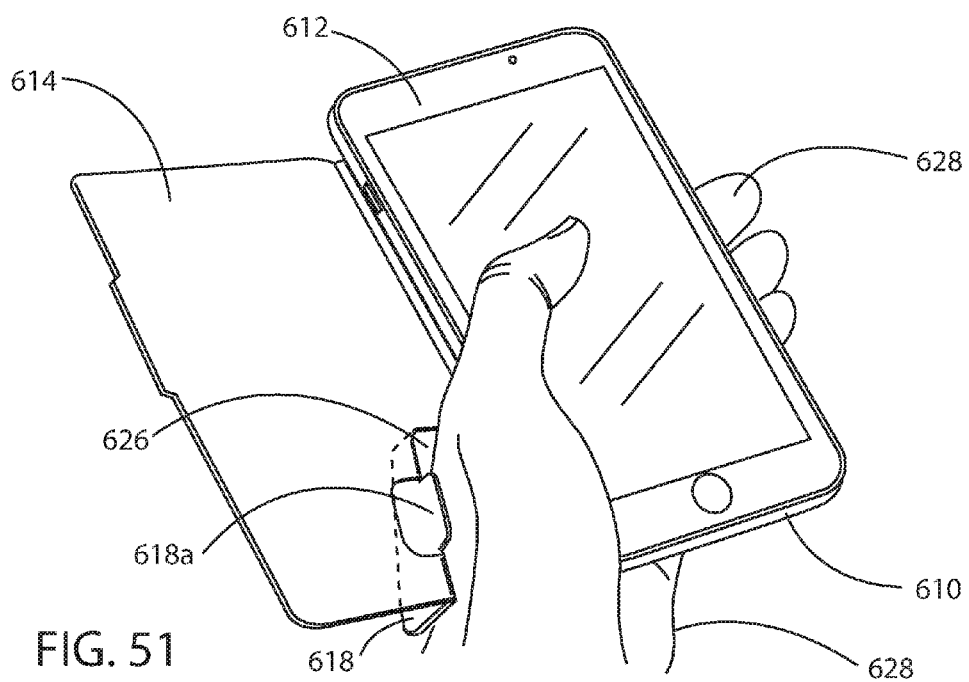
FIG. 51 shows the case and device from the same view as shown in FIG. 50 but with the user's hand inserted into the notch and interacting with the device that is attached to the case.

When the flap panel 618 is hinged to expose the notch in the case 610 and the user's hand is inserted into the notch, the surface of flap panel 618 is positioned to where it conforms to the backside of the user's hand 620, as best seen in FIG. 51. The extended flap panel 618a (as described above) allows for the flap panel 618 to be located on both sides of the hinge 620 from which the flap panel 618 rotates on, as best seen in FIG. 49. Having the hinged flap panel 618 and 618a on both sides of the hinge 620 helps secure the flap panel 618 on the backside of the user's hand 628—preventing the flap panel 618 from rotating away from the backside of the user's hand 628.

Figure 50:
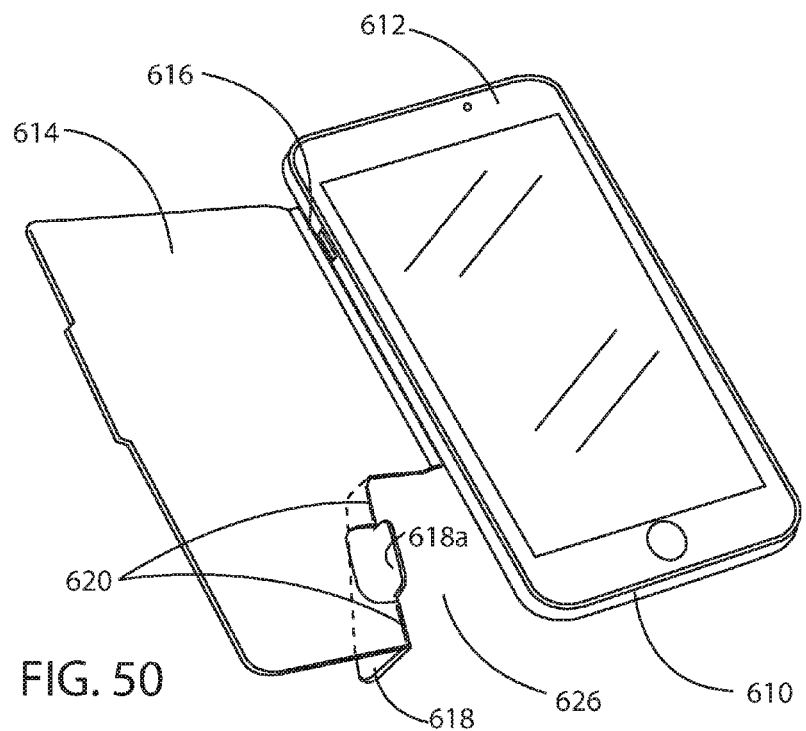
FIG. 50 shows the frontside of a non-folio open-face type case with the same modified Flap panel design (that has an extended tab) as shown in FIGS. 39 thru 47. The back panel with modified flap panel is shown in the open and hinged position where it is positioned to the side of the case and device. The Flap panel is shown hinged downward—creating a notch within the back panel. The extended tab surface of the flap panel is shown on the reverse side (or above) of the Flap hinge.

When the notch is exposed by rotating the flap 618 away from the case, and the user's hand 628 is inserted into the notch, the surface area of the rotated flap panel 618 (including 618a) is positioned to the backside of the user's hand 628 and prevents lateral (left to right) movement of the case 610 away from the user's hand 628 when the hand 628 is inserted into the notch, as shown in FIGS. 50 and 51. This interaction helps to produce a secure fit for the case 610 and device 616 within the user's hand 628.

The shape of the extended flap panel portion 618a is significant. The shape of panel portion 618a is a soft radiused curve that extends from one side of the panel hinge 620 to the other side of the panel hinge 620. The radiused shape of the flap panel portion 618a insures that there are no sharp corner edges that could be uncomfortable when the flap is open and the backside of the user's hand 628 comes in contact with the flap panel 618*a*.

The embodiments described in the following descriptions present two additional variations of the flap panel design for electronic device cases. The two variations presented in the following are enhancements upon the initial flap panel previously discussed with reference to FIGS. 1-17. The two flap panel variations described in the following are shown integrated into two different style of cases. The embodiment depicted in FIGS. 39 thru 47 and the embodiment depicted in FIGS. 62 thru 75 show an improved flap panel integrated into a folio "book like" case. The embodiments depicted in FIGS. 48 thru 61 show an improved flap panel integrated into an "open face" non-folio type case. It is important to note that the two improved variations of the flap panel design can be used on either or both type of cases—folio and non-folio.

Figure 41:
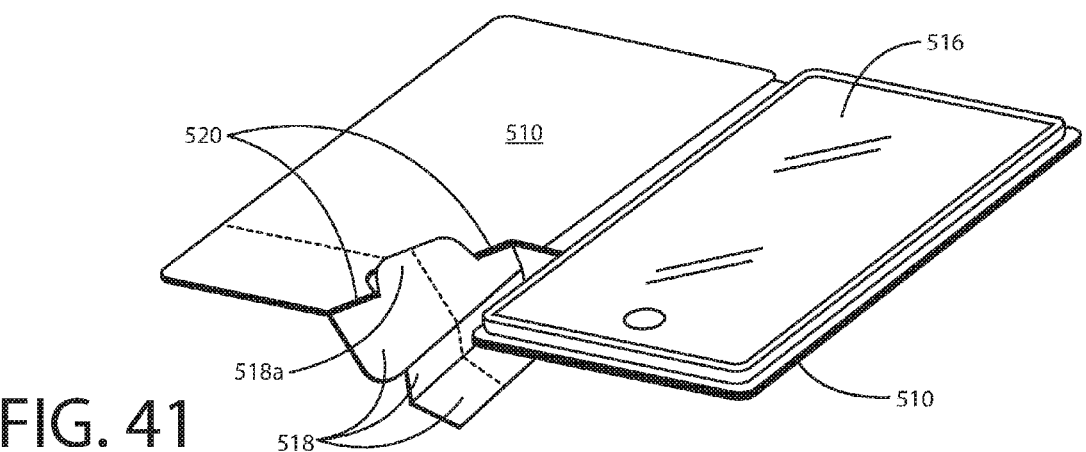
FIG. 41 shows the electronic device case with the electronic device attached in the "open" position. The Flap panel is shown hinging downward with the panel surfaces of the tab and the flap panel extending from both sides of the Flap hinge. A dotted line is shown to illustrate the hinged angle of the Flap panel.
Figure 42:
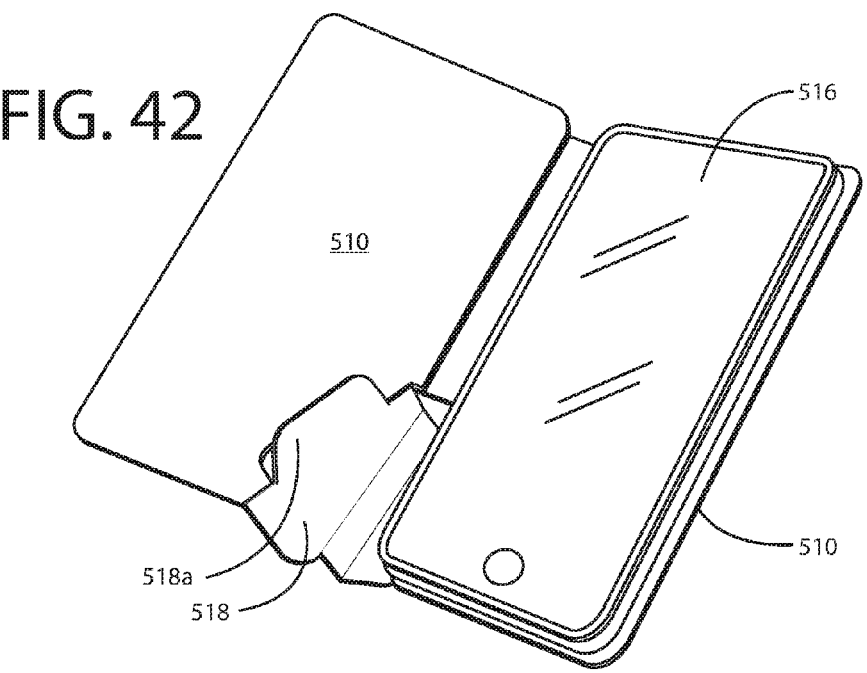
FIG. 42 shows the electronic device case with the electronic device attached in the cover "open" position at a slightly different angle view. The Flap panel is shown hinging downward from the panel with which it is attached to. The Flap design with the extended tab is shown with the panel surfaces extending from both sides of the Flap hinge.

The first improved variation of the flap panel design is shown in the embodiment depicted in FIGS. 39-47. This embodiment employs a folio type case as previously described and utilizes a modified Flap panel 518 integrated into the front cover panel of the case 510. When the flap 518 panel is hinged and rotated away from the electronic device 516, a notch 526 is created in the panel where the user's hand 528 can be inserted as shown in FIGS. 41 thru 43. In this embodiment, the hinged flap panel 518 depicted in FIGS. 39 thru 45 is uniquely designed with a tab 518*a* that is an extension of the flap panel 518 and extends to the opposite side of the hinge 520 which is opposite from the attached electronic device 516. The extended tab 518*a* is positioned in the middle of the hinge 520, splitting the hinge, and essentially creating two hinges—one on either side of the extended tab 518*a*.

When the Flap panel 518 is hinged to expose the notch 526 in the case and the user's hand 528 inserted into the notch 526, the surface of Flap panel 518 and tab 518*a* is positioned to conform to the backside of the user's hand 528 as best seen in FIG. 44. The extended Flap tab 518*a* is positioned above hinge 520 and the Flap panel 518 is positioned below hinge 520 from which the flap panel 518 and 518*a* rotate as best seen in FIG. 41. Having the hinged Flap panel 518 and 518*a* on both sides of the hinge 520 secures the flap panel 518 and tab 518*a* on the backside of the user's hand 528—preventing the Flap panel 518 from hinging and rotating away from the backside of the user's hand 528 as best seen in FIG. 43.

The surface area of the rotated Flap panel 518 and 518*a* is positioned to the backside of the user's hand 528 and prevents lateral (left to right) movement of the case 510 within from the user's hand 528 when the hand 528 is inserted into the notch 526, as shown in FIGS. 43 and 44. This interaction helps to produce a secure fit for the case 510 and device 516 within the user's hand 528.

The case 510 can be created utilizing just a single layer of hardboard panel material 560, 560*a* and 560*b*. This method helps minimize the thickness of the case 510 structure. The panels and outer/inner skin materials as described above create the platform for which a plastic attachment case 540 for the smartphone or similar electronic device can be attached to as best seen in FIGS. 46 and 47.

Figure 46:
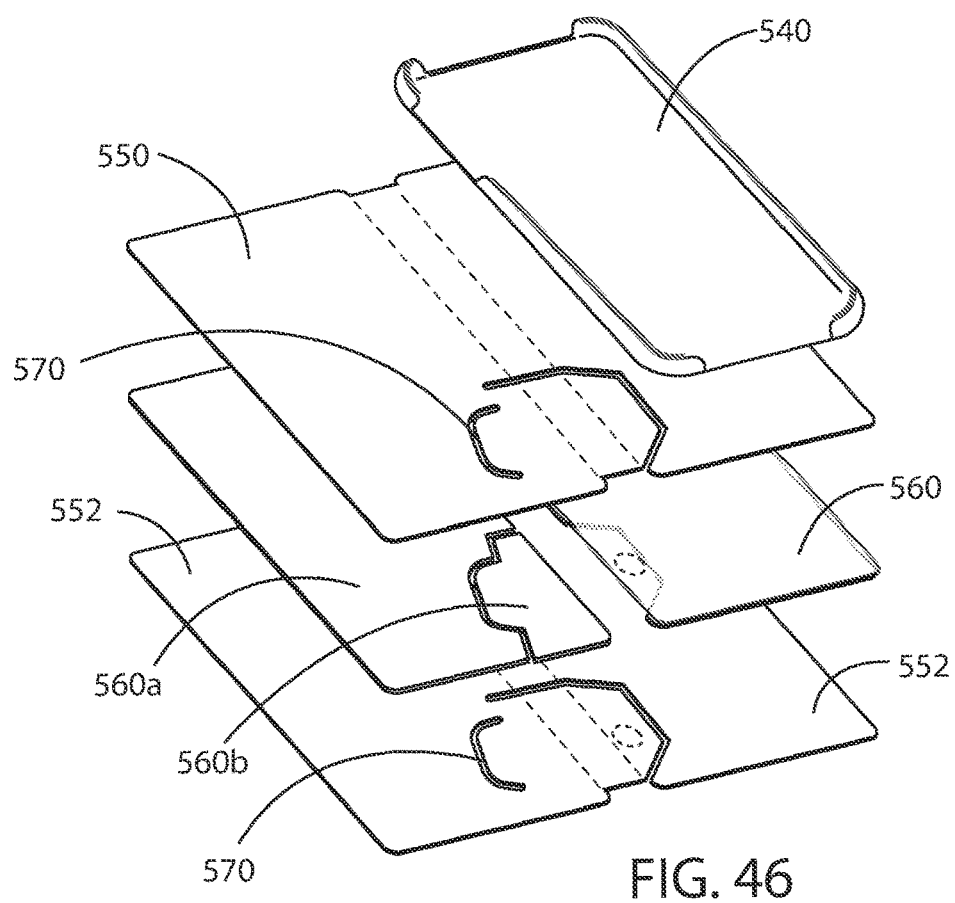
FIG. 46 shows an exploded view of the layers of panels and materials that make up the folio type case design that is illustrated in FIGS. 39 thru 45.

FIG. 46 illustrates an exploded view of a representative construction method for the folio case as described in FIGS. 39 thru 45. This construction method also pertains to the possible construction method for the notch panel for the open face case design as depicted in FIGS. 52 thru 57.

Separate panels 560, 560*a* and 560*b* are fabricated from a rigid material (such as chipboard) then sandwiched between a thinner pliable outer skin material 552 (such as a vinyl leather material) and a thinner pliable inner skin material 550 (such as a soft micro-fiber material or a durable vinyl material). The materials (multiple panels 560, 560*a*, and 560*b* and the outer and inner skins 550 and 552) can be attached and assembled together with both glue and stitching adhesion methods.

Figure 47:
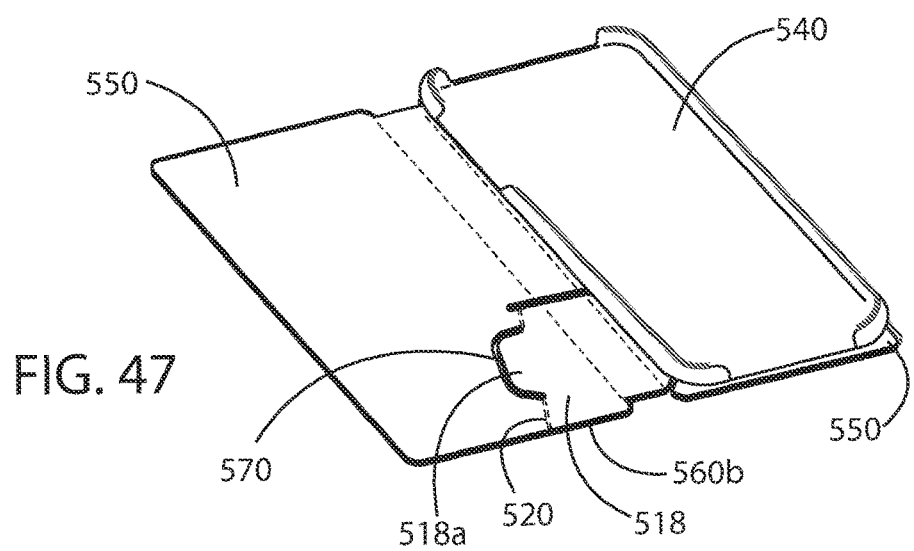
FIG. 47 shows the reassembled view (from the exploded view shown in FIG. 46) of the layers of panels and materials that make up the folio type case design.

With the panels and materials assembled together as a flat laminate on a single plane, the absence of hard panel material between panels 560*a* and 560*b* creates the hinge 520, as seen in FIG. 47, from the pliable outer and inner skin materials 550 and 552. A slot 570 that cuts through all materials (best viewed in FIGS. 45, 46, and 47) is required to allow the tab 518*a* to be created when the panel 518 is rotated on the hinge 520 as seen in FIGS. 41, 42, and 43.

FIG. 46 illustrates how the case 510 can be created utilizing just a single layer of separate, relatively rigid panels 560, 560*a* and 560*b*. This method helps minimize the thickness of the structure of case 510 structure. The panels with the outer/inner skin materials as described above create the platform for which a plastic attachment case 540 for the smartphone or similar electronic device can be attached to as best seen in FIGS. 46 and 47.

It is important to note that the fabrication method shown in FIG. 46 represents the same fabrication method for the notch panel 714 and 718 that is shown in the open face case embodiment illustrated in FIGS. 52 thru 61. This construction method (shown in FIG. 46) is necessary for the notch panel 714 and 718 to have the ability to be positioned on either side of the electronic device as shown in FIGS. 52 thru 61. Because the construction of the panels 560, 560*a* and 560*b* and the skin materials 550 and 552 is on a single plane as seen in FIG. 46, the flap panel (518 and 518*a* shown in FIG. 47) can rotate on hinge 520 in either direction. This allows the notch panel (714 and 718) in the embodiment shown in FIGS. 52 thru 61 to be positioned on either side of the case.

FIG. 47 shows the reassembled case from the exploded view shown in FIG. 46.

The embodiment depicted in FIGS. 48 thru 51 employs a similar improved flap panel design to the embodiment illustrated in FIGS. 39 thru 47 with a tab 618*a* that extends beyond the hinge 620 of the flap panel 618. The case shown in this embodiment, however, is a non-folio "open-face" case that is widely used for smartphone and cell phone cases. The term "open-face" refers to a case that provides no cover panel to the front of the device as shown in FIGS. 50 and 51. The back of the open-face case as seen in FIG. 49, utilizes an integrated hinged panel 614 (which includes flap panel 618) that is attached to the side of the case at hinge 616. When hinged and rotated away from the back of the case 610, back panel 614 has the ability to create a notch 626 for which the user's hand 628 can be inserted into to realize the benefits of using a notch 626 as previously described within the application.

Figure 48:
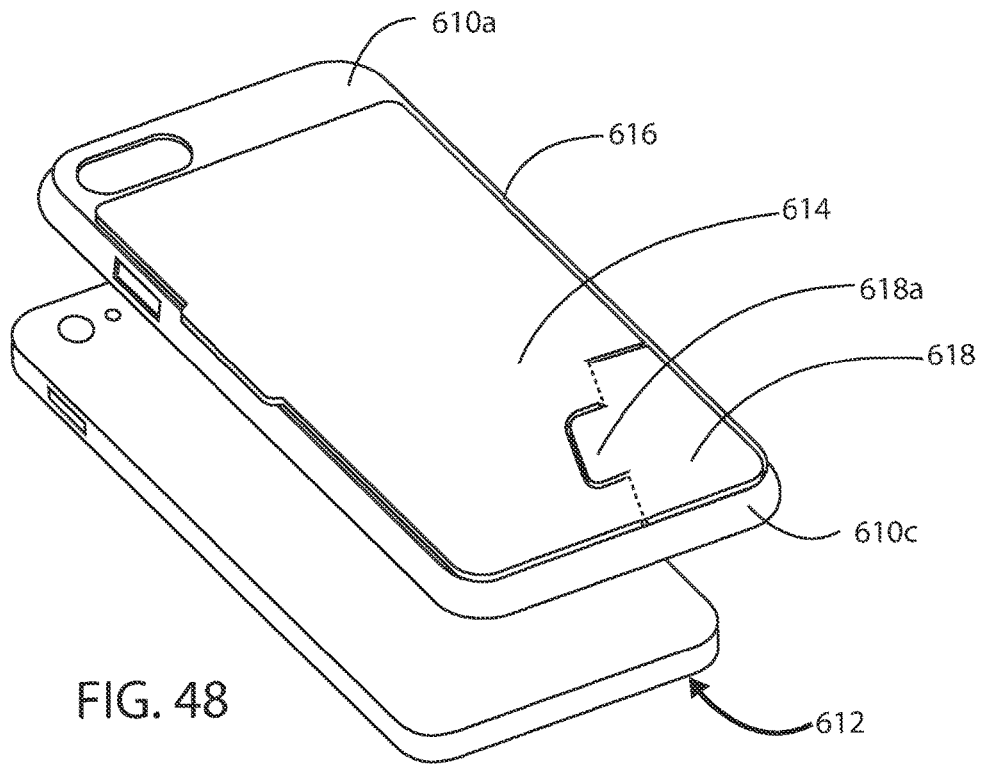
FIG. 48 shows the backside of a non-folio "open-face" type case with a similar modified Flap panel design (that has an extended tab) as shown in FIGS. 39 thru 47. The back panel of the case with the modified flap panel is shown in a closed and unhinged position where it is secured to the back of the device case. The Flap panel is shown with the extended tab surface on the reverse side of the Flap hinge. The backside of a smartphone or similar device is also shown unattached to the case.

When not utilized, the back panel 614 along with panel 618 of the non-folio "open-face" case 610 lays flush to the back of the case 610 as shown in FIG. 48 and can be secured to the back of case 610*a* through magnetic attachment or similar method. The back of the case 610*a* may utilize a recessed area 634 for the back panel 614 and 618 to fit into when not utilized as shown in FIGS. 48 and 49. The recessed area 634 will help keep the back panel 614 and 618 flush to the back of the case 610*a*.

To utilize the notch feature, the user hinges the back panel 614 away from the side of the case 610 and positions it to the side of the electronic device 612 that is attached to the case 610 as shown in FIGS. 49 thru 51. The integrated Flap panel 618 of the back panel 614 is positioned where it can freely rotate downward on hinge 620 as shown in FIGS. 50 and 51. The extended tab 618a of the Flap panel 618 is positioned above the hinge 620 and flap panel 618 is positioned below the hinge. The surface area of tab 618a along with the surface area of flap panel 618 is positioned to conform or snugly fit to the back of the user's hand 628 when the hand is inserted into the notch 626 as best seen in FIG. 51.

Having the hinged Flap panel 618 and 618a on both sides of the hinge 620 secures the flap panel 518 on the backside of the user's hand 628—preventing the Flap panel 618 from rotating away from the backside of the user's hand 628 as shown in FIG. 51.

The surface area of the rotated Flap panel 618 with tab 618a resides against the backside of the user's hand 628 and prevents lateral (left to right) movement of the case 610 away from the user's hand 628 when the hand 628 is inserted into the notch 626, as shown in FIG. 51. This interaction helps to produce a secure fit for the case 610 and device 612 within the user's hand 628.

The embodiment depicted in FIGS. 52 thru 61 is also an open-face case as described in FIGS. 48 thru 51, but this embodiment of the case includes an additional panel 730 that is connected to and hinges to the side edge hinge 716—of the back panel 714 (which includes the integrated flap panel 718). This additional panel 730 connects to and hinges from the center hinge 732 of the backside of the case 710a as shown in FIGS. 53 thru 57. The additional connected hinge panel 730 allows the back panel 714 with the integrated flap panel 718 to be positioned in an operative configuration on either side of the case 710. FIGS. 52 thru 61 show the range of motion of the back panel 714 that is made possible with the additional connected panel 730. This range of motion allows the user the flexibility of positioning the back panels 714 and 718 on either side of the case 710. FIG. 54 shows the back panels 714 and 718 positioned on the left backside of the case 710a whereas FIG. 57 shows the back panels 714 and 718 positioned on the right backside of the case 710a.

Figure 58:
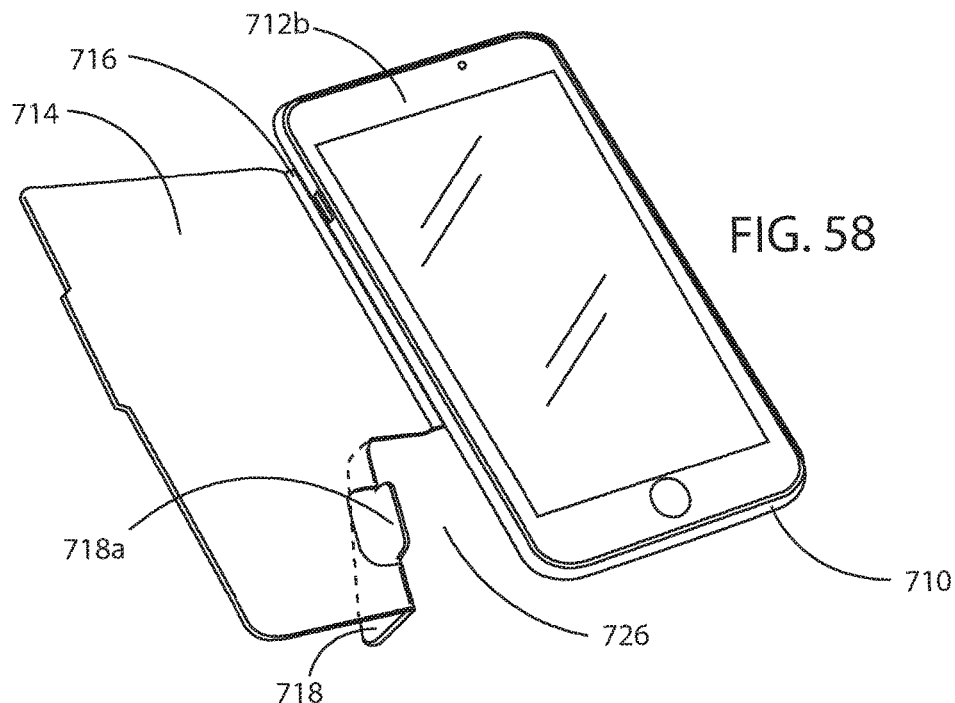
FIG. 58 shows the frontside of a non-folio open-face case with the same modified Flap panel design (that has an extended tab) as shown in FIGS. 52 thru 57. The back panel with modified flap panel is shown in the open and hinged position where it is positioned to the LEFT side of the device. The modified Flap design is shown hinged away creating a notch within the back panel. The extended tab surface of the flap panel is shown above the Flap hinge.
Figure 59:
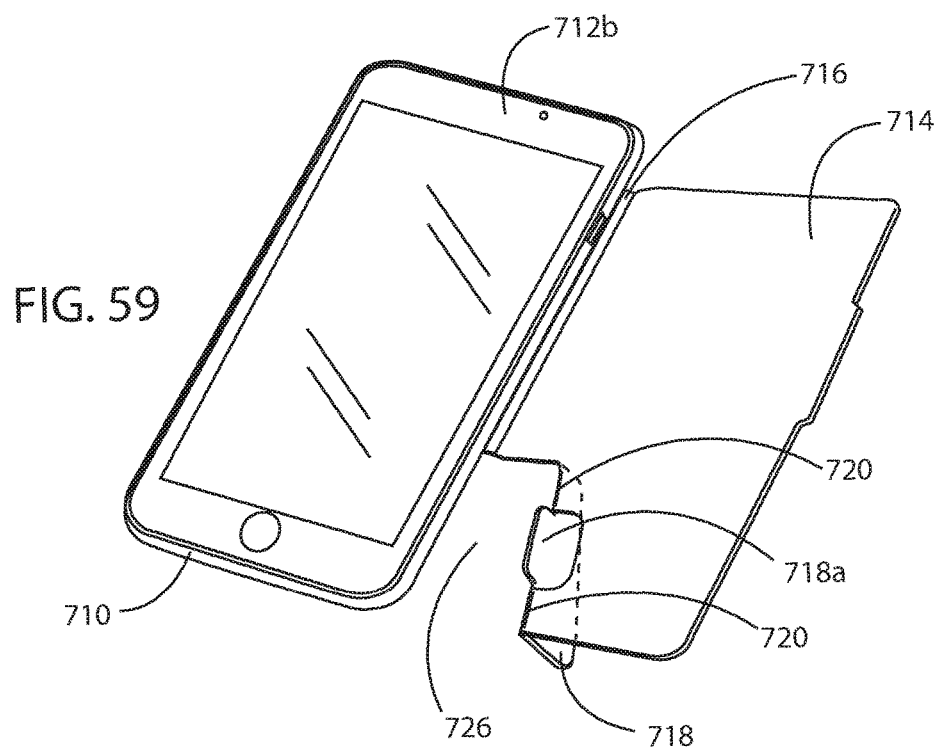
FIG. 59 shows the frontside of a non-folio open-face case with the same modified Flap panel design (that has an extended tab) as shown in FIGS. 52 thru 57. The back panel with modified flap panel is shown in the open and hinged position where it is positioned to the RIGHT side of the device. The modified Flap design is shown hinged away creating a notch within the back panel. The extended tab surface of the flap panel is shown above the Flap hinge.

FIGS. 58 and 59 show the front side of the case 710 with the back panel 714 positioned on the left front side of case 710 in FIG. 58 and the back panel 714 positioned on the right front side of case 710 in FIG. 59. In both FIGS. 58 and 59, the flap panel 718 is shown hinged and rotated downward thus creating a notch 726 in the back panel 714. The tab 718a of the flap panel 718 is shown above the flap panel hinge 720.

Figure 60:
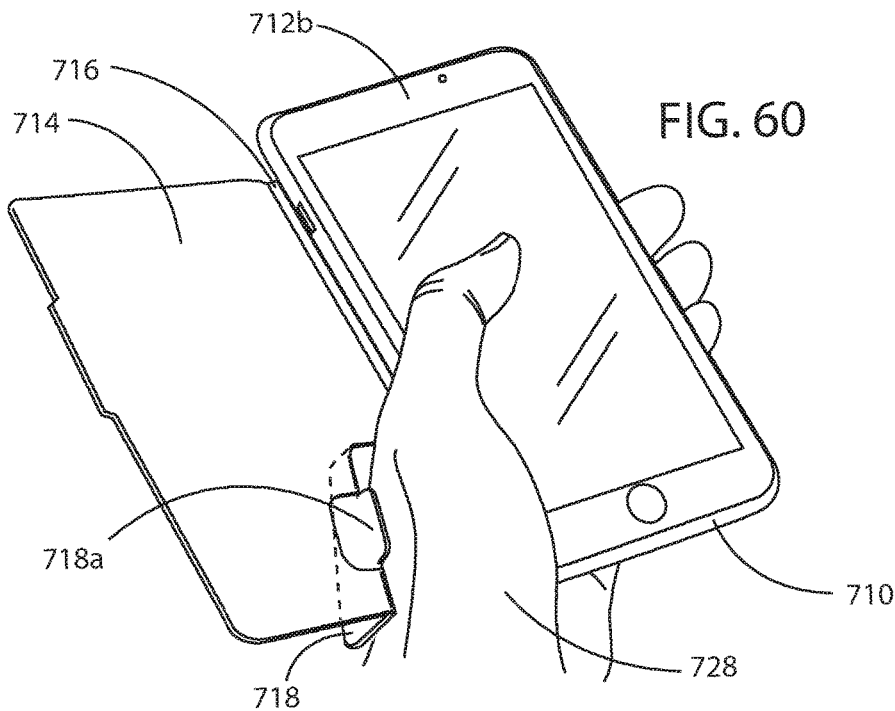
FIG. 60 shows the same view and illustration as shown in FIG. 58 but is shown with the user's hand inserted into the notch created from the hinging the flap panel.
Figure 61:
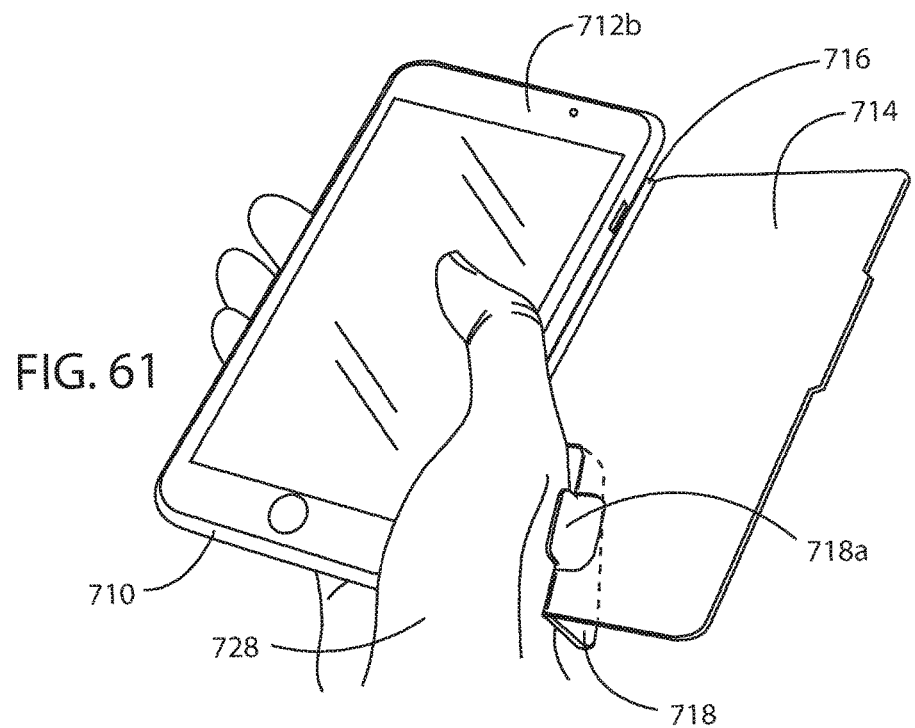
FIG. 61 shows the same view and illustration as shown in FIG. 59 but is shown with the user's hand inserted into the notch created from the hinging the flap panel.
Figure 62:
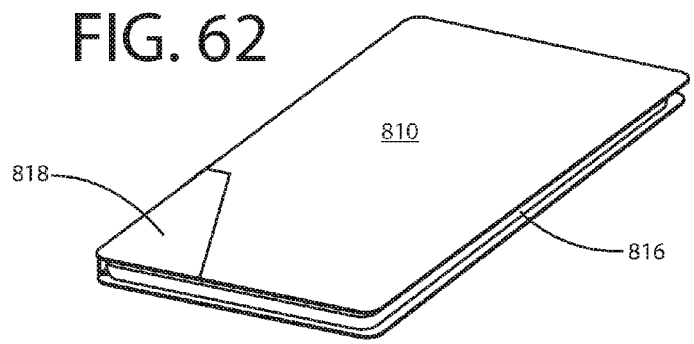
FIG. 62 illustrates another embodiment of a modified Flap panel design that includes a tab that is integrated into a folio type case—similar to the previously described FIGS. 39 thru 47. The folio type case is shown in a closed position. The front panel of the case is visible as well as the hinge for the notch flap panel. Note that the extended tab is not visible in this view of this embodiment.
Figure 63:
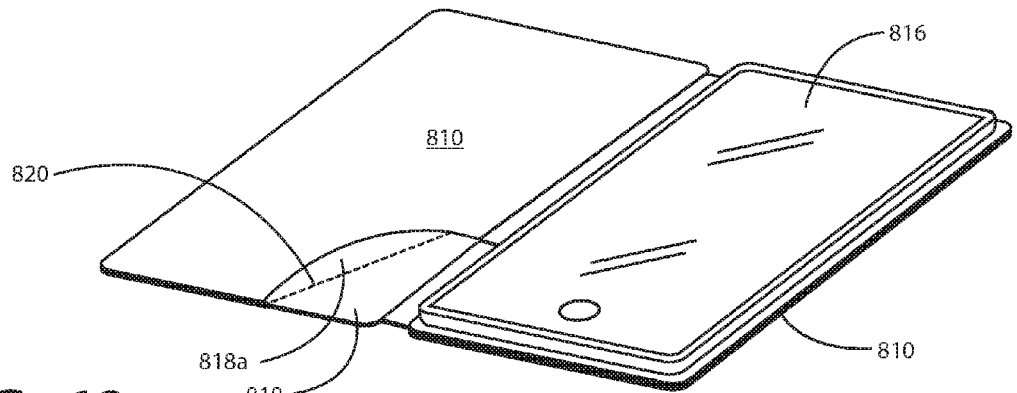
FIG. 63 shows the same folio case as shown in FIG. 62 but in an open position. The electronic device, such as a smartphone is shown attached to the back panel of the case. The modified flap panel design of this embodiment is shown unhinged to the left of the electronic device. Visible is the extended tab which has a soft radius edge that extends from one end of the hinge to the other. A dotted line illustrates the location of the hinge for the flap panel.

FIGS. 60 and 61 show the case in the same orientation as in FIGS. 58 and 58 but are shown with the user's hand 728 inserted into the notch 726 that is created from the hinging of the flap panel 718 at hinge 720. The surface area of the flap panel 718 and the tab 718a conform to the backside of the user's hand 728 when the user's hand is inserted into the notch 726 creating a secure fit for the case 710 and device 712 within the user's hand 728.

The second improved variation of the flap panel design is shown in the embodiment depicted in FIGS. 62-75. This embodiment employs a very similar folio type case as previously described in FIGS. 39 thru 47. The difference between the two embodiments is the design of a flap panel 818 that is integrated into the front cover panel of case 810. The hinged flap panel 818 depicted in FIGS. 62 thru 75 is uniquely designed with a tab 818a that extends into the opposite side of the hinge 820—opposite from the housed electronic device 816 as shown in FIGS. 63 thru 68.

The shape of the extended tab 818a of the flap panel 818 is a soft radius curve that extends from one end of the panel hinge 820 to the other end of the panel hinge 820. The shape of tab 818a is significant in that it insures that there are no sharp corner edges that could be uncomfortable to the user when the flap 818 and tab 818a are hinged open and the backside of the user's hand 828 comes in contact with the tab 818a as seen in FIG. 66.

Figure 64:
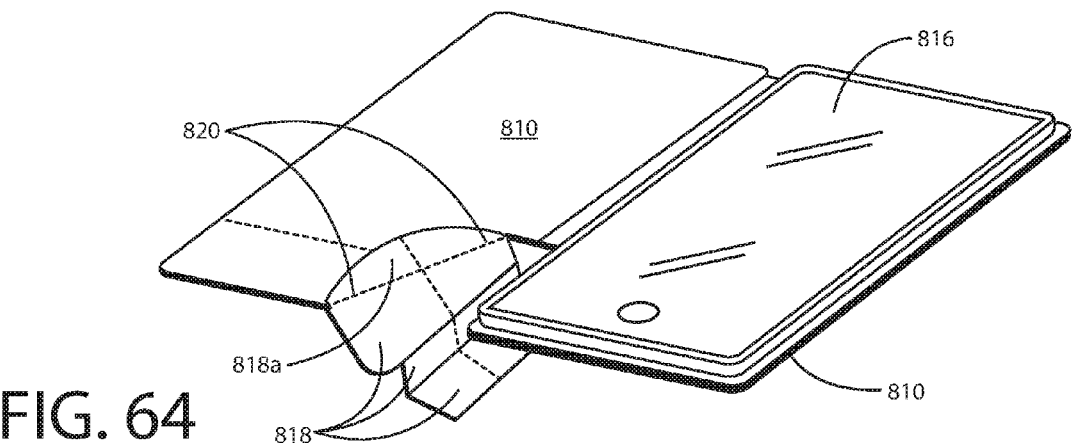
FIG. 64 shows the same folio case as shown in FIG. 63 but with the flap panel shown hinged downward, creating a notch within the open case. Dotted lines are shown to help illustrate the angle of the linear planes of the panels as well as the hinge for the Flap panel. The tab is shown extended above the hinge line of the flap panel.
Figure 65:
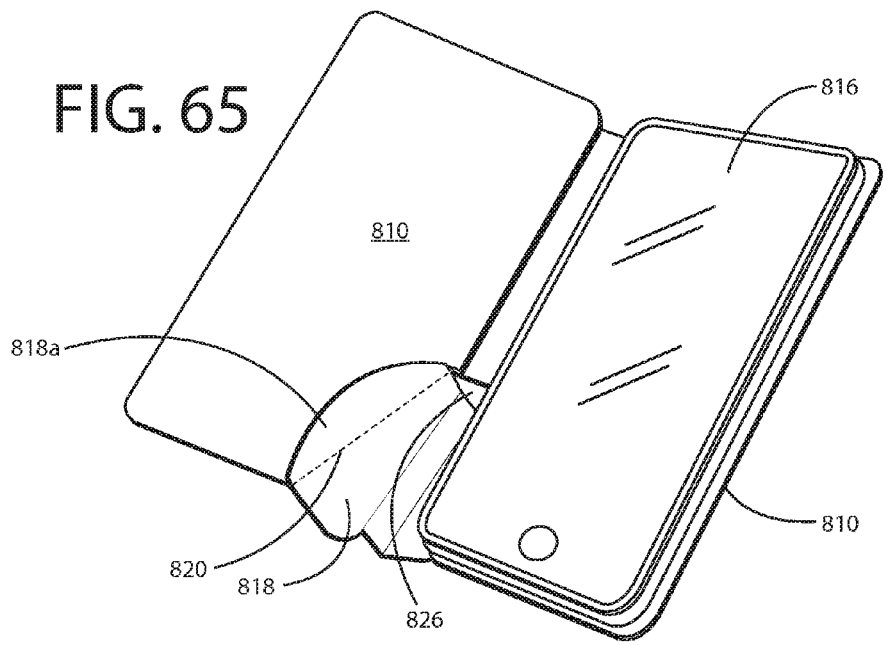
FIG. 65 shows the electronic device case with the electronic device attached in the "open" position at a slightly different angle view from FIG. 64. The hinged Flap panel is shown hinging downward—creating the notch.

When the hinged flap 818 is rotated downward on hinge 820, panel portion 818 is positioned below the hinge 820 and panel portion 818a is positioned above the hinge 820, as best seen FIGS. 64, 65, and 66. When the user's hand 828 is inserted into the notch 826, the surfaces of flap panel 818 and tab 818a are positioned to where they conform to the backside of the user's hand 828, as best seen in FIGS. 66 and 67. This prevents the flap panel 818 from rotating away from the backside of the user's hand 828, similar to the embodiment shown and described in FIGS. 39 thru 47.

Figure 66:
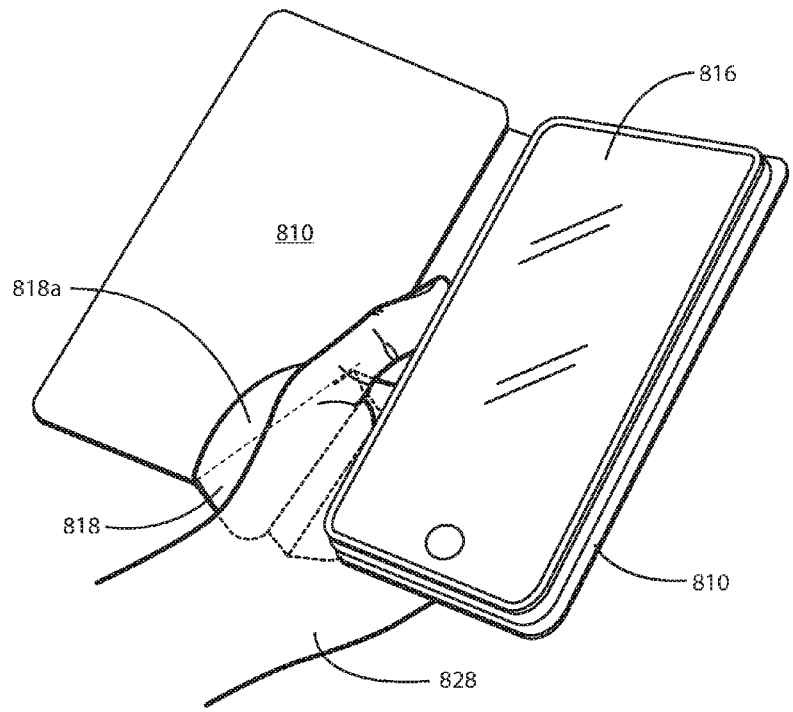
FIG. 66 shows the electronic device case with the electronic device attached in the "open" position. The user's hand is shown inserted into the notch that is created from the downward hinging of the flap panel. The modified Flap design with the extended radiused tab extends above the hinge and the flap panel extends below the hinge, ensuring that the flap panel conforms to the backside of the user's hand.
Figure 67:
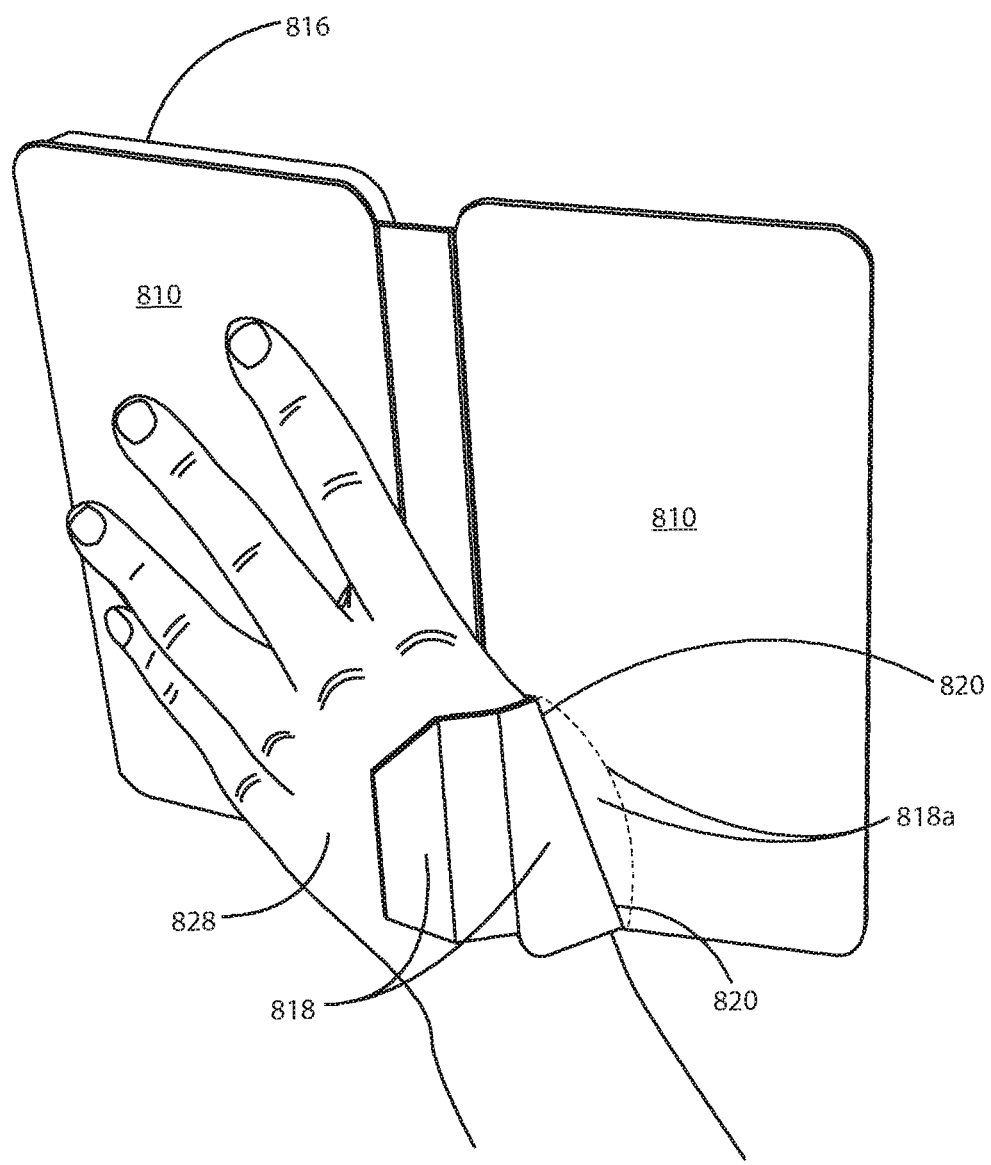
FIG. 67 shows the electronic device case with the electronic device attached in the "open" position as viewed from the reverse or back side of the case. The user's hand is inserted into the notch. The modified flap panel is shown conforming the backside of the user's hand. A dotted line illustrates where the flap panel tab extends into the inside of the case (not viewable from this angle) when the flap panel is hinged downward.
Figure 68:
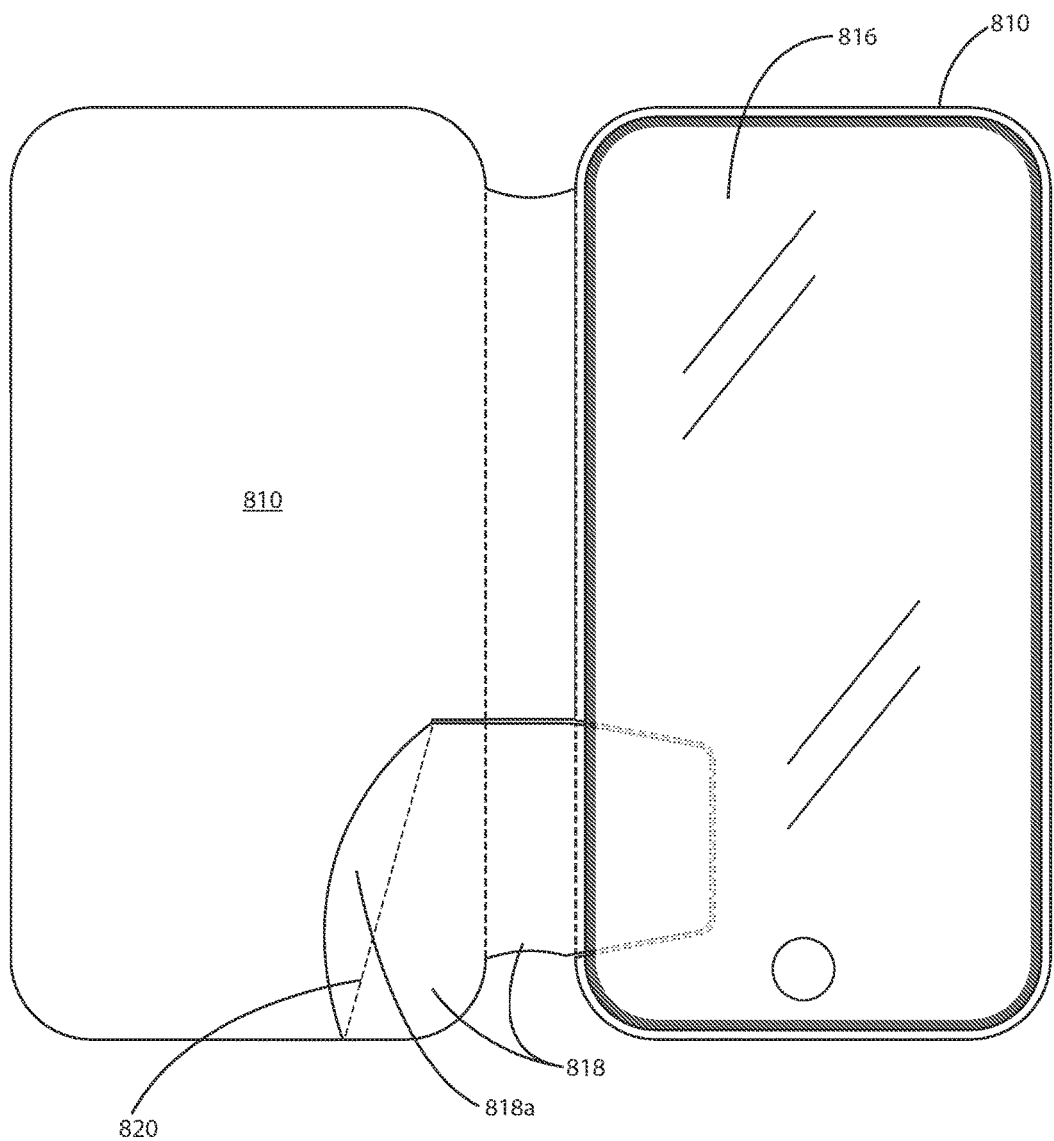
FIG. 68 shows a plan view of the open folio case with the electronic device attached on the right panel. The left panel illustrates the modified shape of the Flap panel with the radiused tab that extends from one end of the flap panel hinge to the other end of the hinge.
Figure 69:
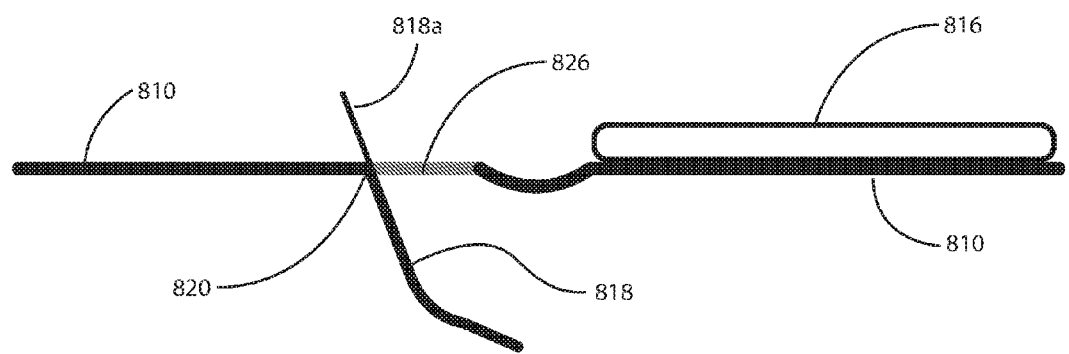
FIG. 69 shows a section top view of the open case with the electronic device attached on the right panel. The panel on the left is shown with the flap panel open, angled downward and illustrates how the flap panel, when open to expose the notch, has surface area on both sides of the flap panel hinge.

The surface area of the rotated flap panel 818 (including tab 818a) when positioned to the backside of the user's hand 828 also prevents lateral (left to right) movement of the case 810 within the user's hand 828, as shown in FIGS. 66 and 67. This interaction helps to produce a secure fit for the case 810 with attached device 816 within the user's hand 828.

Figure 70:
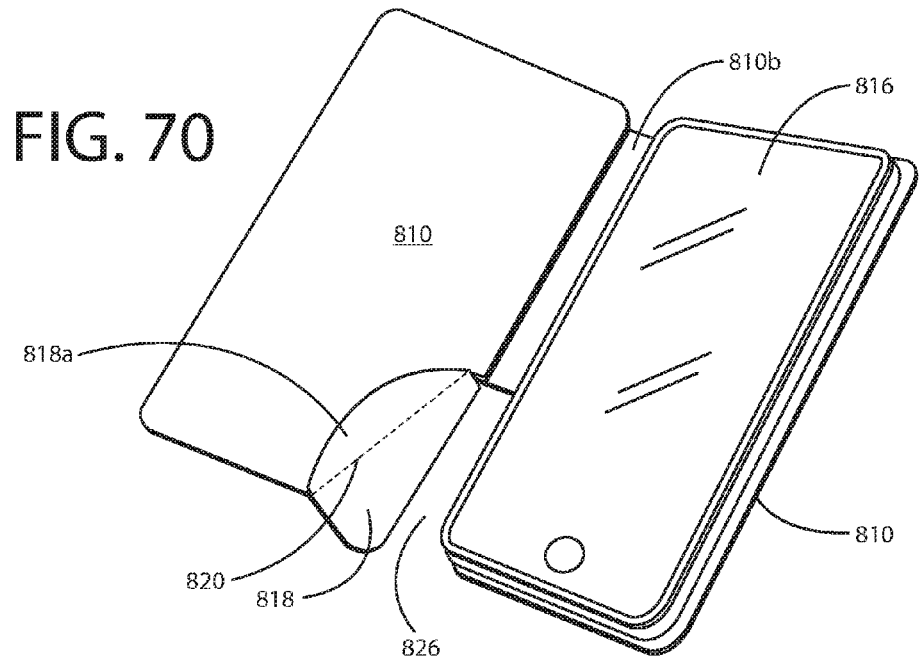
FIG. 70 shows a variation and simplification of the modified flap panel shown in FIGS. 62 thru 69 where the panel does not include a continuation of the spine section as well as a panel for attaching the flap panel to the backside of the case. The flap is shown in the open position and will conform to the backside of the user's hand in the same way as described in FIGS. 62 thru 69.

In FIG. 70, a variation and simplification of the flap panel 818 is shown where the panel does not include a continuation of the spine section 810b and a panel that attaches to the backside of the case 810. The flap 818 is shown hinged downward in the open position and will conform to the backside of the user's hand 828 in the same way as described previously, even without the continuation of the spine material and the attachment panel for the backside of the case 810.

Figure 71:
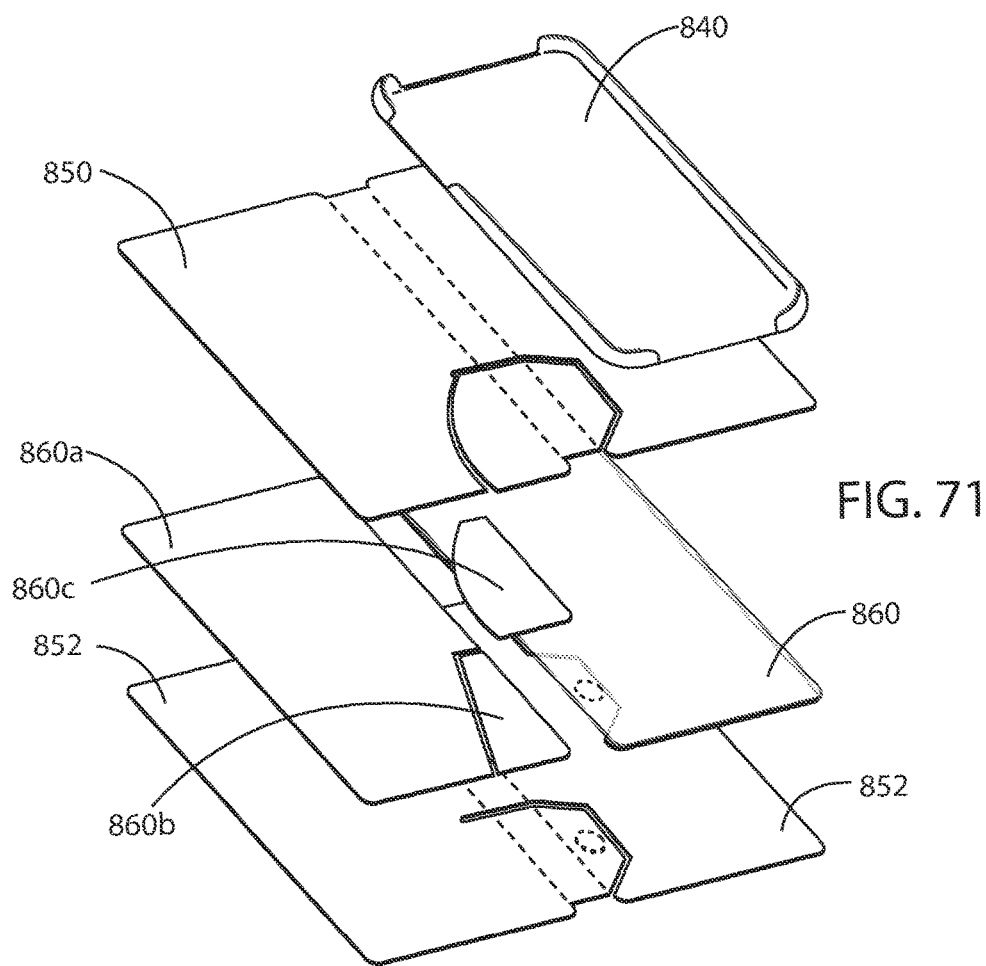
FIG. 71 shows an exploded view of the layers of panels and materials that make up the folio type design of the case illustrated in FIGS. 62 thru 70.
Figure 72:
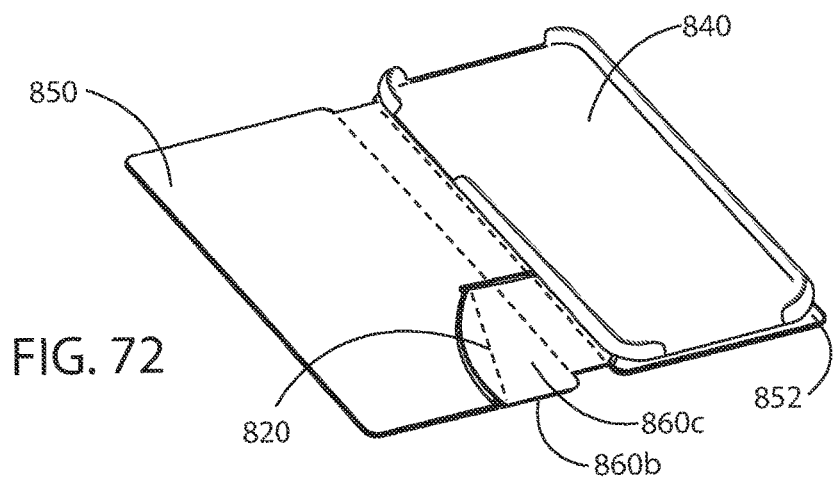
FIG. 72 shows the reassembled view of the layers of panels and materials that make up the folio type design of the case illustrated in FIG. 71.

FIG. 71 illustrates a simple exploded view of a representative construction method for the case 810 as depicted in FIGS. 62 thru 72. In this method, separate panels 860, 860a, 860b, and 860c are created from a rigid material (such as chipboard) and are assembled in multiple layers. The rigid panels are sandwiched between pliable outer and inner skin materials 850 and 852 (such as a vinyl leather or microfiber materials) and are assembled and attached together utilizing both gluing and stitching.

Relatively rigid panels 860, 860a, and 860b are adhered to pliable skin material 852. The gap between rigid panels 860a and 860b allows the pliable skin 852 to create a hinge between panels 860a and 860b. Panel 860c is attached to the top of panel 860b and extends beyond the hinge edge of panel 860b. This extension of panel 860c creates the extended tab 818a as seen in FIG. 70. The inner skin 850 is contoured so not to obstruct panel 860c when panels 860b and 860c rotate on hinge 820.

Figure 73:
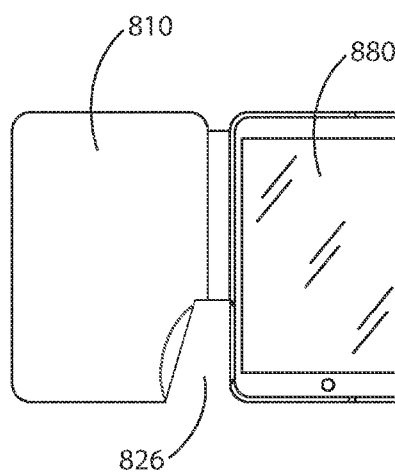
FIG. 73 shows the size relationship of a notched case with a tablet sized electron device attached to it.
Figure 74:
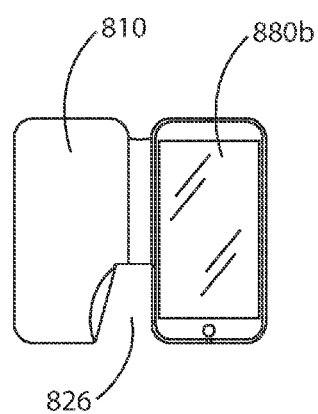
FIG. 74 shows the size relationship of a notched case with a large smartphone sized electron device attached to it.
Figure 75:
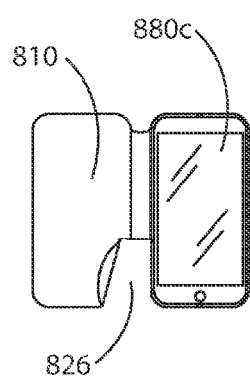
FIG. 75 shows the size relationship of a notched case with a smaller smartphone sized electron device attached to it.

FIGS. 73 thru 75 illustrate the size relationship between the folio case size (for different electronic devices) and the notch size associated with each case. The notch 826 size scales up with larger devices such as tablets 880a or electronic book readers 880a as shown in FIG. 73. The notch is sized as to best position the user's hand onto the device 880a so that the user can interact with device. For reference, the example device 880a shown in FIG. 73 is representative of an Apple iPad mini with the basic dimensions of 8" height× 5.3" wide.

FIG. 74 shows a slightly smaller device which would be representative of larger smartphones. The example device 880b is representative of the iPhone 7 plus which is considered a larger smartphone with the dimensions of 6.2" height×3" wide. The notch 826 is scaled down from the case shown in FIG. 73 to best position the users hand onto the device 880b so that the user can interact with device.

FIG. 75 shows an even smaller device that would be representative of standard smartphone devices. The example device 880c is representative of the iPhone 7 which is considered a standard size for most smartphones with the dimensions of 5.4" height×2.6" wide. The notch 826 is scaled down from the case shown in FIG. 74 to best position the users hand onto the device 880c so that the user can interact with device.

The terms and expressions which have been employed in this specification are used therein as terms of description and not of limitation, and there is no intention in the use of such terms and expressions to exclude equivalents of the features shown and described or portions thereof, it being recognized that the scope of the invention is defined and limited only by the claims which follow.

I claim:

1. A hand held case for facilitating use of a hand held electronic device, the case comprising:
    a base upon which the hand held electronic device is mountable and securable thereon;
    a hinged panel extending in an operative position at an angle relative to the base and to the hand held electronic device when mounted on the base;
    a notch formed along a lower edge of the hinged panel and extending upwardly into the hinged panel, the notch being adjacent an edge along which the hinged panel is attachable and hinged relative to the base;
    a deflectable flap joined to the hinged panel along a flap hinge, the flap extending over the notch when the hinged panel is in a closed position and being hinged to open the notch when a user positions his hand within the notch to hold the hand held electronic device, the flap including a main flap panel and a tab, the tab and the main flap panel extending on opposite sides of the flap hinge so that the tab increases a rear surface arear engaging the user's hand when the flap engages the rear surface of the user's hand when the user holds the case and the hand held electronic device mountable thereon.

2. The hand held case of claim 1 wherein the tab has a width less than a portion of the main flap from which the tab extends.

3. The hand held case of claim 1 wherein the flap hinge extends beyond opposite edges of the tab.

4. The hand held case of claim 1 wherein the tab is formed by a profile cut from the hinged panel.

5. The hand held case of claim 1 wherein the flap hinge extends at an acute angle relative to a lower edge of the hinged panel.

6. The hand held case of claim 1 wherein the tab has a rounded rectangular shape and the flap has a trapezoidal shape.

7. The hand held case of claim 1 wherein the tab has a curved edge and the flap hinge forms a chord relative to the curved edge of the flap.

8. The hand held case of claim 7 wherein the maximum extent of the curved edge is equal to the length of the flap hinge and extends to opposite edges of the deflectable flap.

9. The hand held case of claim 1 wherein the hinged panel comprises a folio cover foldable over a display surface of the hand held electronic device when not in use, and foldable to an open position to one side and exposing the display surface.

10. The hand held case of claim 1 wherein the hinge panel comprises a panel extending over a backface of the case when closed to form an open face case.

11. The hand held case of claim 1 wherein the hinged panel, the flap and tab are formed as a laminate structure with relatively more rigid hardboard material sandwiched between relatively more flexible outer layers.

12. The hand held case of claim 11 wherein the relatively more rigid hardboard material does not extend into the flap hinge and the flexible layers form the hinge.

13. The hand held case of claim 11 wherein the main flap panel and the tab extending therefrom are formed by a single hardboard material layer separate from a hardboard layer forming the hinged panel with two of the relatively more flexible outer layers extend over the hardboard material layer forming the main flap panel and the tab and the hardboard layer forming the main hinged panel.

14. The handheld case of claim 1 configured as a smart phone case.

15. The handheld case of claim 1 configured as a tablet case.

16. The handheld case of claim 1 configured as a fablet case.

17. The handheld case of claim 1 wherein the hinged panel is foldable in opposite directions to an operative position on opposite sides of the handheld electronic device mountable to the handheld case so that handheld electronic device can be alternatively held in either hand by the user.

* * * * *